US010939742B2

United States Patent
Fu et al.

(10) Patent No.: US 10,939,742 B2
(45) Date of Patent: Mar. 9, 2021

(54) SYSTEMS AND METHODS FOR VIRTUAL FACIAL MAKEUP REMOVAL AND SIMULATION, FAST FACIAL DETECTION AND LANDMARK TRACKING, REDUCTION IN INPUT VIDEO LAG AND SHAKING, AND A METHOD FOR RECOMMENDING MAKEUP

(71) Applicant: Shiseido Company Limited, Tokyo (JP)

(72) Inventors: Yun Fu, Brookline, MA (US); Shuyang Wang, Medford, MA (US)

(73) Assignee: Shiseido Company, Limited, Tokyo (JP)

( * ) Notice: Subject to any disclaimer, the term of this patent is extended or adjusted under 35 U.S.C. 154(b) by 68 days.

(21) Appl. No.: 16/035,509

(22) Filed: Jul. 13, 2018

(65) Prior Publication Data
US 2019/0014884 A1    Jan. 17, 2019

Related U.S. Application Data

(60) Provisional application No. 62/531,929, filed on Jul. 13, 2017.

(51) Int. Cl.
*A45D 44/00* (2006.01)
*G06T 19/20* (2011.01)
(Continued)

(52) U.S. Cl.
CPC ....... *A45D 44/005* (2013.01); *G06K 9/00268* (2013.01); *G06K 9/00281* (2013.01);
(Continued)

(58) Field of Classification Search
CPC ............. A45D 44/005; G06K 9/00671; G06K 9/00268; G06K 9/00281; G06K 9/4642;
(Continued)

(56) References Cited

U.S. PATENT DOCUMENTS 6,624,843 B2    9/2003  Lennon
6,761,697 B2    7/2004  Rubinstenn et al.
(Continued)

FOREIGN PATENT DOCUMENTS

CA    2651539 A     1/2010
EP    1 196 893 B1  9/2003
(Continued)

OTHER PUBLICATIONS

Chong Cao, Makeup Removal via Bidirectional Tunable De-Makeup Network, IEEE Transactions on Multimedia, vol. 21, No. 11, Nov. 2019, pp. 2750-2761 (Year: 2019).*
(Continued)

*Primary Examiner* — Marcos L Torres
(74) *Attorney, Agent, or Firm* — Calderone Bullock LLC

(57) ABSTRACT

The present disclosure provides systems and methods for virtual facial makeup simulation through virtual makeup removal and virtual makeup add-ons, virtual end effects and simulated textures. In one aspect, the present disclosure provides a method for virtually removing facial makeup, the method comprising providing a facial image of a user with makeups being applied thereto, locating facial landmarks from the facial image of the user in one or more regions, decomposing some regions into first channels which are fed to histogram matching to obtain a first image without makeup in that region and transferring other regions into color channels which are fed into histogram matching under different lighting conditions to obtain a second image without makeup in that region, and combining the images to form a resultant image with makeups removed in the facial regions. The disclosure also provides systems and methods for virtually generating output effects on an input image having a face, for creating dynamic texturing to a lip region of a facial image, for a virtual eye makeup add-on that may
(Continued)

include multiple layers, a makeup recommendation system based on a trained neural network model, a method for providing a virtual makeup tutorial, a method for fast facial detection and landmark tracking which may also reduce lag associated with fast movement and to reduce shaking from lack of movement, a method of adjusting brightness and of calibrating a color and a method for advanced landmark location and feature detection using a Gaussian mixture model.

13 Claims, 26 Drawing Sheets
(14 of 26 Drawing Sheet(s) Filed in Color)

(51) Int. Cl.
| | |
|---|---|
| *G06K 9/00* | (2006.01) |
| *G06T 1/00* | (2006.01) |
| *G06T 17/20* | (2006.01) |
| *G06T 11/60* | (2006.01) |
| *G06K 9/46* | (2006.01) |

(52) U.S. Cl.
CPC ........ *G06K 9/00671* (2013.01); *G06T 1/0007* (2013.01); *G06T 11/60* (2013.01); *G06T 17/205* (2013.01); *G06T 19/20* (2013.01); *G06K 9/4642* (2013.01); *G06T 2207/30201* (2013.01)

(58) Field of Classification Search
CPC ........... G06T 11/60; G06T 2207/30201; G06T 1/0007; G06T 19/20; G06T 17/205
See application file for complete search history.

(56) References Cited

U.S. PATENT DOCUMENTS

| | | |
|---|---|---|
| 6,810,130 B1 | 10/2004 | Aubert et al. |
| 6,985,611 B2 | 1/2006 | Loussouarn et al. |
| 7,324,668 B2 | 1/2008 | Rubinstenn et al. |
| 7,337,127 B1 | 2/2008 | Smith et al. |
| 7,437,344 B2 | 10/2008 | Peyrelevade |
| 7,634,103 B2 | 12/2009 | Rubinstenn et al. |
| 7,634,108 B2 | 12/2009 | Cohen et al. |
| 7,773,091 B2 | 8/2010 | Giron et al. |
| 8,005,270 B2 | 8/2011 | Roizen et al. |
| 8,265,351 B2 | 9/2012 | Aarabi |
| 8,498,456 B2 | 7/2013 | Legagneur et al. |
| 8,620,038 B2 | 12/2013 | Aarabi |
| 8,660,319 B2 | 2/2014 | Aarabi |
| 8,711,175 B2 | 4/2014 | Aarabi |
| 8,725,560 B2 | 5/2014 | Aarabi |
| 8,908,904 B2 | 12/2014 | Santos et al. |
| 8,910,082 B2 | 12/2014 | Aarabi |
| 8,933,994 B2 | 1/2015 | Gross et al. |
| 8,983,203 B2 | 3/2015 | Ye et al. |
| 9,058,765 B1 | 6/2015 | Mallick et al. |
| 9,064,344 B2 | 6/2015 | Smith et al. |
| 9,104,908 B1 | 8/2015 | Rogers et al. |
| 9,111,134 B1 | 8/2015 | Rogers et al. |
| 9,118,876 B2 | 8/2015 | Felt |
| 9,122,918 B2 | 9/2015 | Howell et al. |
| 9,122,919 B2 | 9/2015 | Howell et al. |
| 9,182,813 B2 | 11/2015 | Ye et al. |
| 9,224,248 B2 | 12/2015 | Ye et al. |
| 9,262,869 B2 | 2/2016 | Ye et al. |
| 9,275,400 B2 | 3/2016 | Aarabi |
| 9,317,136 B2 | 4/2016 | Ye et al. |
| 9,449,412 B1 | 9/2016 | Rogers et al. |
| 9,460,462 B1 | 10/2016 | Walker et al. |
| 9,501,689 B2 | 11/2016 | Yamanashi |
| 9,563,975 B2 | 2/2017 | Yamanashi |
| 9,576,351 B1 | 2/2017 | Barzel et al. |
| 9,603,437 B2 | 3/2017 | Nguyen et al. |
| 9,615,647 B2 | 4/2017 | Yamanashi et al. |
| 9,633,250 B2 | 4/2017 | Tuzel et al. |
| 9,639,974 B2 | 5/2017 | Smith et al. |
| 9,647,485 B2 | 5/2017 | Kim et al. |
| 9,665,984 B2 | 5/2017 | Ye et al. |
| 9,674,485 B1 | 6/2017 | Sugaya |
| 9,679,397 B2 | 6/2017 | Aoki |
| 9,681,736 B2 | 6/2017 | Yamanashi et al. |
| 9,687,155 B2 | 6/2017 | Aarabi |
| 9,690,369 B2 | 6/2017 | Chang |
| 9,760,935 B2 | 9/2017 | Aarabi |
| 9,779,527 B2 | 10/2017 | Tang et al. |
| 9,858,473 B2 | 1/2018 | Izumi et al. |
| 9,965,778 B2 | 5/2018 | Aarabi |
| 9,984,282 B2 | 5/2018 | Chen et al. |
| 10,002,452 B2 | 6/2018 | Wu et al. |
| 10,083,345 B2 | 9/2018 | Choe et al. |
| 10,121,055 B1 | 11/2018 | Savvides |
| 2008/0199042 A1 | 8/2008 | Smith |
| 2009/0290791 A1 | 11/2009 | Holub et al. |
| 2011/0211047 A1 | 9/2011 | Chhibber et al. |
| 2012/0027269 A1 | 2/2012 | Fidaleo et al. |
| 2012/0070102 A1* | 3/2012 | Yokokawa ......... H04N 5/23222 382/286 |
| 2012/0237117 A1 | 9/2012 | Liu |
| 2013/0076932 A1 | 3/2013 | Chhibber et al. |
| 2013/0148902 A1 | 6/2013 | Hyde et al. |
| 2013/0159895 A1 | 6/2013 | Aarabi |
| 2015/0366328 A1 | 12/2015 | Tamura et al. |
| 2016/0042224 A1 | 2/2016 | Liu et al. |
| 2016/0042557 A1 | 2/2016 | Lin et al. |
| 2016/0110587 A1 | 4/2016 | Han et al. |
| 2016/0125228 A1 | 5/2016 | Son et al. |
| 2016/0125624 A1 | 5/2016 | Liu et al. |
| 2016/0128450 A1 | 5/2016 | Saito et al. |
| 2016/0135730 A1 | 5/2016 | Arai et al. |
| 2016/0239187 A1 | 8/2016 | Ben-Bassat |
| 2016/0357578 A1 | 8/2016 | Kim et al. |
| 2016/0253713 A1 | 9/2016 | Aarabi |
| 2016/0316886 A1 | 11/2016 | Samain et al. |
| 2017/0076474 A1* | 3/2017 | Fu ........................... G06T 11/00 |
| 2017/0185824 A1 | 6/2017 | Cheng et al. |
| 2018/0181813 A1 | 6/2018 | Sun |
| 2018/0260871 A1 | 9/2018 | Harvill et al. |
| 2019/0122404 A1* | 4/2019 | Freeman .............. G06K 9/4652 |
| 2019/0269224 A1 | 9/2019 | Fu et al. |
| 2019/0289986 A1 | 9/2019 | Fu et al. |
| 2020/0015575 A1 | 1/2020 | Fu et al. |

FOREIGN PATENT DOCUMENTS

| | | |
|---|---|---|
| EP | 2 131 697 B1 | 9/2012 |
| JP | 2002-131135 A | 5/2002 |
| JP | 2006-254309 A | 9/2006 |
| JP | 2010-086036 A | 4/2010 |
| JP | 2012-128597 A | 7/2012 |
| WO | 2015/127394 A1 | 8/2015 |

OTHER PUBLICATIONS

Example-Based Cosmetic Transfer Wai-Shun Tong, Chi-Keung Tang, Michael S. Brown 15th Pacific Conference on Computer Graphics and Applications 2007 IEEE, pp. 211-218 (Year: 2007).*
Multi-level Feature Learning for Face Recognition under Makeup Changes, Zhenzhu Zheng and Chandra Kambhamettu Department of Computer and Information Sciences, 2017 IEEE 12th International Conference on Automatic Face & Gesture Recognition, pp. 918-923 (Year: 2017).*
International Search Report and Written Opinion from Counterpart PCT Application No. PCT/2018/042175, dated Nov. 7, 2018 (18 pages).
International Preliminary Examination Report from Counterpart PCT Application No. PCT/2018/042175, dated Jan. 14, 2020 (12 pages).

(56) References Cited

OTHER PUBLICATIONS

Aarabi, "Automatic Segmentation of Hair in Images," 2015 IEEE International Symposium on Multimedia, IEEE Computer Society, pp. 69-72.

Aarabi, Mobile E-Commerce Data Processing Using Relational Memory, 2017 IEEE International Conference on Data Mining Workshops, IEEE Computer Society, pp. 910-915.

Aarabi et al., "Precise Skin-Tone and Under-Tone Estimation by Large Phot Set information Fusion," 2015 IEEE International Symposium on Multimedia, IEEE Computer Society, pp. 507-512.

T. Baltrusaitis et al., "Constrained Local Fields for Robust Facial Landmark Detection in the Wild," ICCV Workshops (2013), 8 pages.

J. Canny, "A Computational Approach to Edge Detection," Readings in Computer Vision, pp. 184-203 (1987).

C. Cortes et al., "Support-Vector Networks," Machine Learning, pp. 273-297 (1995).

D. Coltuc, "Exact Histogram Specification, IEEE Transactions on Image Processing," vol. 15 No. 5, (May 2006) pp. 1143-1152.

N. Dalal et al., "Histograms of Oriented Gradients for Human Detection," CVPR, pp. 226-893 (2005).

L. Gatys et al., "Preserving Color in Neural Artistic Style Transfer, Preserving Color in Neural Artistic Style Transfer," arXiv:1606.05897v1 [cs.CV] Jun. 19, 2016 (pp. 1-8).

P. Gehler et al., "Recovering Intrinsic Images with a Global Sparsity Prior on Reflectance," Advances in Neural Information Processing Systems 24 (NIPS 2011) pp. 1-9.

G. Joblove et al., "Color Spaces for Computer Graphics," Program of Computer Graphics, Cornell University, pp. 22-25 (Aug. 1978), vol. 12, No. 3, ACM.

J. Johnson et al., "Perceptual Losses for Real-Time Style Transfer and Super Resolution," ECCV (2016) pp. 1-17.

V. Kazemi et al, "One Millisecond Face Alignment with an Ensemble of Regression Trees," CVPR (2014) 8 pages.

A. Levinshtein, "Hybrid Eye Center Localization Using Cascaded Regression and Hand-Crafted Model Fitting," arXiv:1712.02822v1 [cs.CV] Dec. 7, 2017, pp. 1-12.

A. Levinshtein, Hybrid Eye Center Localization Using Cascaded Regression and Robust Circle Fitting, Global SIP 2017, pp. 11-15.

Levinshtein, "Real-time Deep Hair Matting on Mobile Devices," arXiv:1712.07168v2 Jan. 10, 2018, 7 pages.

C. Li et al., "Precomputed Real-Time Texture Synthesis with Markovian Generative Adversarial Networks," ECCV (2016) pp. 1-17.

Q. Liu et al., Robust Facial Landmark Tracking Via Cascade Regression, Pattern Recognition 66 (2017), pp. 53-62.

N. Otsu, "A Threshold Selection Method from Gray-Level Histograms," IEEE Transactions on Systems, Man, and Cybernetics, vol. SMC-9, No. 1, Jan. 1979, pp. 62-66.

S. Ren et al., "Face Alignment at 3000 FPS Via Regressing Local Binary Features," CVPR (2014).

J. Saragih et al., "Deformable Model Fitting by Regularized Landmark Mean-Shift" IJCV (2011) pp. 200-215.

Y. Wen et al., "A Discriminative Feature Learning Approach for Deep Face Recognition," B. Leibe et al. (Eds.): ECCV 2016, Part VII, LNCS 9911, pp. 499-515 (2016).

X. Xiong et al., "Supervised Descent Method and Its Applications to Face Alignment," CVPR (2013), 8 pages (Carnegie Mellon University).

X. Xiong et al., "Global Supervised Descent Method," CVPR 2015, Computer Vision Foundation (IEEE Explore), pp. 2664-2673.

S. Zafeiriou et al., "The Menpo Facial Landmark Localisation Challenge: A Step Towards the Solution," CVPR (2017), Computer Vision Foundation (IEEE Explore), pp. 170-179.

H. Zhang et al., "Multi-Style Generative Network for Real-Time Transfer," CoRR abs/1703.06953 (2017) 16 pages.

J. Zhang et al., "Hierarchical Differential Image Filters for Skin Analysis," 2016 IEEE 18th International Workshop on Multimedia Signal Processing (MMSP) (2016) (IEEE Xplore) 4 pages.

\* cited by examiner (a) Template labeling with color and texture (b) Lip color labeling (c) Lip Texture labeling (d) Makeup style selection

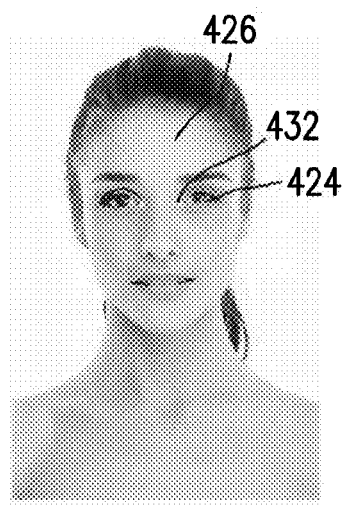 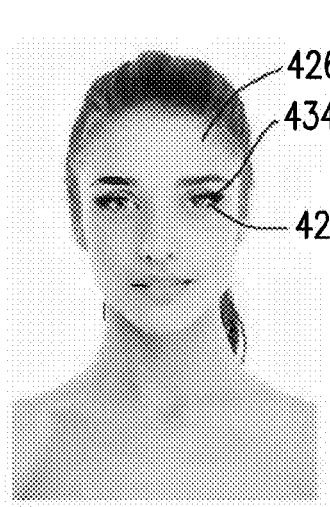 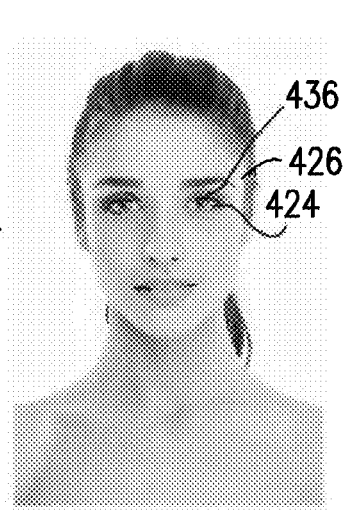
FIG.27D  FIG.27E  FIG.27F
FIG.28A
FIG.28B
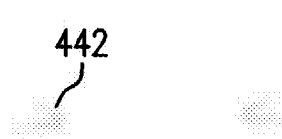
FIG.28C
FIG.28D
FIG.28E

SYSTEMS AND METHODS FOR VIRTUAL FACIAL MAKEUP REMOVAL AND SIMULATION, FAST FACIAL DETECTION AND LANDMARK TRACKING, REDUCTION IN INPUT VIDEO LAG AND SHAKING, AND A METHOD FOR RECOMMENDING MAKEUP

CROSS-REFERENCE TO RELATED APPLICATIONS

This Non-Provisional Patent Application claims the benefit under 35 U.S.C. § 119(e) from U.S. Provisional Patent Application No. 62/531,929, filed Jul. 13, 2017, the entire disclosure of which is incorporated herein by reference.

BACKGROUND OF THE INVENTION

Field of the Invention

The present disclosure relates to systems and methods for virtual facial makeup simulation, including methods for virtual removal of makeup and application of makeup and makeup effects to a user image. The present disclosure further relates to systems and methods for virtual facial makeup simulation using a neural network. The present disclosure also relates to various methods and systems for improving virtual facial makeup simulation, including virtual makeup tutorials, makeup recommendations, automatic adjustment of brightness and calibration of color using a color map and standard, a framework of fast facial landmarks detection and tracking and a method of solving the lag problems associated with fast facial movement and the landmark shaking problems associated with a user staying still in a video.

Description of Related Art

Facial makeup has been ubiquitous in our daily lives and in social networking. With the rapid growth of electronic commerce, smart phone and augmented reality techniques, virtual makeup try-on applications now exist on the market allowing a consumer to view the specific makeup products as those products are expected to look once applied to the consumer, but without having to actually apply the makeup products. Existing virtual systems, however, suffer from the problem of inconsistency due to the effects of existing makeup that may in certain cases be already applied to the user. If users have already applied makeup on their faces, the virtual system can only overlay its virtual makeup application on the face as it is, and if makeup is already applied on the user, it can lead to false, inconsistent or unrealistic results.

Virtual mirror systems are known for use in changing the appearance of objects or consumer goods such as clothing, on line. These systems focus on the object shape and an overlay of the replacement color or clothing. An example of such technology is described in U.S. Pat. No. 7,948,481.

Similar overlay methods have been developed for cosmetics as well for a "virtual try-on" of various cosmetics on a user's face. Such methods incorporate facial recognition software from a main server to identify facial features on digital images from a user's server. The detected facial features, such as eyes, lips, etc. may then be overlaid with pixel images from a specific cosmetic. See, e.g., U.S. Pat. No. 8,498,456.

Such systems have been improved over time to achieve more accuracy. For example, an image is captured and may be augmented for a virtual try-on by using captured image data from a user and a database of data from augmented facial images that are mathematically overlaid and matched to the capture image to create an augmented image as described, e.g., in U.S. Patent Application Publication No. 2016/0196665 A1.

Matching and digital enhancement of features using facial recognition software to create augmented looks such as a "virtual face-lift" are also known as described in U.S. Pat. No. 8,265,351.

Further improvements have been made in the virtual try-on area in attempts to gain further accuracy and better end results. For example, a virtual system is described in U.S. Patent Publication No. 2017/0076474 A1 having a method and system for detecting and removing makeup on a user's face. The system detects the type of makeup and, based on a database of users with and without makeup, removes the makeup from the user.

While such technology continues to improve, there is a need in the art for more consistency, realistic coloration in the end results, by eliminating the effects of the potential presence of existing makeup and for enhancing techniques to remove and apply makeup in a virtual setting. The more accurate and realistic the end results achieved by such a system, the more useful they are to be viable alternatives for consumers. Further, while facial landmarks detection presents many potential attractive applications in augmented reality, virtual reality, human-computer interaction, and so on, and there are now applications that let people wear virtual make-up and recognize the faces using certain end points as facial landmarks, there are still issues with such developing technology from an accuracy standpoint. For example, when using these techniques there are always two primary problems that severely influence performance of such an application in a video: shaking problems and lag problems.

Another problem that can arise is that there can be occluded landmarks that are not desired to be shown in the image or that make application of conventional landmark techniques difficult to apply, for example, it is hard to facially detect and modify a distorted smile or a puckered kissing expression. Other occlusions on the lip regions such as finger tips, teeth, tongue or other objects covering the lips makes use of such standard facial recognition or detection techniques difficult.

There is therefore also a need in the art not only for consistency and realistic color by eliminating the effects or potential effects of existing makeup in the try-on, but also a need for a smooth video for better detection and recognition using more accurate facial landmarks, true color and brightness, with avoidance of problems associated with lag and shaking and in videos, as well as finding a technique that overcomes issues associated with occluded regions when using landmarks and other issues. There is also a need in the art to provide more helpful and streamlined ways for users to interact with a virtual try-on system, and to show more realistic effects than can be achieved by a simple color overlay.

BRIEF SUMMARY OF THE INVENTION

In one embodiment herein, the invention includes a method for virtually removing facial makeup, comprising: providing a facial image of a user with makeup applied thereto; locating facial landmarks from the facial image of the user, the facial landmarks including at least a first region and a second region different from the first region; decomposing the first region of the facial image into first channels; feeding the first channels of the first region into histogram matching to obtain a first image with makeup being removed in the first region; converting the second region of the facial image into color channels; feeding the color channels into histogram matching under different lighting conditions to obtain a second image with makeup being removed in the second region; and combining the first image and the second image to form a resultant facial image with makeup being removed from the first region and the second region.

In such a method, the first channels may comprise a reflectance channel and a shading channel. The reflectance channel may comprise material dependent properties of the facial image, and the shading channel may comprise light dependent properties of the facial image. The reflectance channel preferably contains only one color, and the shading channel preferably preserves shape information of the first region.

The first region in the method preferably comprises an eye region and the second region preferably comprises a lip region. The type of the makeup in the first region prior to feeding the first channels of the first region into histogram mapping is preferably different from a type of the makeup in the second region prior to converting the second region of the facial image into color channels. The color channels may comprise a hue channel, a saturation channel, and a value channel.

In a further embodiment, feeding the color channels into histogram matching comprises: providing a dataset of facial images, each without makeup in a corresponding second region of each facial image under different lighting conditions and including pre-defined histograms; and matching a histogram of one or more of the color channels under different lighting conditions with a corresponding one of the pre-defined histograms to obtain the second image. In one embodiment, the color channels are the value and/or saturation channels.

The invention also includes a method for virtually removing facial makeup, comprising: providing a facial image of a user with makeup applied thereto; locating facial landmarks in a region of the facial image of the user; decomposing the region of the facial image into separate channels; and feeding the separate channels of the region into histogram matching to obtain a resultant image with makeup being removed in the region.

In this embodiment, the region of the facial image of the user preferably comprises an eye region. The makeup on the facial image of the user prior to decomposing the image may comprise eye makeup. The separate channels may comprise a reflectance channel and a shading channel. The reflectance channel may comprise material dependent properties of the facial image, and the shading channel may comprise light dependent properties of the facial image. The reflectance channel preferably contains only one color, and the shading channel preferably preserves shape information of the first region.

The invention further includes a method for virtually removing facial makeup, comprising: providing a facial image of a user with makeup applied thereto; locating facial landmarks in a region of the facial image of the user; converting the region of the facial image into color channels; and feeding the color channels into histogram matching under different lighting conditions to obtain a resultant image with makeup being removed in the region.

In this method embodiment, the region of the facial image of the user preferably comprises a lip region. The makeup on the facial image prior to converting the region of the facial image into color channels is also preferably a lipstick or a lip gloss. The color channels may comprise a hue channel, a saturation channel, and a value channel. The step of feeding the color channels into histogram matching may comprise: providing a dataset of facial images without makeup, including pre-defined histograms; and matching a histogram of the color channels under different lighting conditions with a corresponding one of the pre-defined histograms to obtain the second image. In one embodiment hereof, the color channels are the value channel and/or the saturation channel.

In this embodiment, the method may further comprise: collecting a skin color dataset under different lighting conditions having corresponding lip color shifting for such different lighting conditions in comparison to a standard lip color; extracting an input skin color from the image of the user; detecting corresponding lip color shifting of the input skin color under a specific lighting condition; and providing a final revised lip color for use as a removal lip color from the first region of the facial image of the user, wherein the final revised lip color has the detected color shifting.

Also within the scope of the invention is a system for detecting and removing makeup from an input image, where the system is configured to be capable of: receiving an input image from a user interface with makeup applied thereto; locating facial landmarks from the facial image of the user in at least a first region and/or a second region different from the first region, wherein the first region includes makeup and/or the second region includes makeup; if the first region is located, decomposing the first region of the facial image into first channels and feeding the first channels of the first region into histogram matching using a reference histogram from a dataset of histograms of faces each having no makeup to obtain a first image with the makeup removed in the first region and/or if the second region is located, converting the second region of the facial image into color channels and feeding the color channels into histogram matching under different lighting conditions and using a reference histogram from a dataset of histograms of faces under different lighting conditions each having no makeup to obtain a second image with makeup being removed in the second region; and if both the first region and the second region are located, combining the first image and the second image to form a resultant facial image with makeup removed from the first region and the second region.

In one embodiment of a system herein, the system may comprise a controller having a system memory and a system processor, wherein the controller is configured to receive the input image, and to receive and/or to store in the memory the dataset of histograms of faces having no makeup and the dataset of histograms of faces under different lighting conditions, and the system processor is capable of executing programming instructions capable of detecting a facial image and locating facial landmarks. The processor is preferably capable of executing programming instructions for decomposition of the first region of the input image into the first channels and for histogram matching of the first channels of the first region; and wherein the processor is capable of executing programming instructions for converting the second region of the facial image into color channels and histogram matching of the color channels under different lighting conditions.

Also in this embodiment, the user interface may be a smart phone digital camera, a digital camera, a digital video camera, a webcam, or a smart phone digital video camera.

The invention also preferably includes a method for generating an output effect on an input image having a face, comprising: (a) providing a facial image of a user with facial landmarks; (b) locating the facial landmarks from the facial image of the user, wherein the facial landmarks include a first region, and wherein the landmarks associated with the first region are associated with lips of the facial image having a lip color and the first region includes a lip region; (c) converting the lip region of the image into at least one color channel and detecting and analyzing a light distribution of the lip region; (d) feeding the at least one color channel into histogram matching over a varying light distribution to identify a histogram having a pre-defined light distribution that varies from the light distribution of the lip region thereby generating at least one output effect; and (e) combining the output effect with the first image to provide a resultant image having the lip color and the at least one output effect applied to the lip.

In this embodiment, the at least one color channel may comprise a saturation channel and/or a value channel. In this embodiment, prior to the converting step (c), the method may further comprise the step of removing the makeup from the lip region of the facial image of the user. In another embodiment, the facial landmarks may comprise a second and the second region may comprise an eye region. In such an embodiment the method may further comprise: (f) decomposing the eye region of the image into at least one first channel and detecting and analyzing a light distribution of the eye region; (g) feeding the at least one first channel into histogram matching over a varying light distribution to identify a histogram having a pre-defined light distribution that varies from the light distribution of the eye region thereby generating at least one second output effect on the eyes; and (h) combining the resultant first image with the second image and the at least one second output effect to provide a second resultant image having the pre-defined lip color and the at least one first output effect on the lips and the at least one second output effect on the eyes.

In this embodiment, the at least one first channel may comprise one of shading or reflectance. The light distribution of the histogram having the pre-defined light distribution may add transparency and smoothness and the at least one output effect may include a glossy effect. The glossy effect preferably varies by the level of transparency. The light distribution of the histogram having the pre-defined light distribution may add random reflectance and the at least one output effect may include a natural effect. The light distribution of the histogram having the pre-defined light distribution may add transparency and shine and the at least one output effect may include a shiny effect. The light distribution of the histogram having the pre-defined light distribution may add glitter and the at least one output effect may be a glitter effect.

In this embodiment, the steps (d) and (e) may be repeated to create at least one differing output effect on the first image, and each resultant image having one of the at least one differing output effects on the first image would be combined with the first resultant image to provide a final resultant image having the at least one first output effect and each of the at least one differing output effects on the first image.

The method may further comprise, after step (b), calculating an area of the lip region, enlarging the area of the lip region by a predetermined ratio to provide targeted enlarged landmarks, and creating a plumped output effect in addition to the at least one first output effect, and combining and warping the plumped output effect with the at least one first output effect and the first image to provide to the first resultant image having the lip color applied to the lip, the plumped output effect and the at least one first output effect. In such an embodiment, the light distribution of the histogram having the pre-defied light distribution may further add transparency and shine and the at least one first output effect preferably includes a shiny effect, and the resultant image includes a plumped and shiny appearance.

The invention herein further includes a method for generating an output effect on an input image having a face, comprising: (a) providing a facial image of a user with facial landmarks; (b) locating the facial landmarks from the facial image of the user, wherein the facial landmarks include a second region, and wherein the landmarks associated with the second region are associated with eyes of the facial image and the second region includes an eye region; (c) decomposing the eye region of the image into at least one first channel and detecting and analyzing a light distribution of the eye region; (d) feeding the at least one first channel into histogram matching over a varying light distribution to identify a histogram having a pre-defined light distribution that varies from the light distribution of the eye region thereby generating at least one second output effect on the eyes; and (e) combining the first resultant image with the second image and the at least one second output effect to provide a second resultant image having the pre-defined lip color and the at least one first output effect and the at least one second output effect on the eyes.

The invention further comprises a makeup recommendation system, comprising: at least one trained neural network model for providing varying makeup styles; a makeup product database; and a makeup annotation system, wherein the makeup recommendation system is capable of generating personalized step-by-step makeup instructions to a user based on data in the at least one trained neural network annotated by the annotation system and/or recommending products from the makeup product database, and of displaying virtual makeup application in a step-by-step manner to a user based on an input image of the user. The at least one trained model is preferably derived from a deep learning framework. The deep learning framework preferably receives data input one or more of: facial images having selected makeup styles applied thereon; and output ground truth data from a makeup annotation system.

The annotation system preferably annotates facial images having selected makeup styles applied thereon, and the annotated facial images provide training data for the neural network. The makeup styles may be manually selected and annotated. The input image may be a frame from a video of a user. The recommendation system may further comprise at least one virtual makeup tutorial. In one embodiment, the step-by-step instructions may include (a) displaying a first selected color for a first type of makeup and (b) applying the type of makeup in the selected color virtually to a corresponding region of the input image of the user's face. In such an embodiment, steps (a) and (b) may be repeated for at least one further selected color and at least one second type of makeup to create a desired makeup look on the input image of the user based on the data in the recommendation system.

The recommendation system may be modified to further comprise a system for adjusting brightness of the input image, wherein the system for adjusting brightness is configured to estimate a normalized skin color of a face in the input image of the user using a skin color estimator, detecting facial landmarks and assigning different weighted factors to a facial region, an image center region and a border region, calculating an average brightness of the input image and comparing the average brightness with the estimated normalized skin color to generate a correction factor, and applying a curve transform using a polynomial transformation to the input image according to the correction factor.

The invention herein further includes a system for adjusting brightness of an input image useful in a virtual makeup try-on or removal method, the system having software configured to carry out the following steps: estimating a normalized skin color of a face in an input image of a user using a skin color estimator; detecting facial landmarks and assigning weighted factors to a facial region, an image center region and a border region; calculating an average brightness of the input image; comparing the average brightness with the estimated normalized skin color of the face to generate a correction factor; and applying a curve transform using a polynomial transformation to the input image according to the correction factor.

Further within the invention is a system for providing calibrated color, the system configured to carry out the following steps: automatically detecting a color reference chart having color patches thereon in response to an input image of a user received from a device having a digital camera; reading a pixel value for each of the color patches; comparing the detected information from the color reference chart to pixel values of a stored reference color chart captured under a golden standard system; sending a control system to calibrate parameters of the camera so that the input image is modified to meet the golden standard system to maintain color consistency.

In such an embodiment, colors calibrated by the system for providing calibrated color are able to be used for determining a color of an object, determining a color of a product, determining a color of a makeup product applied to a user and evaluating variations in color.

The invention further includes a method for providing a virtual makeup tutorial, comprising: selecting key frames from one or more existing makeup videos; and/or detecting product names in existing makeup videos by detecting product name characters in selected key frames, using character recognition to locate names of products, or locating products by classifiers derived from a trained product classifier assessing products in a product database; summarizing the makeup information from selected key frames and/or detected product names in a makeup tutorial summary; and generating a virtual makeup tutorial based on the makeup tutorial summary.

In the tutorial method, the key frames may be selected by partitioning video data from the one or more existing makeup videos into segments; generating a set of candidate key frames based on frame differences, color histograms and/or camera motion, and selecting final key frames based on a set of criteria and whether a different type of makeup on a prior or next frame.

The invention also includes a method for fast facial detection and landmark tracking, comprising capturing an input image using a two dimensional (2D) camera; creating an image pyramid using differently scaled images; applying histogram of gradient (HOG) features with sliding windows and a supported vector machine (SVM) to find a bounding box of faces on the images of the image pyramid; and using one or more facial landmark detectors based on a global learned descent regularized (GLDR) model to detect a face inside the bounding box if the face is present. The method may further comprise extracting patches and applying landmarks mean-shift fitting to the image to smooth the landmarks data, normalizing the landmark position across the image pyramid; applying a three-layer neural network model as a correctness validation model to filter wrong shapes, and correlating and selecting the final landmarks. The three layers of the neural network are preferably a convolution layer, an up-sample layer and a mapping layer. The method may also comprise steps to reduce lag associated with fast movement and reduce shaking associated with lack of movement, comprising using a point distribution model (PDM) to filter noise from a ground truth dataset and to make the landmarks video more stable.

Also included herein is a method of extracting a lip region from a facial image, comprising: (a) locating a facial region using facial landmarks on an input facial image; (b) using the landmarks to obtain the facial region and removing the non-facial background; (c) applying a Gaussian mixture model based on complexion color using $L^*a^*b^*$ space, wherein each pixel has a color value in $L^*a^*b^*$ space, to a lower part of the input facial image and calculating the probability of each pixel in the part of the input facial image to determine whether it meets or exceeds a base threshold and generating a probability map of a skin region in a part of the facial image where the facial region is to be detected; (d) generating an initial facial region binary image from the probability facial map; (e) using an iterative method to adjust the base threshold to determine a refined binary image; and (f) evaluating the refined binary image in each iteration based on pre-determined criteria to detect the facial region using the refined binary image.

In one embodiment of such a method, the Gaussian mixture model may have three or more components. The threshold may be adjusted by an offset using an array to iteratively refine the base threshold. The pre-determined criteria may include one or more of a ratio of a width and a height of an external rectangle around the facial region; a ratio between the area of the facial region and the area of the external rectangle; and a ratio between the area of the facial region and the area of the part of the facial image. The facial region in one embodiment is a lip region and the part of the facial image is the lower part of the facial image. The method may further comprise using the $L^*a^*b^*$ color space color of pixels in the initial facial region and in a non-facial region in refined Gaussian mixture models; computing a probability map for the initial facial region and the non-facial region; and creating an overall probability map using the Gaussian mixture models for use in detecting the facial region. The various embodiments of the method may further comprise using an edge detection and contouring to smooth the overall probability map.

The invention also includes a method of virtually providing an eye-makeup add-on effect to a facial image, comprising: (a) creating a template for at least one eye makeup feature of an eye, manually annotating landmark points on the template related to the eye makeup feature, and saving locations of the landmark points as a text file; (b) extracting landmarks of an eye region of a facial image using a landmarks detector for the image frame; (c) cropping the eye region of the image to create an image frame based on the landmarks related to the eye makeup feature of the template; (d) generating points by linear interpolation around the eye region from the detected extracted landmarks on the eye region of the image frame; (e) generating points around the template based on the annotated landmarks of the template; (f) applying the template to the image frame by forward warping to create an eye region image frame having the eye makeup feature from the template applied thereon; and (g) cropping the eye region image frame back to the original facial image to create a facial image having the eye makeup feature thereon. In such a method, the eye makeup feature may be selected from an eye shadow feature, a middle eye shadow feature, an eye shadow tail feature, an eye shadow corner feature and an eye lash feature. Step (a) of the method may include creating a template for each of an eye shadow feature, a middle eye shadow feature, an eye shadow tail feature, an eye shadow corner feature and an eye lash feature, and the method may further comprise repeating steps (b) through (g) on a facial image for two or more of the eye features in the templates and combining the two or more features on the facial image to create a combined eye makeup look.

A method of virtually providing a lipstick texture to a facial image is also provided herein and comprises: providing a texture simulator comprising a training module having a deep convolutional neural network structure; processing an input lip region in a pre-process module to modifying the input lip region to have a desired lipstick color and luminance enhancement using the luminance channel of L*a*b* color space for the desired lipstick color and a weighted coverage factor to create an L-channel image having a luminance distribution and simulated dynamic texture, and processing the input image from RGB to L*a*b* space color for the a* and b* channels; feeding the L-channel image from the pre-process module to a mono-channel style transfer module trained on an image dataset using the training module to create a synthesized L-channel image having a synthesized color and texture based on a reference style image in the dataset; and further processing the synthesized L-channel image having the dynamic texture simulation and the a* and b* channel images from the pre-process module for RGB conversion in a post-process module for RGB conversion.

Also within the invention is an embodiment of a system for virtual makeup removal and virtual makeup application using an input image, wherein the system is configured to be capable of: receiving an input image from a user interface with makeup applied thereto; locating facial landmarks from the facial image of the user in at least a first region and/or a second region different from the first region, wherein the first region includes makeup and/or the second region includes makeup; if the first region is located, decomposing the first region of the facial image into first channels and feeding the first channels of the first region into histogram matching using a reference histogram from a dataset of histograms of faces each having no makeup to obtain a first image with the makeup removed in the first region and/or if the second region is located, converting the second region of the facial image into color channels and feeding the color channels into histogram matching under different lighting conditions and using a reference histogram from a dataset of histograms of faces under different lighting conditions each having no makeup to obtain a second image with the makeup removed in the second region; if both the first region and the second region are located, combining the first image and the second image to form a resultant facial image with makeup removed from the first region and the second region; and virtually applying a type of makeup to the first region of the resultant facial image having makeup removed of and/or applying a second type of makeup to the second region of the resultant facial image having makeup removed.

In a related embodiment, the invention includes a method for virtual makeup removal and virtual makeup application using an input image, the method comprising: receiving an input image from a user interface with makeup applied thereto; locating facial landmarks from the facial image of the user in at least a first region and/or a second region different from the first region, wherein the first region includes makeup and/or the second region includes makeup; if the first region is located, decomposing the first region of the facial image into first channels and feeding the first channels of the first region into histogram matching using a reference histogram from a dataset of histograms of faces each having no makeup to obtain a first image with the makeup removed in the first region and/or if the second region is located, converting the second region of the facial image into color channels and feeding the color channels into histogram matching under different lighting conditions and using a reference histogram from a dataset of histograms of faces under different lighting conditions each having no makeup to obtain a second image with the makeup removed in the second region; if both the first region and the second region are located, combining the first image and the second image to form a resultant facial image with makeup removed from the first region and the second region; and virtually applying a type of makeup to the first region of the resultant facial image having makeup removed of and/or applying a second type of makeup to the second region of the resultant facial image having makeup removed.

In the above embodiments of the system and method, the first type of makeup may be a virtual makeup add-on and the second type of makeup may be a virtual lipstick. The system and method are preferably further capable of providing an output end effect to the first type of makeup and/or the second type of makeup and/or providing a simulated texture to the second type of makeup.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise and instrumentalities shown. At least one drawing executed in color is included herein. Copies of this patent or patent application publication with color drawings will be provided by the Office upon request and payment of the necessary fee. In the drawings:

FIG. 27d is an image of an eye corner makeup add-on applied to the image of FIG. 27a using the eye makeup add-on method according to an embodiment herein;

FIG. 27e is an image of an eye tail makeup add-on applied to the image of FIG. 27a using the eye makeup add-on method according to an embodiment herein;

FIG. 27f is an image of an eye lash makeup add-on applied to the image of FIG. 27a using the eye makeup add-on method according to an embodiment herein;

FIG. 28a is a representation of an eye shadow template for use in an embodiment of an eye makeup add-on method herein;

FIG. 28b is a representation of an eye shadow middle template for use in an embodiment of an eye makeup add-on method herein;

FIG. 28c is a representation of an eye shadow corner template for use in an embodiment of an eye makeup add-on method herein;

FIG. 28d is a representation of an eye shadow tail template for use in an embodiment of an eye makeup add-on method herein;

FIG. 28e is a representation of an eye lash template for use in an embodiment of an eye makeup add-on method herein;

DETAILED DESCRIPTION OF THE INVENTION

Figure 2:
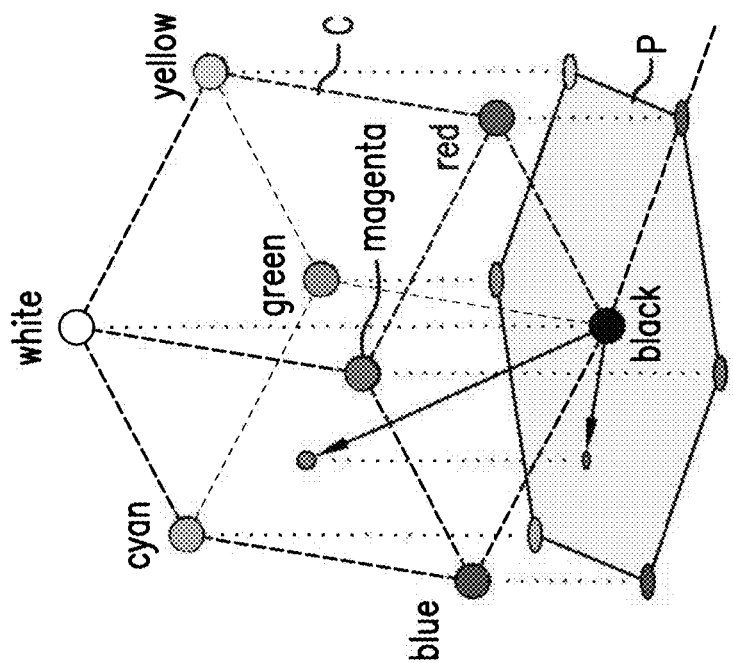
FIG. 2 is a graphical illustration of a tilted RGB cube being projected onto a chromaticity plane.

The following detailed description includes preferred embodiments for carrying out a method of makeup removal and a system for doing the same from an input image of a user so that a makeup try-on program provides consistent and better coloration for a realistic try-on look. Along with the virtual removal method, systems and methods are also provided for the virtual add-on of makeup, and a personalized recommendation of a makeup product(s) based on at least one trained neural network model a makeup database and a makeup annotation system. The recommendation system is capable of generating personalized step-by-step makeup instructions to a user based on products in the makeup product database and the input image from the user. Also included are methods for providing virtual makeup tutorials, and methods for providing virtual output effects to an input image having a face of a user. Such techniques can be used independently or collaboratively as illustrated in the drawings herein and summarized in FIG. 37. Additionally described are methods for adjusting brightness and calibrating color for use in a virtual make-up try-on or virtual removal method, a method for fast facial detection and landmark tracking which may also include a method to reduce lag associated with fast movement and to reduce shaking from lack of movement in input image videos, and an annotation system for use with such methods as are noted above.

As used herein, "makeup" encompasses a single type of makeup or multiple types of makeup in a single location or a single type of makeup or multiple types of makeup located in multiple locations of a facial image, unless otherwise specified to refer to only one type or one location. Also as used herein reference to a "facial image" of a user or of a population of people in a learning or training data includes within its scope both photos and videos of a facial image, and may be an isolated image (such as a single photo or single video frame) or multiple images (such as a repeating photo, entire video or a portion of a video with more than one frame) and, unless otherwise particularly specified, should not be interpreted to be limited to only a photo, only a video or only a single image. It is preferred that photos and videos herein are digital. Such photos or videos may be used as "input images" (II, II') to the methods and systems herein, and can be communicated for use in the methods and systems herein through a user interface, which may be a smart phone digital camera, a digital camera, a digital video camera, a webcam, or a smart phone digital video camera or similar device capable of providing an input image.

Virtual Facial Makeup Simulation for Augmented Personalized Tutorials:

Virtual facial makeup simulation in the present disclosure uses the following technologies: HSV color space or intrinsic decomposition, each with histogram matching. The HSV color space is a well-known alternative model for evaluating color aside from the RGB color model. The RGB model appears as a Cartesian (cube) representation. An HSV color model rearranges the geometry of the RGB model and is typically represented as either a cone or cylinder coordinate representation that is more intuitive and perceptually relevant by better showing color in a manner closer to how it is perceived by humans. "HSV" stands for Hue, Saturation, and Value, and is sometimes referred to HSB (where "B" stands for brightness).

Figure 1:
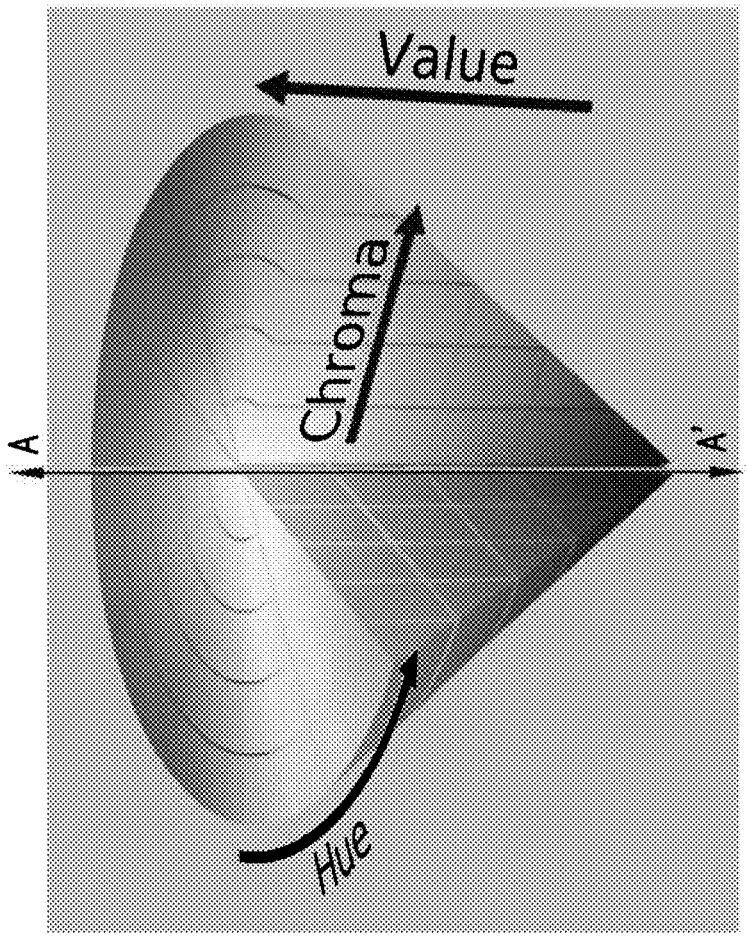
FIG. 1 is a graphical illustration of an exemplary HSV color space showing hue, saturation, and value.

FIG. 1 illustrates an HSV color space. In each HSV representative cylinder as in FIG. 1, "hue" is measured by an angle around the central vertical axis as shown in FIG. 1 by the rotating arrow labeled "Hue." The transverse distance from the axis A-A' of the cylinder in FIG. 1 as shown by the arrow labeled "Chroma" corresponds to "Saturation." The distance measured along the axis A-A' corresponds to "Value," which may also be referred to as "brightness" or "lightness."

With reference to FIG. 1, showing an HSV color space and the definitions of hue, saturation, and value, hue represents the color type, which can be described with reference to its angle range as a portion of the range over the entire circumference from 0 to 360 degrees. The saturation measures the degree to which a color differs from gray scale, namely, the lower the saturation, the more it appears faded or gray. The value represents the level of brightness of the color, with a value of 0 being completely dark and a value of 255 being fully bright.

The HSV model can be derived via geometric strategies. The HSV model can be derived from an RGB cube, having constituent amounts of red, green, and blue in a color designation of R, G, B, which is tilted on its corner, such that "black" rests at the origin with "white" directly above it along the vertical axis. Taking the tilted RGB cube and projecting it onto a "chromaticity plane" perpendicular to the neutral axis, the projection takes the shape of a hexagon, with the colors, red, yellow, green, cyan, blue, and magenta at its corners. FIG. 2 illustrates an RGB tilted cube C projected onto a chromaticity plane P.

Hue is measured roughly as the angle of the vector to a point in the projection, while chroma is roughly the distance of the point from the origin. Then, value is defined as the largest component of a color. Saturation is therefore defined as chroma relative to the lightness. Mathematically, the conversion formula to convert to a hue, saturation, and value color space from RGB is written below for example in formula (1a):

$$H' = \begin{cases} \text{undefined}, & \text{if } C = 0 \\ \frac{G-B}{C} \mod 6 & \text{if } C_{max} = R \\ \frac{B-R}{C} + 2 & \text{if } C_{max} = G \\ \frac{R-G}{C} + 4 & \text{if } C_{max} = B \end{cases} \quad (1a)$$

$$H = 60° \times H'$$

$$V = C_{max}$$

$$S = \begin{cases} 0 & \text{if } V \text{ is } 0 \\ \frac{C}{V} & \text{otherwise} \end{cases}$$

where $C_{max} = \max(R, G, B)$, $C_{min} = \min(R, G, B)$, and $C = C_{max} - C_{min}$ In addition to use of the HSV color space, the present invention employs histogram matching. In image processing, histogram matching or histogram specification is the transformation or conversion of one image so that its histogram matches against a specified or reference histogram. The well-known histogram equalization method is a special case in which the specified or reference histogram is uniformly distributed. Mathematically, given two images in gray scale (i.e., an input image and a reference image) and their respective histograms, one can calculate the cumulative distribution of each histogram: $F_1(\ )$ for the input image histogram and $F_2(\ )$ for the reference image histogram. For each gray level, $G_1 \in [0,255]$, one can find the gray level $G_2$ for which $F_1(G_1) = F_2(G_2)$. This is the result of histogram matching function: $M(G_1) = G_2$. Finally, the function $M(\ )$ can be applied on each pixel of the input image.

Also as noted above, in addition to HSV color space and histogram matching, the invention employs intrinsic decomposition. The task of recovering intrinsic images is to decompose a given input image into separate components of its material-dependent properties, typically, reflectance, and its light dependent properties, such as illumination or shading. Taking the eye region image as an example, the entire face skin, not including eyebrow or eyelash, can be considered as having almost the same material and color. Ideally, the reflectance component should contain only one color in a naked face while containing all the makeup color information after applying cosmetics. On the contrary, the shading component or channel preserves the shape information of the face and eye and does not change much whether makeup is applied or not, as the face retains its basic shape in the same image. Intrinsic decomposition is the ability to separate these components so that an initial image can be reconstructed based on separated components.

A notation is first specified here before introducing the energy function in detail. For a given image I, two components need to be identified: reflectance R and shading s such that $I = s \times R$. $I_i$, $R_i$ and $s_i$ each represent respectively the pixel values at a location i of each of the above three components separately, where $I_i$ and $R_i$ are three-dimensional vectors with dimension 3, and $s_i$ is a vector with dimension 1. Since the relationship, $I_i = s_i \times R_i$, has to hold for all color channels (R,G,B), the direction of $R_i$ is already known, i.e., $R_i$ can be rewritten as $R_i = r_i \vec{R_i}$, with $\vec{R_i} = I_i / \|I_i\|$, leaving $r = (r_1, \ldots, r_N)$ to be the only unknown variable to solve. Here, $I_i / \|I_i\|$ is the direction of $R_i$, and $r = (r_1, \ldots r_N)$ is the amplitude of $R_i$ in its direction. Since R represents a three-dimensional vector, this formula transfers R into a single-dimensional vector r. In the following portion, r may represent R, because once r is obtained, R will also be known by multiplying r by its direction, $I_i / \|I_i\|$. Thus, the optimization problem is reduced to a search of N variables, where N is the total number of pixels in image I. The shading components can be computed using $s_i = \|I_i\| / r_i$.

The energy function herein is written based on two terms (priors) as set forth below (i.e., a shading prior ($E_s$) and a Global Sparse Reflectance prior ($E_{cl}$), and those priors, i.e., the two components, will be described in detail below. As noted above, $I_i / \|I_i\|$ is the direction of $R_i$, $r = (r_1, \ldots, r_N)$ is the amplitude of $R_i$ in its direction. Since R represents a three-dimensional vector, the formula transfers R into a single-dimensional vector r. In the following energy function expression, r is used to represent R, because once r is obtained as noted above, R is known by multiplying r by R's direction, $I_i / \|I_i\|$.

In the following expression, $\alpha = (\alpha_1, \alpha_2, \alpha_3, \ldots, \alpha_N)$ for each $\alpha_i$ represents the cluster membership number of a pixel, i, and $\alpha_i$ is from 1 to C. For example, if we set the cluster number as 5, then each pixel will be denoted by a cluster membership number from 1 to 5.

The energy function is preferably expressed as a function of the shading prior ($E_s$) and the global sparse reflectance prior ($E_{cl}$):

$$\min_{r_i, \alpha_i; i=1,\ldots,n} w_s E_s(r) + w_{cl} E_{cl}(r, \alpha). \tag{2a}$$

A. Shading Prior ($E_s$): The shading of an image is expected herein to vary smoothly over the image and is encoded in the following pairwise factors:

$$E_s(r) = \sum_{i \sim j} (r_i^{-1} \|I_i\| - r_j^{-1} \|I_j\|)^2, \tag{3a}$$

wherein a 4-connected pixel graph is used to encode the neighborhood relation which is denoted within i~j. In this evaluation, a pixel, Q, is interpreted to be a 4-neighbor of a given pixel, P, if Q and P share an edge. The 4-neighbors of pixel P (namely pixels P2, P4, P6 and P8) are shown in representative form in FIG. 20. For each pixel, P, we can calculate the above pairwise value $E_s(r)$ between its 4-neighbors. The 4-connected pixel graph will be an image size matrix with each pixel having the value of the sum of its 4-neighbors' pairwise value. For example, the value of pixel P will be $E_s(P, P_2) + E_s(P, P_4) + E_s(P, P_6) + E_s(P, P_8)$ B. Global Sparse Reflectance Prior ($E_{cl}$): This term is included and acts as a global potential on reflectance, and further favors the decomposition into a few reflectance clusters. Assuming there are C different reflectance clusters, each of which is denoted by $\alpha_i \in \{1, \ldots C\}$, every reflectance pixel belongs to one of the clusters and is denoted by its cluster membership using the variable $\alpha_i$, wherein $\alpha_i \in \{1, \ldots C\}$. This is summarized in the following energy term, wherein r and i are as defined above:

$$E_{cl}(r, \alpha) = \sum_{i=1}^{n} \left( r_i \vec{R_i} - \tilde{R}_{\alpha i} \right)^2 \tag{4a}$$

Here, both continuous r and discrete $\alpha$ variables are mixed. This represents a global potential, since the cluster means depend on the assignment of all pixels in the image. For a fixed $\alpha$, this term is convex in r, and for a fixed r, the optimum of $\alpha$ is a simple assignment problem. The means of the reflectance clusters, $\tilde{R}_c$, are optimally determined given r and $\alpha$ as follows:

$$\tilde{R}_c = \frac{1}{|\{i : \alpha_i = c\}|} \sum_{i : \alpha_i = c} r_i \vec{R_i} \tag{5a}$$

In one embodiment, the present disclosure uses the above noted techniques and provides an intrinsic image decomposition or HSV color channel conversion, and histogram matching-based framework, for virtual makeup removal from the eye region and the mouth region, respectively. Typically, when customers shop at a cosmetic store, they apply makeup on their faces in most circumstances. With the system of the present disclosure, a customer does not need to remove their makeup in order to try on new makeup. Instead, the customer can virtually remove their makeup and virtually try on new makeup using computer-enhanced, synthetic image technology.

Figure 3:
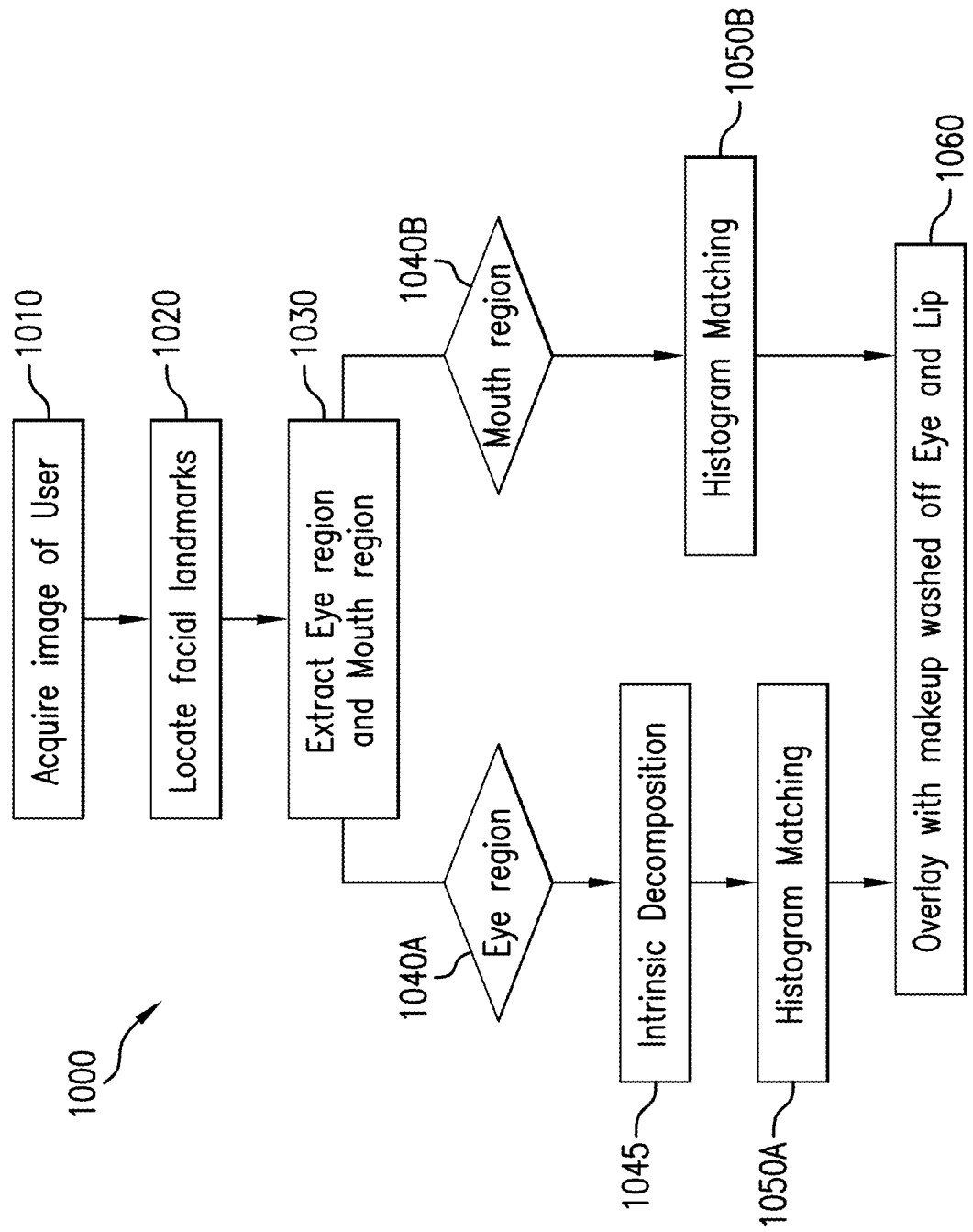
FIG. 3 is a flow diagram of a method for virtually removing makeup in accordance with an embodiment of the present disclosure.

FIG. 3 shows a flow diagram of a method for virtually removing makeup in accordance with an embodiment of the present disclosure, generally referred to as embodiment 1000. Referring to FIG. 3, in Step 1010, an input is acquired by a user. The user input can be any facial image as that term is defined herein, including a single image, a repeat photo, a single video frame or a video having multiple frames, captured by the user using a mobile device or uploaded to the system of the present disclosure. Once acquired, the facial image is detected or identified from the user input. It is preferred that in the removal method, only one image is input, and that the face is detected once the image is uploaded, however, the invention is not limited to only one image input.

Upon detection of the face of the image, in Step 1020, the facial landmarks are located using the input image. Landmarks can be preset and selected such as top of the chin, outside edge of each eye, inner edge of each eyebrow, and the like. Such landmarks are common to all faces and so are detected and evaluated using precise localization of their fiducial points (e.g. nose tip, mouth and eye corners) in color images of face foregrounds.

In Step 1030, e.g., a landmark detection algorithm may be utilized to locate the fiducial points of the landmarks, through which one can then extract the mouth region and eye region images. A suitable landmark detection software and associated training sets useful herein for this purpose may be found at OpenCV (i.e., opencv.org). Additional software and facial recognition processes such as those of dlib landmark detection (see, http://dlib.net/face_landmark_detection.py.html) and Giaran, Inc. landmark detection may also be used. Many suitable commercial and open-source software exists for facial detection, such as Python, dlib and HOG, as well as for landmark detection and identification of fiducial points, such as that described by V. Kazemi et al., "One Millisecond Face Alignment with an Ensemble of Regression Trees," KTH, Royal Institute of Technology, Computer Vision and Active Perception Lab, Stockholm, Sweden (2014). Preferred for use herein is Giaran, Inc. software.

While various regions and fiducial points may be used in the method and system herein, for purposes of explaining a preferred embodiment illustrating a first and/or second region to be extracted and one of such regions intrinsically decomposed, the following example illustrates such steps using the eye and mouth regions as follows. For the eye region 1040A, for example, an intrinsic image decomposition technique is utilized in Step 1045 to recover the shading and reflectance channels of the eye region. Then, in Step 1050A, the shading channel and reflectance channel are fed into histogram matching separately to get an image with the makeup removed in the eye region. For the lip/mouth region 1040B, for example, an image is first transferred, i.e., converted, to HSV color channels, and different histogram matching procedures are applied to the H, S, V channels separately with regard to different lighting conditions. For lip color removal, specific reference histograms of "saturation" and "value" were learned from a collected dataset of facial images without makeup on the lips. With those predefined lip histograms, an input lip makeup could be removed by matching the detected lip histogram to a corresponding one having no makeup. For the lip channel, the "hue" channel is used as the lip region which usually has only one value so that one need not use a histogram to represent it, and the procedure for "hue" channel is set as the value of the "hue" channel for each pixel compared to a pre-trained color value.

In Step 1050B, the different H, S, and V channels are fed into histogram matching or pixel matching as appropriate. The channels are fed separately to get an image with the makeup removed in the lip/mouth region.

In Step 1060, the images resulting from Steps 1050A and 1050B are combined by overlaying one over the other so as to form an image with any facial makeup being removed from the lip region and the eye region. If more regions were analyzed using these techniques they could also be overlaid on these regions.

For the eye region 1040A, two priors' terms are combined to form an energy function. By solving the energy function, one can find the optimized decomposition of reflectance and shading images. The two priors provide smoothing constraints on the shading channel and the reflectance channel. The shading of an image can then vary smoothly over the image, wherein a 4-connected pixel graph is used to encode the neighborhood relation. The later global sparse reflection prior term constrains the number of color clusters existing in the reflectance image. It allows for a mixture of different material reflectance, thereby keeping the diversity of any possible makeup color(s) and, mathematically, the clusters.

In the system and method of the present disclosure, following along with the same embodiment, the lip region image is converted into HSV color space. From experimentation, the inventors herein observed that: the "hue" channel usually changes when the lighting condition has changed or light lipsticks are applied; the "saturation" channel changes when red lipsticks are applied; and the "value" or "brightness" changes when a purple or darker color is applied. Based on these observations, one can edit the corresponding channels with different colors of lipsticks when detected. For lip color removal, the specific reference histogram of "saturation" and "value" can be learned from a collected non-makeup lip dataset. With those predefined lip histograms, an input lip makeup can be removed by matching the detected lip histogram to a corresponding non-makeup histogram. Note that for the "hue" channel, the lip region usually only has one value and does not need to be represented by a histogram.

Note that a lip appears differently under different lighting conditions. Therefore, the system of the present disclosure takes the lighting condition into consideration to provide a more realistic removal color prediction. For use in lip removal, a skin color dataset is collected under different lighting conditions with corresponding lip color shifting compared with a standard lip color. With this dataset, the system of the present disclosure first extracts the input skin color and finds the corresponding lip color shifting under this specific lighting condition. Then, the final revised removal lip color is provided with the detected color shifting. A skin color dataset is not needed for other removal areas, but is collected for guidance in lip makeup removal. Absent the dataset, a predefined color may also be used to detect the lip.

For the removal of eye region makeup, the situation is much more complicated than the lip region, which usually has only one unified color. Therefore, for the eye region, the intrinsic image decomposition technique is introduced to first separate the intrinsic color information and the shading information caused by shape and lighting. After the reflectance and shading images are obtained, the histogram matching technique is applied to remove the makeup. The reference histograms for the eye region are generated differently than those for the lip region. For the eye region, the reference histograms are obtained by filtering the extracted histograms based on certain criteria. The assumption is that the makeup color of any eye makeup (eye shadow, eye liner, mascara) should be different from the skin color and is considered to be a minority part compared to the eye region's skin color. Therefore, a threshold is set for each color and its percentage amount. The threshold is a scale used to determine potential makeup color, since the assumption is that the makeup color is the minority color compared to the skin color, so the threshold is applied to find a small amount of a color.

In one embodiment, the system of the present disclosure can be summarized in accordance with the pseudo code as shown in Appendix A, incorporated herein as a suitable code for actuating this aspect of the invention. Each Appendix herein is part of the specification hereof, but separated from the primary text for easier reading and understanding of the text.

Figure 6A:
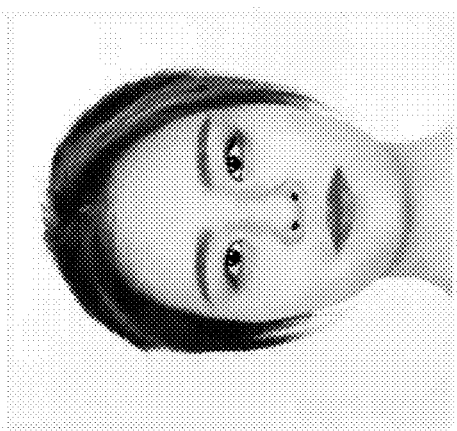
FIGS. 6A and 6B illustrate examples of makeup removal at the eye region in accordance with an embodiment of the present disclosure.
Figure 6B:
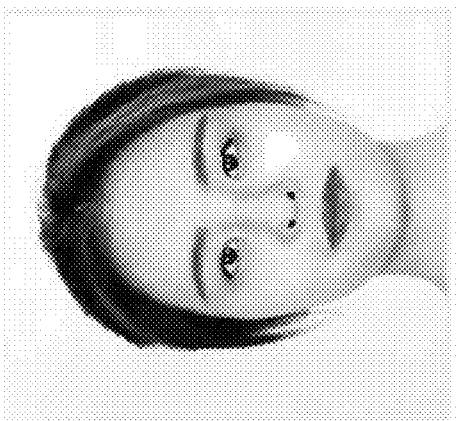
Figure 5A:
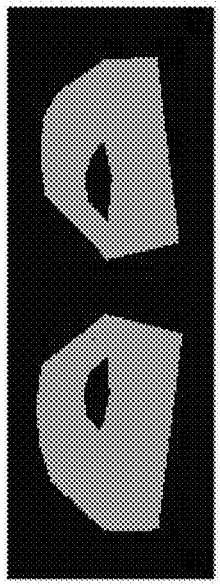
FIGS. 5A and 5B respectively illustrate a makeup-removed, reflectance image and a shading image in accordance with an embodiment of the present disclosure.
Figure 5B:
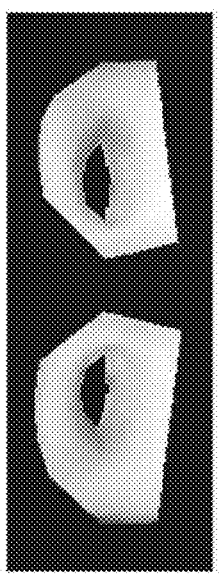
Figure 5C:
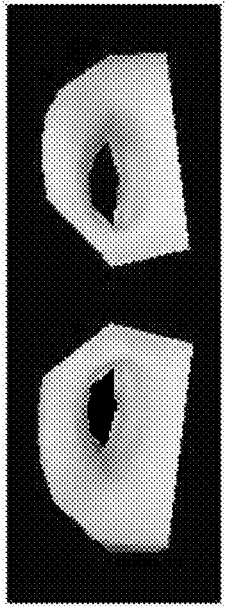
FIG. 5C illustrates the result of multiplying the makeup-removed, reflectance image and the shading image, respectively shown in FIGS. 5A and 5B.
Figure 4A:
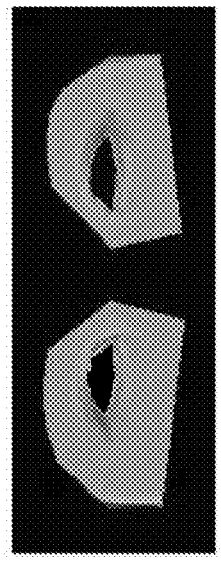
FIGS. 4A and 4B respectively illustrate a decomposed reflectance image and a shading image in accordance with an embodiment of the present disclosure.
Figure 4B:
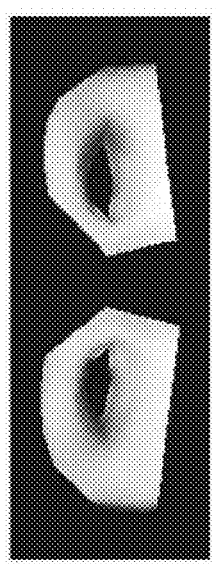

FIGS. 4A and 4B illustrate examples of a decomposed reflectance image (FIG. 4A) and a decomposed shading image (FIG. 4B). The reflectance image in FIG. 4A is a three-channel RGB image containing color information of cosmetics, while the shading image is a gray image. Then, the two decomposed images are both applied with histogram matching to get the removed images. FIGS. 5A and 5B illustrate an example of a makeup removed reflectance image (FIG. 5A) and a makeup removed shading image (FIG. 5B). The two images in FIGS. 5A and 5B are then multiplied (overlaid) to produce the removed eye region image, as shown in FIG. 5C. FIGS. 6A and 6B illustrate examples of makeup removal at the eye region. An overlay involves multiplying two layer color values in each pixel.

In another embodiment herein, landmark detection techniques which use landmarks for facial feature extraction, and particularly preferred for use with lip region extraction, are enhanced to take into account situations wherein an input image may include difficult to detect facial regions, particularly lips such as those having lip gestures (puckered kiss face or a large distorted smile) or lips having occlusions within the lip region (finger tips, teeth, tongue or any object cover the lips). In such situations use of only landmarks does not typically provide an accurate facial region, such as an accurate lip region. The present embodiment utilizes color information to further improve landmark detection results to obtain and detect an optimal facial region, such as a preferred optimal lip region. The following method will be illustrated with respect to the lip region, but it should be understood that it may be employed for other facial regions by analogy.

In general, the color difference between the lip region and the facial skin background varies substantially and may also vary more or less for different people having different coloring. Thus, it is necessary to propose a lip segmentation method to adapt to various color differences.

The present invention thus employs a Gaussian mixture model (GMM) technique. GMMs are probabilistic models for representing normally distributed subpopulations within an overall population. Mixture models in general do not require knowing to which subpopulation a data point belongs, thereby allowing the model to learn the subpopulations automatically.

A GMM is parameterized by two types of values: the mixture component weights, and the component means and variances/covariances. For a GMM with K components, the $k^{th}$ component has a mean of $\mu_k$ and variance of $\sigma_k$. The mixture component weights are defined as $\phi_k$ for component $C_k$, with the constraint that $\Sigma^k_{(i=1)}\phi_k=1$ so that the total probability distribution normalizes to 1.

In this invention, a method to extract a lip region from a facial image is provided that is based on a GMM color model. This method can be used in a makeup removal method for replacing a colored lip with a plain lip or in a makeup add-on method to remove an existing lip region and replace it with another colored lip region. The goal of this method is to refine the lip region based on a landmark parsing result, since in many cases a landmark detection may not provide a true lip region, particularly based on distortion or occlusion.

Figures 20, 21:
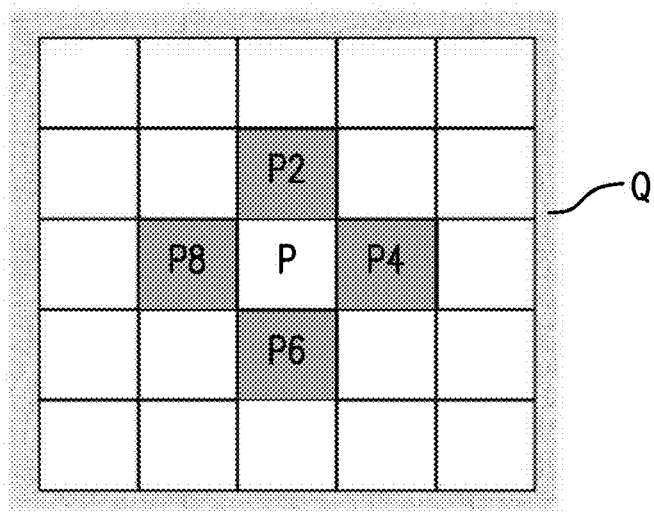
FIG. 20 is an illustration of a representative pixel Q as a pixel 4-neighbor of a pixel P for use in evaluating a shading prior.
FIG. 21 is a representation of a landmarks protocol for a facial image for use in embodiments of the invention herein that employ use of landmarks location for feature detection including for use in a method of enhance feature extraction using a Gaussian mixture method (GMM)
Figure 22:
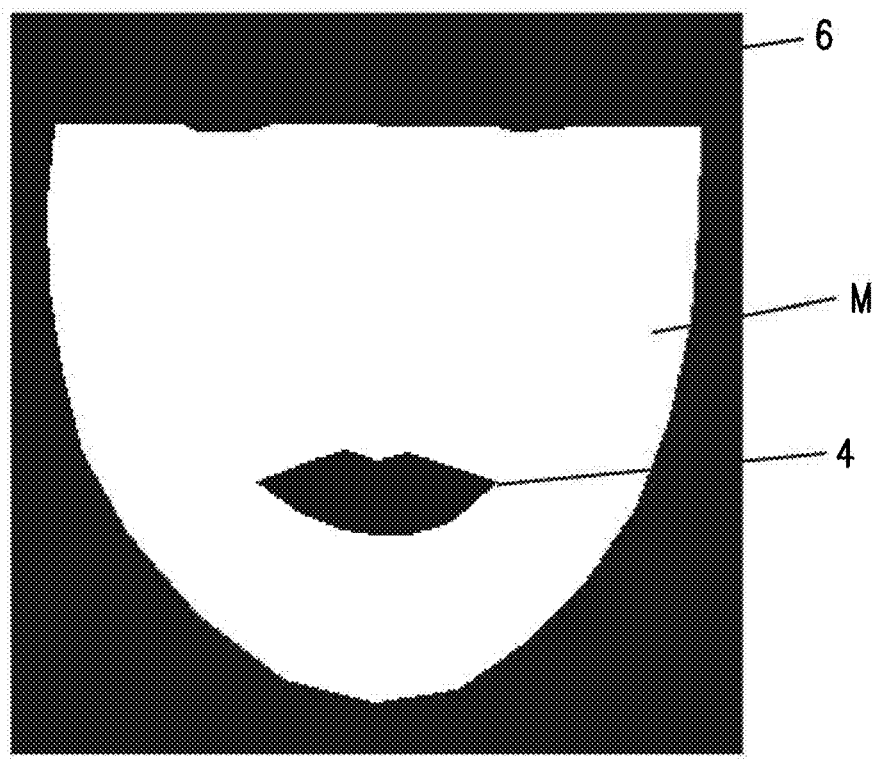
FIG. 22 is a facial mask representation illustrating a part of a facial image having an area therein of a facial region of interest containing a facial feature, wherein the facial feature is detected by landmarks and the non-facial background removed.

The method first employs a facial landmark detection to detect the face region and facial landmarks from the input image as noted herein. This is shown in FIG. 21. As shown, numbers are assigned to mark all facial landmarks in a landmark protocol 2. From this, the facial region that is of interest 4 as shown in FIG. 22 is obtained (in this example, the lip region) and the non-face background 6 is removed to build a GMM model, see facial mask M in FIG. 22. The accuracy of removing the non-face background has little effect on obtaining the final lip segmentation result. Here L*a*b* color space is selected due to its persistency with human perception. The number of components in the GMM model is set to three (3) based on the inventors' empirical study, although other values such as 4, 5, 6, etc. may be used without significantly changing the effects such that the invention should not be deemed to be limited to a GMM with 3 components.

Figure 23:
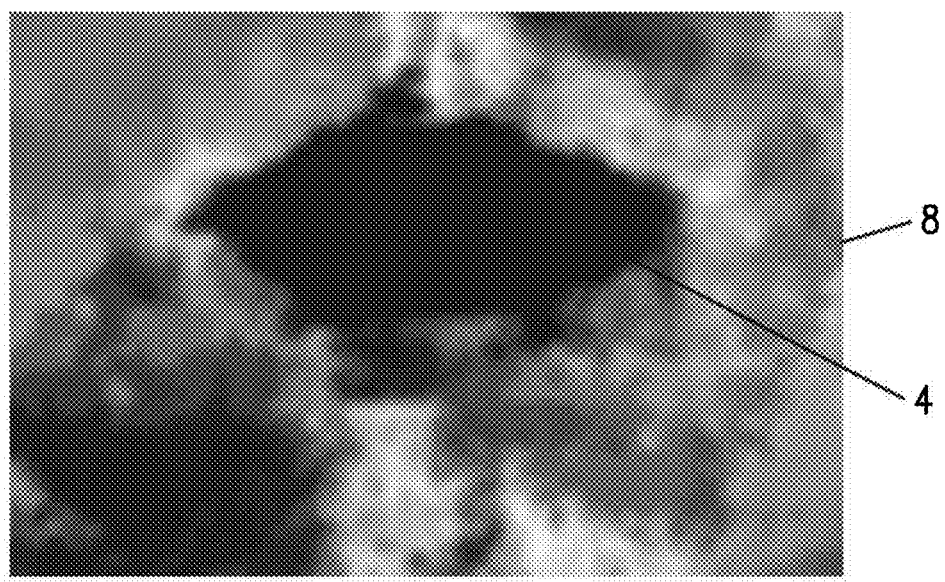
FIG. 23 is an example of a probability map generated using GMM on the facial region of interest in FIG. 22.

The complexion GMM was constructed in the L*a*b* color space. For each pixel, i, in a lower part of the face three is a given color value, $x_i=(L_i, a_i, b_i)$, and a 3-dimensional L*a*b* color value, such that its complexion probability generated from the complexion mixture model is computed as follows:

$$p(x_i) = \sum_{k=1}^{3} \pi_k \frac{1}{(2\pi)^{\frac{3}{2}}|\sigma_k|^{\frac{1}{2}}} \times \exp\left\{-\frac{1}{2}(x_i - \mu_k)^T \sigma_k^{-1}(x_i - \mu_k)\right\},$$

wherein $\pi_k$, $\mu_k$, $\sigma_k$ represent the weight, mean and covariance of the $k^{th}$ Gaussian component in the mixture model, respectively. This is used to generate a probability map 8 of the relevant skin region 4 as shown in FIG. 23. The probability map of the skin region shows that a darker color indicates a lower probability that the darker color is the skin, and a higher probability the darker portions represent the lip region. After obtaining the probability map, an iterative threshold method is employed to get an initial lip binary image. One such iterative threshold method employed that is preferred is that of Nobuyuki Otsu as described in N. Otsu, "A threshold selection method from gray-level histograms," IEEE Transactions On Systems, Man, And Cybernetics, 9.1 (1979), pp. 62-66, incorporated herein in relevant part.

In traditional lip detection methods, normally a fixed threshold is used to estimate which pixels belong to the lip region or are outside the lip region. However, the color difference between the lip and the facial skin background around the lip can vary significantly for different people. Further, in some cases, the difference between the lip and surrounding skin region can be slight. This problem is addressed herein by the iterative detection method. First, the threshold method, such as Otsu's method, is used to find a base threshold, and based on that base threshold, an array of offset is used to tune the base threshold, wherein:

Offset={0, 0.05, 0.10, 0.15, 0.18, 0.2, 0.22, 0.24, 0.25, 0.26, 0.27, 0.28, 0.29, 0.30, 0.31, 0.32, 0.33, 0.34, 0.35, 0.36, 0.37, 0.38, 0.39, 0.4, 0.5}.

The applied threshold will be the difference between the base threshold less the offset.

Figure 24:
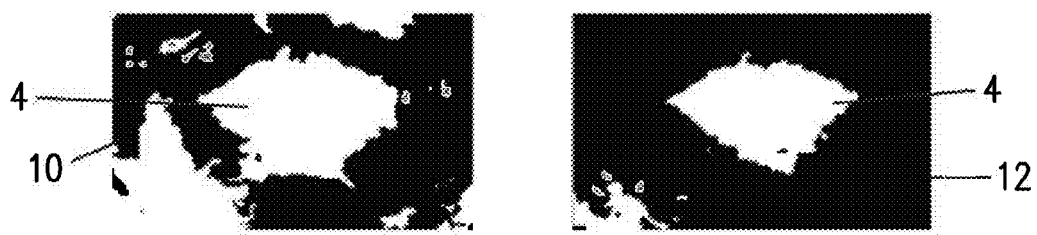
FIG. 24 includes examples of binary images created by employing different thresholds to a probability map created as in FIG. 23.

Each pixel larger then threshold number is set to 0, and otherwise would be 255. Therefore, as the threshold gets larger, less pixels will be preserved, and others will be 0. By applying different thresholding, different binary images 10, 12 are obtained for the facial region 4 as shown in the two images in FIG. 24 taken from a probability map as in FIG. 23.

For each iteration, the produced binary image was used to detect the lip region based on some prior knowledge about the lip and was used to develop the following standard:
1. The ratio between the width and the height of an external rectangle of the lip region has a specific range. That external rectangle is based on the minimal rectangle which could include all of the white region after the binarization described above. The ratio between the width and the height is set to between about 0.7 to about 10.
2. The ratio between the lip region area and its external rectangle has a specific range. The lip region area is the white region after the above-noted binarization procedure. For example, in FIG. 24, the white region in each image defines the detected lip region area. The external rectangle is the minimal rectangle shown which is able to include all of the white region. The ratio of the lip region area/to the area of the rectangle is set to at about 0.3 to about 0.9.
3. The ratio between the lip region area and the area of the lower part of the face has a specific range. As shown in the landmarks indicated in FIG. 21, once the facial landmarks are detected, then the lower face region may be defined as running from the lower points (point 7; point 10) up to point 34 and running from point 4 to point 14. For example, in evaluating the binary images of FIG. 24, the relevant image region would be the lower face region as determined by the landmarks. The ratio of the lip region area to the area of the lower face region is about 0.1 to about 0.5.

Figures 25A, 25B:
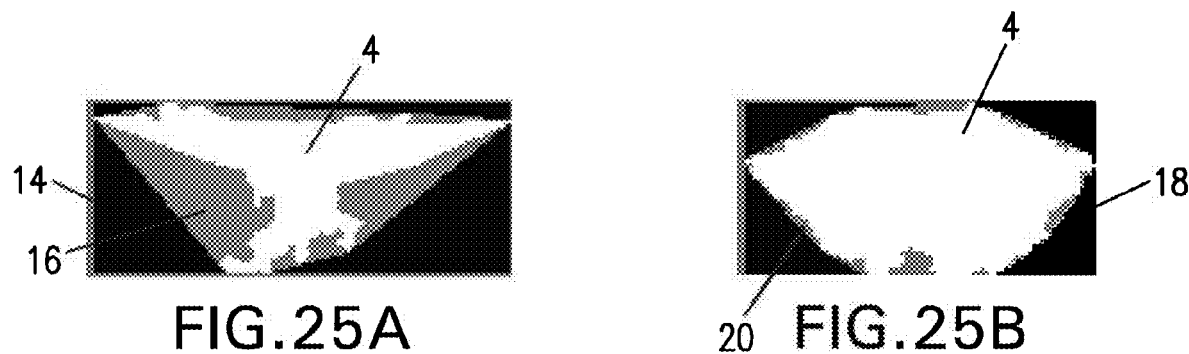
FIG. 25a and FIG. 25b are respectively, rejectable and acceptable binary images using different iterative thresholds when evaluated against developed criteria for evaluating the binary images including formation of a convex hull.

In evaluating the above parameters, the center position of the lip region should be within a specific area of the lower face, the boundary of the lip region should not reach the boundary of the lower face, and the lip region area 4 should be almost a convex hull as described with reference to FIGS. 25a and 25b. In evaluating FIG. 25a, an image 14 of lip region 4 is shown wherein the gray area 16 does not form a convex hull in the white region, such an image would be rejected as not convex. FIG. 25b provides an image 18 that has a gray area 20 would be accepted as forming a convex hull from the white area.

The iterative method is used to detect the lip region using the complexion probability map of the lower part of the face. In each iteration, more offset is added on the base threshold until the binary image contains a contour region that satisfies the above criteria and has the convex hull configuration for the white region. Once such criteria are met, the detected region is considered to be the initial lip region.

Figure 26:
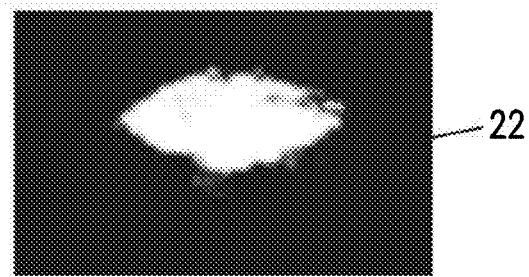
FIG. 26 is an example of an overall probability map used to refine a probability map of a facial region of interest using a GMM-based method, by using a refined GMM-based method to detect a facial feature, wherein a GMM is created for the foreground having the facial feature and the background (non-facial feature) regions and the probabilities of the two GMMs are used to determine an overall probability.

Normally, the initial lip region is not an optimal image. It may contain some skin pixels in the lip, and some lip pixels may also wrongly be eliminated from the initial lip. To further resolve the problem and refine the lip, an optimization method is used. Specifically, in the L*a*b* color space, the color of the pixels in the initial lip and non-lip regions are used to build refined GMMs, respectively. The number of the component in each GMM is set to 3. We use the two GMMs to compute the background probability map, and foreground probability map. The overall probability map for the lip region will be $$p(x_i) = \frac{p(x_i | \text{lip})}{p(x_i | \text{non\_lip}) + p(x_i | \text{lip})},$$

wherein $p(x_i|\text{lip})$ and $p(x_i|\text{non\_lip})$ are the corresponding probabilities computed from the two GMMs. An overall lip region probability map 22 obtained in this method is shown in FIG. 26.

After obtaining the overall lip region probability map, Canny edge detection and contour smoothness is used to get the final lip region mask. This technique is known and described in J. Canny, "A computational approach to edge detection," Readings in Computer Vision, (1987), pp. 184-203, which is incorporated herein by reference in relevant part.

After Canny edge detection, there are many edge candidates. As a result, prior knowledge of the lip region is used to filter the final edge line. Specifically, first a left and a right corner of mouth are found by selecting the most left and right points of the white region. Then, between the left and right corner, and for each column of pixels, the image region is scanned from top down and two pixels are selected with the largest gradient as the final edge pixel for upper lip line and the lower lip line respectively. When scanning the column of pixels, the prior restriction applies that each adjacent point should be within a small vertical range (for example within about −5 to about +5 pixels), so that the final edge will be smooth. An algorithm for this method is of color-based lip mask extraction as discussed above is expressed in pseudo code in Appendix B.

Figure 26A:
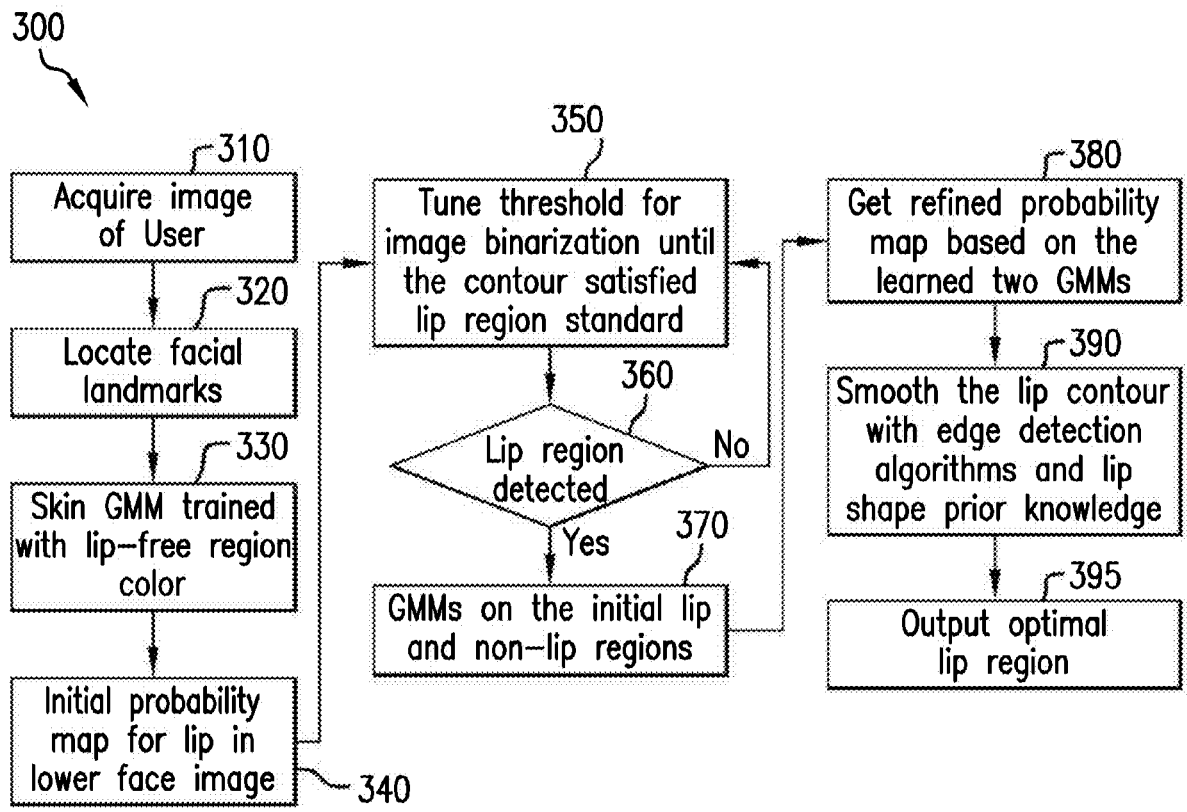
FIG. 26a is a flowchart illustrating preferred steps for use in an embodiment of the refined GMM-based method associated with FIG. 26.

The method is illustrated in the flowchart of FIG. 26a herein as embodiment 300. In the method, the image of a user is acquired in Step 310. Facial landmarks are detected as described herein in Step 320. A GMM based on the skin color is then trained using data from a lip-free region in Step 330, and in Step 340, an initial probability map is created for the lip in the lower face as described above. In Step 350, the threshold for the image binarization is tuned until the contour satisfies the lip region standard criteria as described above. If a lip region is detected, then GMMs are trained for the initial lip and non-lip regions in Step 370. If a lip region is not detected, then the threshold continues to be tuned to meet the criteria. After Step 370, refined probability maps are created based on the two learned GMMs in Step 380. In Step 390, the lip contour is then smoothed with an edge detection algorithms and lip shape prior knowledge. Finally, the optimal lip region is extracted as an output in Step 395.

Texture Generation for Lip Products and Output Effects

In one embodiment, the present disclosure provides methods for providing various output effects to a facial image. The methods provide output effects in the form of dynamic texture generation which is directed to a texture add-on methodology applicable to various types of products, including lipstick products, such as, lip gloss, lip plumper, lipstick, etc. For example, four different effect generators and output effects are possible and included herein, including shining, glittering, random lighting, and plumping. Numerous other output effects in the form of texture variations may be generated by tuning parameters and combining them.

Cosmetics companies offer lipstick products with various colors and textures. Some of these companies provide virtual try-on solutions on their websites to help customers to check the color of the products. For example, Sephora™'s Virtual Artist, which is one of the biggest virtual try-on services, allows people to try on over hundreds of lipsticks with click of a mouse, and the users also can simply click shop to add their choice picks to their shopping cart.

Existing virtual try-on systems generally provide only color results, even though the cosmetic products have different textures, such as, glossy, moisturized, matte, etc. There are some approaches that generate shine effects on the lip, but such approaches typically only apply a pre-defined mask which is unable to adapt to light changes.

The texture generation technique of the present disclosure includes four methods to generate different textures. First the method generates a glossy effect. It detects light distribution of the lip and applies smoothness and transparency. Additionally, it creates random reflections so that this effect looks even more natural. Also, a shining effect can be generated for products that have moisturized, shimmer, or satin texture with different parameters. Specifically, less transparency is used while keeping the original texture of the user's lip when applying less glossy effect. Since this method uses light distribution from the input image, the generated texture changes depend on the light, which is a differentiating factor from existing methods.

Figure 7:
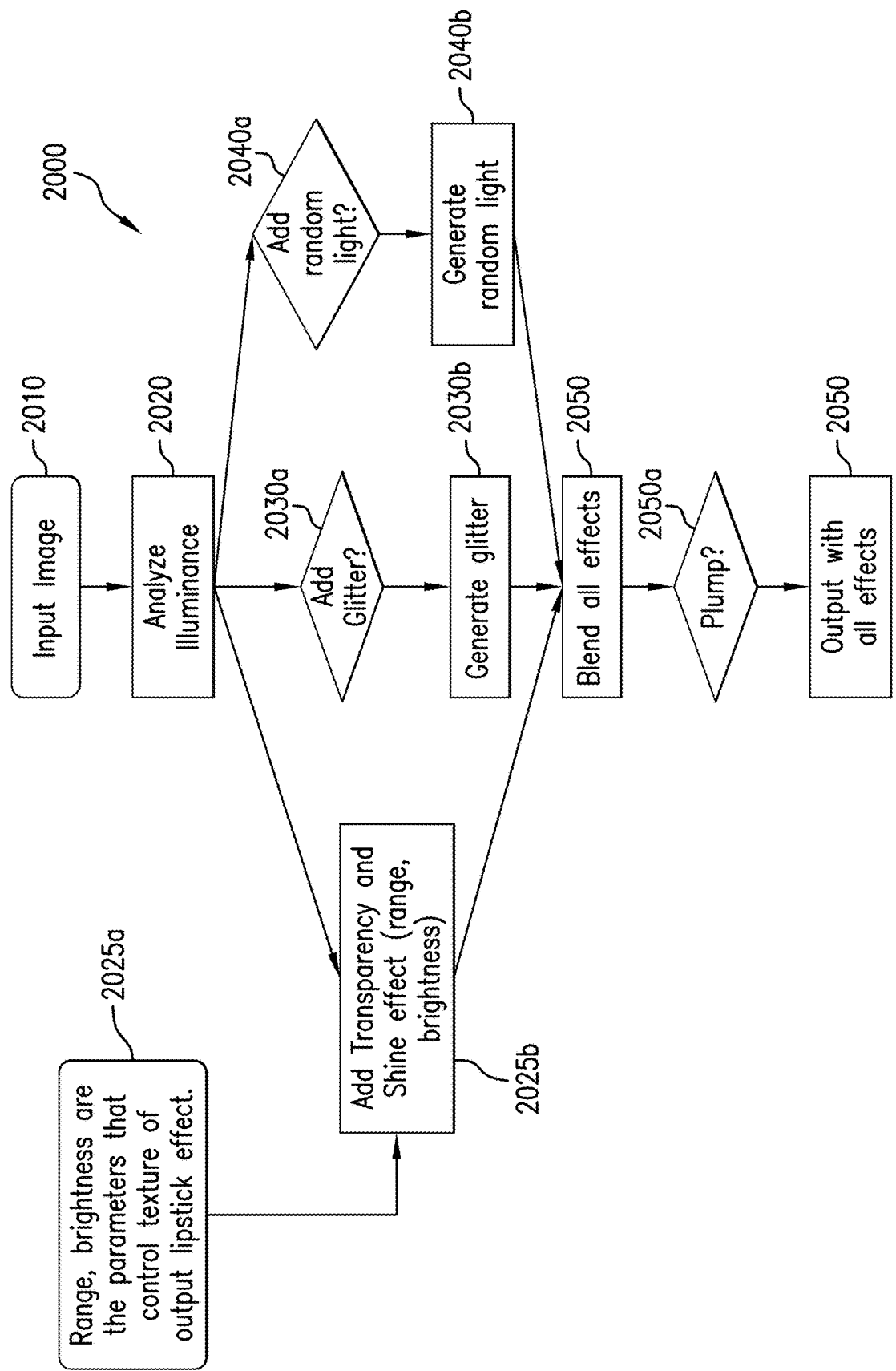
FIG. 7 is a block, flow diagram for a lipstick texture generator in accordance with an embodiment of the present disclosure.
Figure 8:
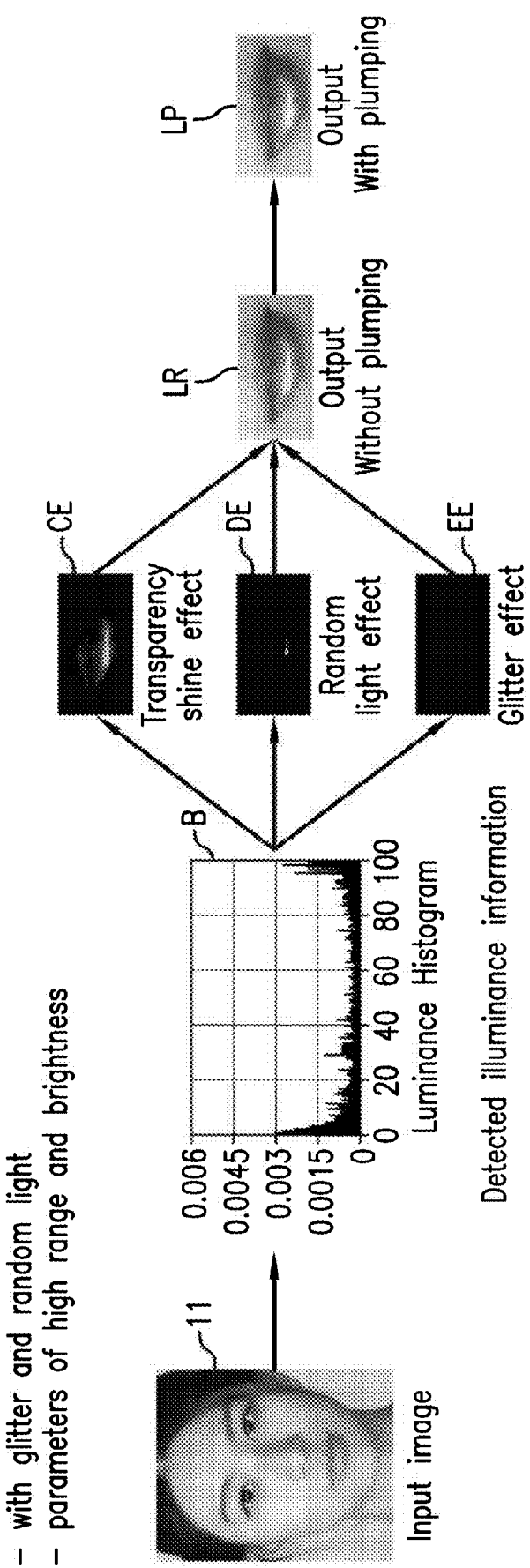
FIG. 8 shows output effects of each generator and the blended output of a real lip image in accordance with an embodiment of the present disclosure.

FIG. 7 shows a block diagram of a lipstick texture generator in accordance with an embodiment of the present disclosure. An input image, which may include a face to be processed, is blended with outputs from three different texture generators. FIG. 8 shows output effects of each of the generators and its blended output of a real lip image. Note that this example shown is not intended to limit the texture generator, because it can generate numerous other texture variations by tuning the parameters and combination of four different effect generators. The pseudo code of the detailed algorithm to add transparency and shine effect is provided in Appendix C.

In FIG. 7, an example of a method 2000 is shown for generating an output effect on an input image having a face. The input image may be an image of a face having makeup or not having makeup. In step 2010, this input image is provided to a system such as that described elsewhere herein. If the image has makeup on the face, particularly in the lip region, the above makeup removal method may be used to remove the makeup if desired so as to apply a true color of the desired lipstick shade to the user's face. The facial image may also be used as-is. The facial image will have facial landmarks such as the landmarks noted above, and the system used will be configured by having appropriate software as described above in locating at least one or all facial landmark(s) from the facial image of the user. The landmarks are associated with at least one facial region. As such output effects are illustrated herein for lips in a first example embodiment, the facial image should have detected landmarks associated with lips of the facial image and the first facial region includes a lip region.

The facial image in the region of the landmarks may be converted as described herein and a facial region including a located lip region is converted into at least one color channel so as to detect and analyze the light distribution of the lip region (i.e., the illuminance). To do so, the channels evaluated are preferably saturation and value channels, although other properties such as hue, reflectance, shading, illuminance, transparency or other light reflective properties may be further evaluated. Preferably at least saturation and value are evaluated over a range of brightness and are detected and analyzed in a first color channel, but other channels as noted above may also be detected and analyzed as noted in step 2020 of FIG. 7.

The color channel(s) are fed into histogram matching using techniques described herein over a varying light distribution to identify a histogram in a dataset of histograms of varying light distributions, and preferably having various pre-defined light distributions that include values that vary from the light distribution of the lip region to a desired degree that will thereby generate a desired output effect. In step 2025a, illuminance/brightness parameters over a range can be used to provide varying degrees of transparency, smoothness and/or shine for various gloss or shine effects as in step 2025b.

In step 2030a, a pre-defined histogram having a desired degree of glitter from light distribution can be identified to create a glitter effect as in step 2030b and provide various levels of shimmer.

In step 2040a, a pre-defined histogram can be identified to add random light distribution and create a more natural effect as in step 2040b.

In each instance, the method after such histogram matching for a first effect, e.g., a level of gloss or shiny in steps 2025a and 2025b, the method provides a first image having the output effect. If multiple output effects are desired, steps 2020 and a further one of the other parallel steps 2030a and 2030b to provide shimmer and/or a natural effect in 2040a and 2040b or combinations thereof (or additional effects as desired as would be understood by one skilled in the art based on this disclosure) can be repeated to provide one or more additional images, each of which has the related output effect as desired. The first image having the first output effect and/or the additional images with their respective output effects are combined and blended with the original facial image of the user in step 2040 to create a resultant image in step 2050 having each of the output effects combined on the facial image of the user.

If a plumping effect is desired (2050a), either alone or with use of another output effect, then after the facial landmarks in the lip region are detected, they are enlarged by a predetermined ratio in the lip region. Once this is done, then preferably a shininess (for suggestion of wetness) output effect is applied on the enlarged lip region using the techniques noted above if desired, and the modified image is created having the enlarged (plumped) lip region and any other applied output effect such as shininess is applied. Other effects may also be combined with plumping. The modified image having the plumped lip region and any other applied output effect is then overlaid and warped on the original mouth region of the initial user image. In processing the landmarks initially, the enlarged ratio is calculated based on the initial area of the lip region in the initial user photo, and the image within the initial lip region landmarks is warped towards targeted, enlarged landmarks. A final resultant image 2050 is then generated using overlays of all images having an output effect and/or a plumping effect, as selected in the method 2000 by combining the images and output effects.

As noted above, prior to converting the image, the makeup from the lip region of the facial image of the user may be completed by using the makeup removal method and system herein. Thus, in addition to generating the output effect(s) as described above, the lip region of the facial image without makeup can be converted into color channels as described above and the color channels can then be fed also into histogram matching under varying lighting conditions to identify a histogram having a pre-defined makeup color corresponding to a commercial color or other color lipstick in the dataset to obtain a further, additional image with the lip color applied to the lips of the lip region so that the color is a truer match than applying over existing makeup, and that image having the color may then be combined with the original facial image of the user and any images of the user generated with an end effect to provide a resultant image having the pre-defined lip color and the output effect(s) desired.

With respect to the output effects, a histogram having a pre-defined light distribution can be provided that incorporates transparency and smoothness to varying degrees based on the level of transparency to create an output effect that provides varying degrees of glossiness. The light distribution in the pre-defined histogram may also add varying degrees of random reflectance to provide an output effect that is more of a natural effect. Further varying degrees of transparency and shine may be used for an output effect that is a shiny effect. Pre-defined light distribute effects to provide glitter may also be employed to yield a glitter or shimmer effect.

FIG. 8 shows an input image II, and a detected light distribution in the form of a graphical illuminance profile B which is generated from the image II. The data is then mapped to pre-defined output effects as noted above, including a gloss level CE from transparency and shine variation, a random light effect DE and a glitter effect EE which are then blended with the original facial image II to create an resultant image having a lip region LR as shown. If the plumping effect is desired as shown, the landmarks used for the other effects shown in FIG. 8 are enlarged by a predetermined ratio in the lip region prior to applying the shininess CE, random light effect DE or glitter effect EE, so that the modified (enlarged) lip region LP with the output effects are overlaid and applied to create one output image with plumped lips.

Learning-Based Real-Time Lipstick Texture Simulation

In a further embodiment, a texture generator is provided herein that utilizes a deep convolution style transfer network to simulate three lipstick textures, namely matte, moist and glossy. The texture style transfer operates on a luminance level, which modifies the input light distribution of the original lip region to the desired distribution for different lipstick textures while remaining faithful to the preprocessed lipstick color. The style transferred lip region is then processed with the dynamic texture generation technology for final touch-ups.

Existing virtual try-on techniques rely heavily on the original light distribution on the input lip region, which is intrinsically challenging for simulating textures that have a large deviation in luminance distribution compared to the input image. Therefore, to generate a more realistic texture, the original lip luminance pattern needs to be mapped into a reference pattern through a mapping function. Such a mapping function would have to be highly nonlinear and complex to be modeled explicitly by hand. For this reason, a deep learning model, which is known to have the capability to model highly nonlinear functions, is employed herein for solving style transfer problems. Research on style transfer has been increasing in recent years, especially in the deep learning domains. For instance, several publications demonstrate the capability of deep networks to mimic any input textures or art styles in real-time. See, for example, Johnson, Justin et al. "Perceptual Losses for Real-Time Style Transfer and Super-Resolution," ECCV (2016); Zhang, Hang and Kristin J. Dana, "Multi-style Generative Network for Real-time Transfer," CoRR abs/1703.06953 (2017); and Li, Chuan and Michael Wand, "Precomputed Real-Time Texture Synthesis with Markovian Generative Adversarial Networks." ECCV (2016).

Figure 36:
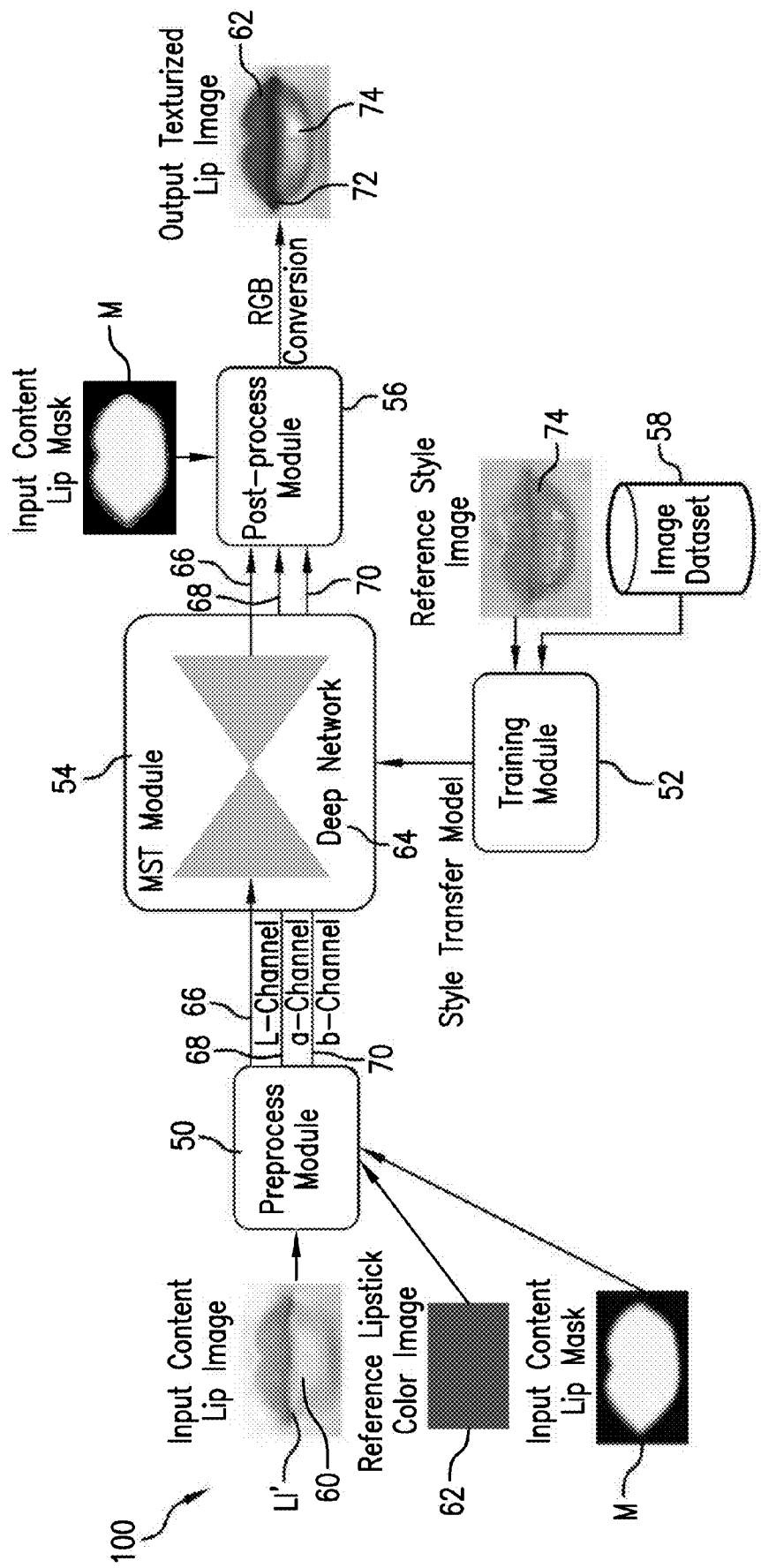
FIG. 36 is an image flowchart representation of the components of a texture simulator capable of learning and applying virtual lipstick textures for use in applying output effects to an image having lips with a lipstick applied thereon.

The present texture simulator 100 is capable of learning any lipstick texture given a single reference image of such texture and is shown in a representative component flow chart in FIG. 36. The simulation pipeline consists of four modules (see, FIG. 36): training module 52, pre-process module 50, a mono-channel style transfer (MST) module 54 and a post-process module 56. Given a desired, deep convolutional neural network structure, the training module is responsible for learning all the hidden weights and bias through gradient descent guided by any self-defined loss function. The style transfer model may be trained on any image dataset 58 that is either under the creative commons attribution license or is self-prepared by an in-house dataset. After the training module, a style transfer model is ready to be used with the rest of the modules.

The pre-process module 50 modifies the input lip region LI' by changing the lip color 60 to the desired lipstick color 62 and luminance enhancement through the dynamic texture generation method described herein. For lip color matching, the lip region, $I_{Lip}$, and lip color image, $I_{color}$ are first converted to CIELAB L*a*b* space such that luminance (L-channel, $I^L$) is isolated from all color channels (a* and b* channels, $I^a$ & $I^b$).

Given a lip region mask, M where $0 \leq \{M_{ij}\} \leq 1$, lip color matching is defined as the following relationship expressions:

$$I_{Lip}^{L'} = \alpha(I_{Lip}^L - \mu_{Lip}^L) + \mu_{Color}^L, \text{ where } 0 \leq \alpha \leq 1$$

$$I_{Lip}^L = M^* I_{Lip}^{L'} + (1-M)^* I_{Lip}^L$$

$$I_{Lip}^a = M^* I_{Color}^a + (1-M)^* I_{Lip}^a$$

$$I_{Lip}^b = M^* I_{Color}^b + (1-M)^* I_{Lip}^b$$

Operation 1 shifts the mean pixel value, $\mu_{Lip}^L$, of the input lip L channel to that of the lip color image, $\mu_{Color}^L$, which is the same as the CIELAB space L value of the desired lip stick RGB value. The factor α controls how solid the add-on lip color appears to the naked eye; zero α fully covers all lip patterns underneath, while unit α retains all lip patterns. Operations 2 through 4 update all channels in CIELAB space through the weighted sum between color image and lip image channels.

The mono-channel style transfer (MST) module 54 takes in the L-channel image from the preprocess module 50 and performs a single inference through the style transfer deep network 64.

The style transfer network inherits the general autoencoder structure as described in Johnson, Justin et al. "Perceptual Losses for Real-Time Style Transfer and Super-Resolution," ECCV (2016), which has an equal amount of convolution units and deconvolution units. Each convolution or deconvolution unit is defined as a sequential operation which comprises one convolutional or deconvolutional function, one normalization function and one nonlinear activation function. The exact number of the hidden layers (convolution or deconvolution units) within the network is treated as a parameter to be optimized for real time lip texture simulation. Since style transfer synthesizes both the texture and color according to the reference style image, the synthesized image would be converted to CIELAB space, and only the L-channel 66 is used for post-processing, namely the Luminance-only transfer as described in Gatys, Leon A. et al., "Preserving Color in Neural Artistic Style Transfer," CoRRabs/1606.05897 (2016).

The post-process module 54 takes in the synthesized L-channel image from the MST module for dynamic texture simulation, and a- and b-channel images 68, 70 from the preprocess module for RGB conversion. The dynamic texture simulation module adjusts the luminance distribution of the L-channel according to each texture described in the dynamic texture simulation section discussed above with respect to output effects. A final image 72 is created with the new desired color 62 and the dynamic texture effect 74 from post-processing after passing the image through the MST module 54 in the system.

Layering Eyes Add-on Method

In addition to applying an effect to a facial feature as noted above such as a lip region, the invention herein includes an optional method 400 for constructing an eye-makeup effect built from various eye area add-on layers using a similar technique to that noted above for adding effects to the lip region.

Figures 27A, 27B, 27C:
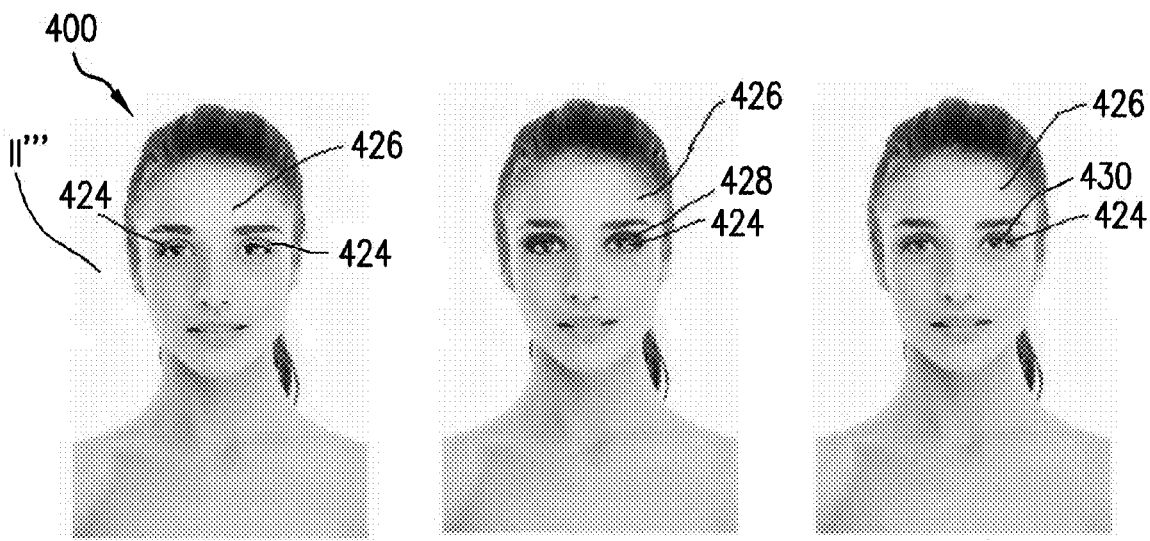
FIG. 27a is an image of a face having no makeup applied for use in an eye makeup add-on method according to an embodiment herein.
FIG. 27b is an image of an eye shadow layer add-on applied to the image of FIG. 27a using the eye makeup add-on method according to an embodiment herein.
FIG. 27c is an image of an eye shadow middle eye add-on applied to the image of FIG. 27a using the eye makeup add-on method according to an embodiment herein.

As shown in FIGS. 27a-27f, using a sample image photo II''', various sections of eye makeup and/or eye features can be layered on an eye 424 of the photo II''' layer by layer as shown. FIG. 27a shows an input image II''' of a face 426 having no makeup applied. FIG. 27b includes an eye shadow layer add-on 428 applied to the face 426 of image II'''. FIG. 27c includes a middle eye shadow add-on 430 as applied to image II'''. FIG. 27d includes an eye corner add-on 432 applied to image II'''. FIG. 27e shows an eye tail add-on 434 applied to Image II''', and FIG. 27f includes an eye lash 436 add-on also applied to Image II'''.

Figure 29:
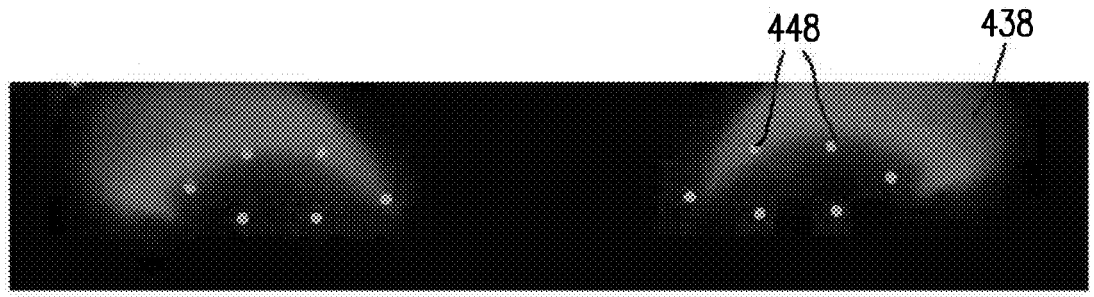
FIG. 29 is an example of manual labeling of a template for an eye shadow makeup add-on according to an embodiment of a method herein which employs points on the templates according to a landmark protocol.

These effects are created using the following method. Eye templates are created as shown in FIGS. 28a-28e, wherein each template is respectively, an eye shadow template 438 (FIG. 28a), an eye middle template 440 (FIG. 28b), an eye corner template 442 (FIG. 28c), an eye tail template 444 (FIG. 28d) and an eye lash template 446 (FIG. 28e). Each such template is created by manually labeling landmarks using points on the templates according to a landmark protocol. An Example is shown in FIG. 29 wherein points identified as points 448 are applied to eye shadow template 438. The landmark locations of the points 448 are saved as a text file.

To create the eye shadow add-on, the eye region landmarks are extracted from a landmarks detector for the frame. The eye region is cropped by the interested landmarks from 37 to 42 and 43 to 48. 100 points are generated b linear interpolation around the eye region from detected annotated landmarks (the landmarks may be annotated using an annotation system as described herein). From this, 100 points are generated around the eye shadow template based on the manually annotated landmarks. The template is applied to the frame by forward warping the 100 points from frame to template. There are many available warping algorithms such as forward warping, inverse warping and similarity transformation, affine transformation and the like. In the preferred embodiment, forward warping with affine transformation was adopted. Following this, the eye region image is cropped back into the original frame.

Figure 30:
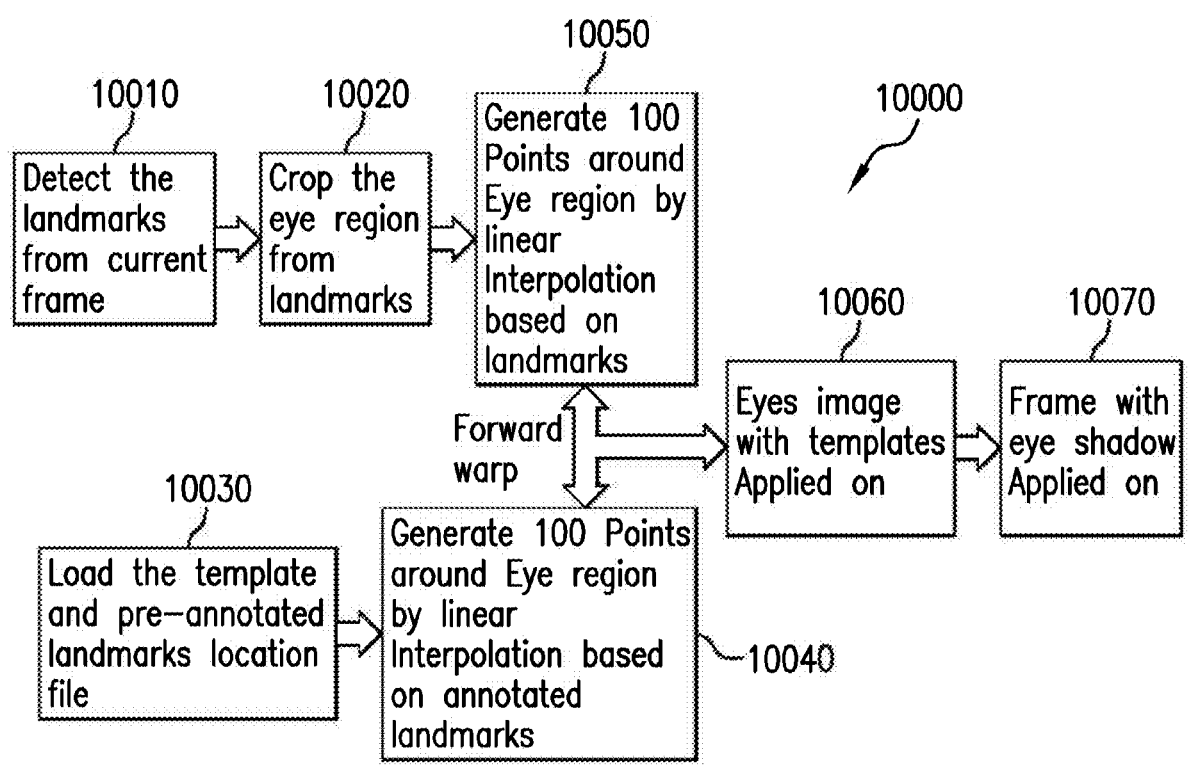
FIG. 30 is a flowchart illustrating the steps in an eye shadow add-on method according to an embodiment of an eye make-up add-on method herein.

This eyeshadow application is illustrated as a flow chart 10000 shown in FIG. 30. In Step 10010, the landmarks are detected from a current frame and in Step 10020, the eye region is cropped from the landmarks. At the same time or prior thereto, the eye shadow template is loaded and pre-annotated with landmarks in a landmarks location file in Step 10030. Such annotated files and templates are saved in a learning database. In Step 10040, 100 points are generated around the eye region by linear interpolation based on the annotated landmarks of Step 10030. In Step 10050, 100 points are generated around the eye region of the current image frame by linear interpolation based on the detected landmarks from Step 10010. The 100 points from the template in Step 10040 are forward warped onto the 100 points of the eye region in the image from Step 10050. This creates the eye image with the templates applied in Step 10060, and the template is cropped back on the image to show the image frame with the eye shadow applied in Step 10070.

Figure 31:
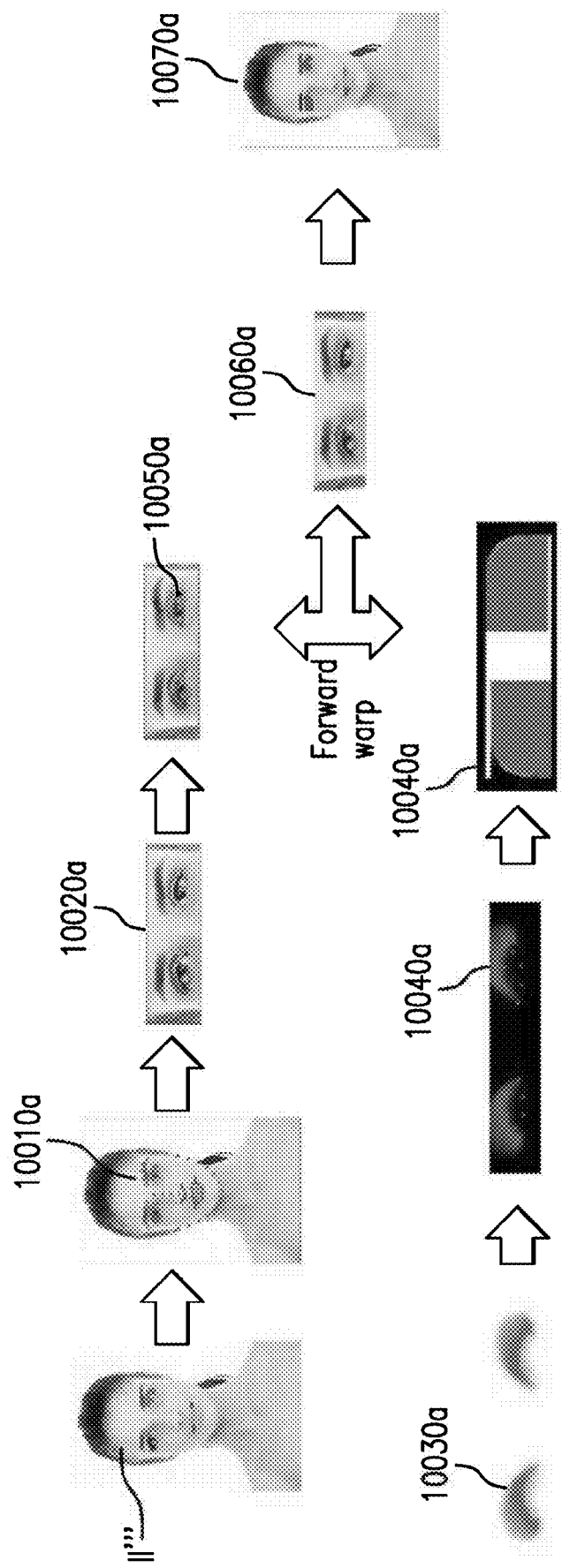
FIG. 31 is a visual image representation of the steps of the flow chart of FIG. 30.

FIG. 31 shows a flow diagram depicting Steps 10010a to 10070a analogous to Steps 10010 to 10070 noted above but using pictorial illustrations for the steps noted above in flow chart 10000a.

To create a middle eye shadow add-on, the eye region landmarks are extracted. The eye region is cropped by the interested landmarks from 38 to 39, 41 to 42 and 44 to 45, 47 to 48. Then 50 points are generated by linear interpolation around the eye region from detected landmarks. Further, 50 points are generated around the eye shadow template based on the manually annotated landmarks. The template is then applied to the frame by forward warping the 50 points from the frame to the template. The eye region image is then cropped back into the original frame to create the frame with the eye shadow makeup applied as a middle eye shadow add-on.

Figure 32:
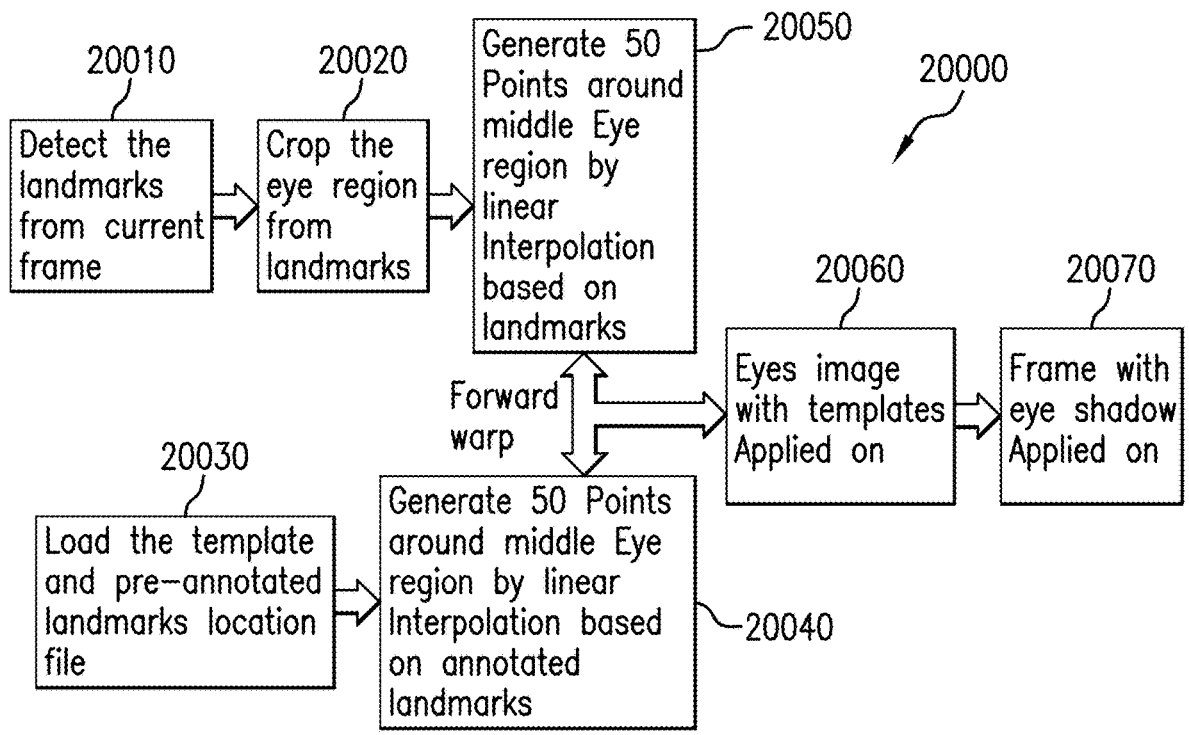
FIG. 32 is a flow chart illustrating the steps in a middle eye-shadow add-on method according to an embodiment of an eye makeup add-on method herein.

This middle-eye template add-on is shown in the flow chart of FIG. 32 as embodiment 20000. In step 20010, the landmarks are detected from the current frame (image) and the eye region is cropped from the landmarks in step 20020. At the same time or prior thereto, a middle eye shadow template is loaded and pre-annotated with the landmarks location file in Step 20030. Then in Step 20040, 50 points are generated around the middle eye region by linear interpolation based on the annotated landmarks in Step 20030. In Step 20050, 50 points are also generated around the middle eye region of the image frame by linear interpolation based on the landmarks from Step 20020. The template is then forward warped onto the image frame to create an image of the eyes with the template applied thereon in Step 20060 and the eyes image with the eye shadow applied thereon is cropped back into the image frame in Step 20070.

An eye corner add-on is carried out using the eye corner template by extracting eye region landmarks from a landmarks detector for the frame. The eye region is cropped by the interested landmarks from 39 to 41 and 44 to 45 to 48. Then 50 points are generated by linear interpolation around eye corner region from detected landmarks. Further, 50 points are generated around the eye corner shadow template based on the manually annotated landmarks. The template is applied to the frame by forward warping the 50 points from frame to template. The eye region image is cropped back into the original frame, to create the frame with eye corner make up applied.

Figure 33:
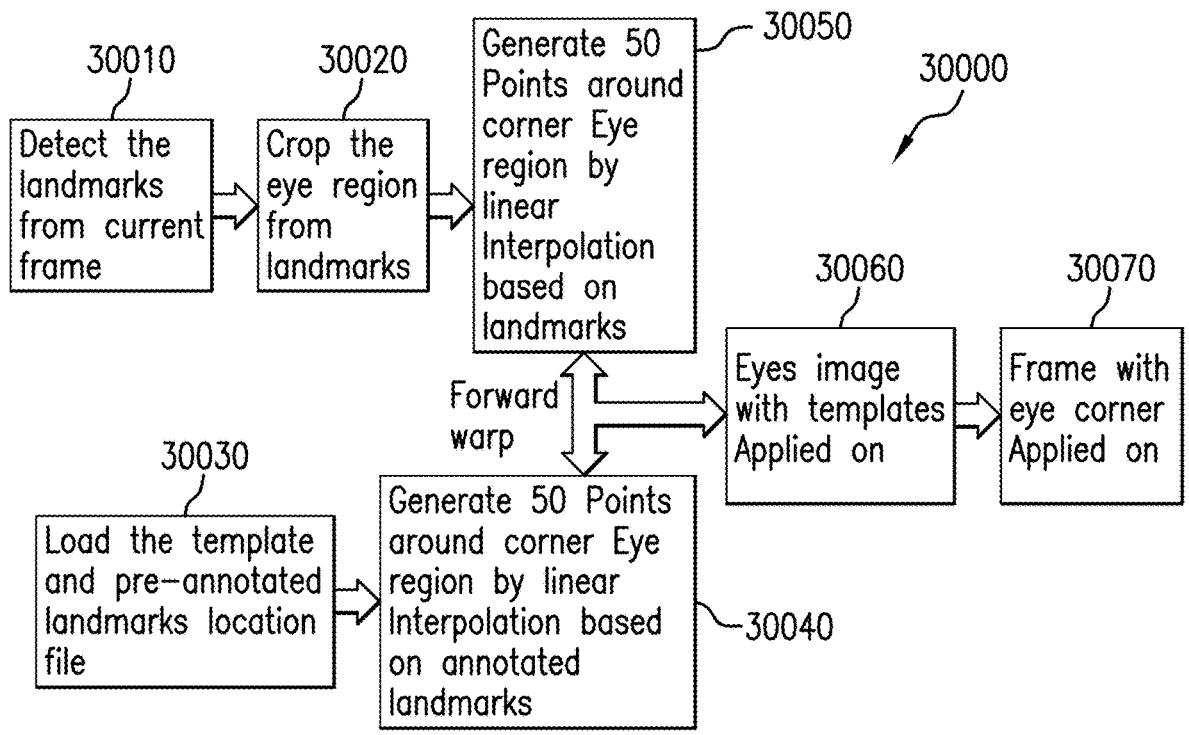
FIG. 33 is a flow chart illustrating the steps in a corner eye-shadow add-on method according to an embodiment of an eye makeup add-on method herein.

This eye corner shadow application is illustrated in FIG. 33 with respect to the embodiment 30000. In Step 30010, the landmarks from the image frame are detected, and the eye region is cropped from the landmarks in Step 30020. At the same time or prior to that Step, in Step 30030, the template is loaded and its landmarks pre-annotated using the landmarks location file. In Step 30040, 50 points are generated around the corner eye region by linear interpolation based on the annotated landmarks. Further, in Step 30050, 50 points are generated around the corner eye region of the image region cropped from the image frame using linear interpolation based on the landmarks. The template points are forward warped onto the frame image points and the image of the eyes having the corner template applied thereon is created in Step 30060. The frame with the corner eye shadow applied is cropped back into the image frame to create the face having the corner eye shadow applied in Step 30070.

The eye tail region is created by extracting the eye region landmarks using a landmarks detector for the frame. The eye region is cropped by the interested landmarks from 39 to 41 and 44 to 45 to 48. Then 50 points are generated by linear interpolation around the eye tail region from the detected landmarks. 50 points are also generated around the eye tail shadow template based on the manually annotated landmarks in the stored file. The template is applied to the frame by forward warping the 50 points from the frame to the template. The eye region image is cropped back to the original frame to create the image frame having the eye tail make up applied.

Figure 34:
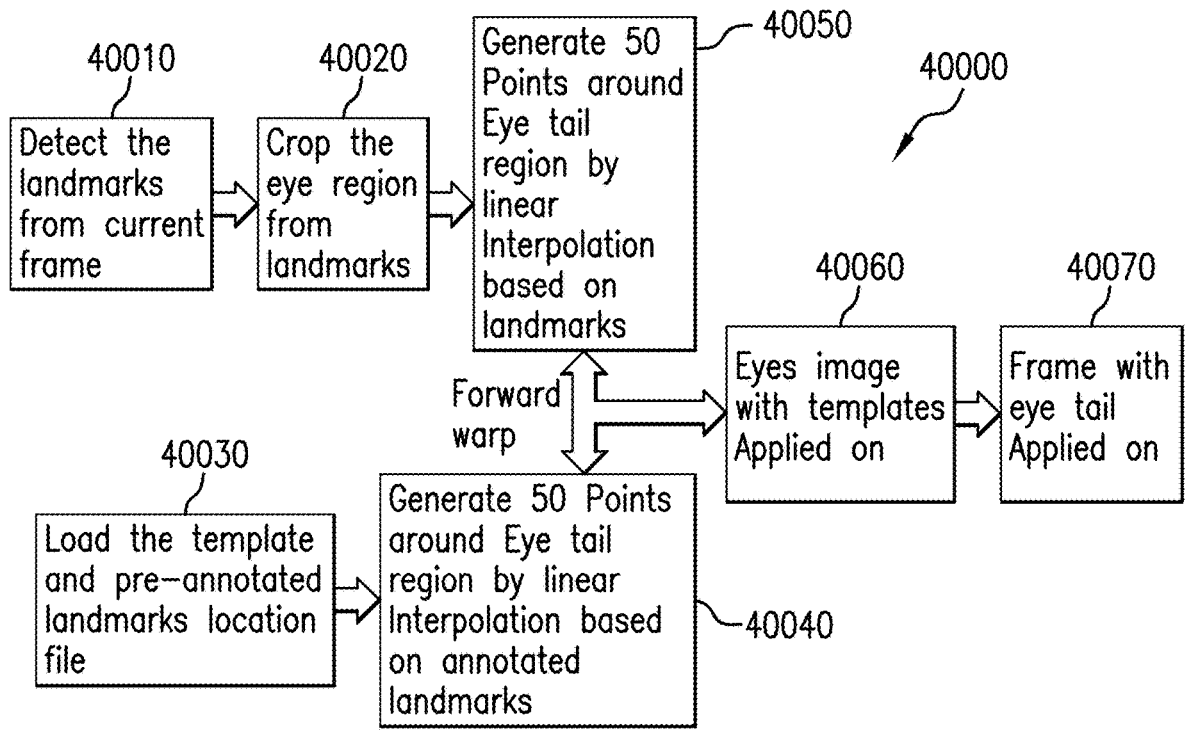
FIG. 34 is a flow chart illustrating the steps in a tail eye-shadow add-on method according to an embodiment of an eye makeup add-on method herein.

This is illustrated in the flow charge of FIG. 34, in embodiment 40000. In Step 40010, the landmarks are detected within the current image frame and the eye region cropped from the landmarks in Step 40020. At the same time or prior thereto, a template for a tail eye add-on having pre-annotated landmarks from a landmarks location file is loaded in Step 40030. In Step 40040, 50 points are generated around the eye tail region by linear interpolation based on the annotated landmarks on the template. Further 50 points are generated around the eye tail region of the cropped image frame in Step 40050 using linear interpolation based on the landmarks. The template is forward warped onto the image frame to create an image of the eyes having the templates applied thereon in Step 40060, and finally the image frame is cropped back into the image frame to provide a face with an eye tail shadow region applied in Step 40070.

An eye lash add-on may be created using an eye region and extracting the landmarks from a landmarks detector for the image frame. The eye region is then cropped by the interested landmarks from 37 to 42 and 43 to 48. 100 points are generated by linear interpolation around the eye region from the detected landmarks in the original cropped image frame. Using an eye lash template, 100 points are generated around the eye lash template based on manually annotated landmarks. The template is applied to the frame by forward warping the 100 points from the frame to the template. The eye region image is then applied to original frame to create the frame with eye lash make up applied.

Figure 35:
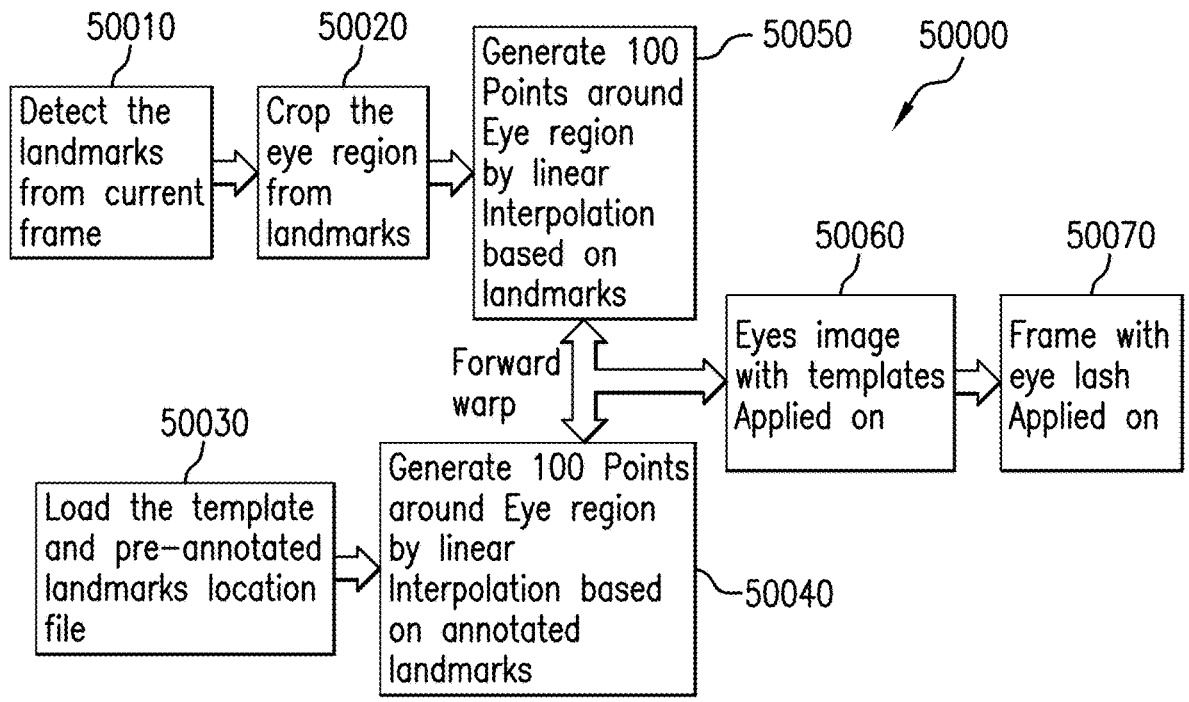
FIG. 35 is a flow chart illustrating the steps in an eye lash add-on method according to an embodiment of an eye makeup add-on method herein.

This eye lash add-on is illustrated in the flow chart of FIG. 35 in embodiment 50000. In Step 50010, the landmarks are detected from the current image frame. In Step 50020, the eye region is cropped from the landmarks. At the same time or prior thereto, the eyelash template is loaded in Step 50030, wherein the template has pre-annotated landmarks from the landmarks location file. 100 points are generated in Step 50040 around the eye region by linear interpolation based on the annotated landmarks. Further, 100 points are also generated around the eye region by linear interpolation based on the landmarks of the original cropped image frame in Step 50050. The template is forward warped to the original image using the landmarks to create the eyes image having the template applied thereon in Step 50060. This image is then cropped back into the original image frame with the facial image having the eye lashes thereon in Step 50070.

In the above template add-ons, the landmarks protocol for these templates is shown in FIG. 21. 100 points are generated for the left eye from landmarks 37 to 42, and 100 points are generated for the right eye from landmarks 42 to 48 for the full eye region. For the middle eye region, 50 points are generated on the left eye from landmarks 38 to 40, 41 and 42, and 50 points are generated on the right eye from landmarks 44 to 45, 47 and 48. For the eye corner region, 30 points are generated on the left eye from landmarks 39 to 41 and on the right eye from landmarks 30 to 41. The linear interpolation follows the following expression.

Given two points, $(x_0, f(x_0))$, $(x_1, f(x_1))$, the line that interpolates the two points is expressed:

$$f_1(x) = f(x_0) + \frac{f(x_1) - f(x_0)}{x_1 - x_0}(x - x_0)$$

For forward warping, the source image is the image to be used as the reference. The geometry of this image is not changed, and is denoted as S. The target image is obtained by transforming the reference image, and denoted as T. The following parameters are used:

(x,y): the coordinates of points in the reference image
(u,v): the coordinates of points in the target image
f,g or F,G: the x and y components of a transformation function
$y_{min}$, $y_{max}$: the minimum and maximum values of y
$x_{min}$, $x_{max}$: the minimum and maximum values of x
for y=$y_{min}$ to $y_{max}$
for x=$x_{min}$ to $x_{max}$
u=f(x,y); and v=g(x,y)
the pixel at source S(x,y) is copied to T(u,v)

Figure 37:
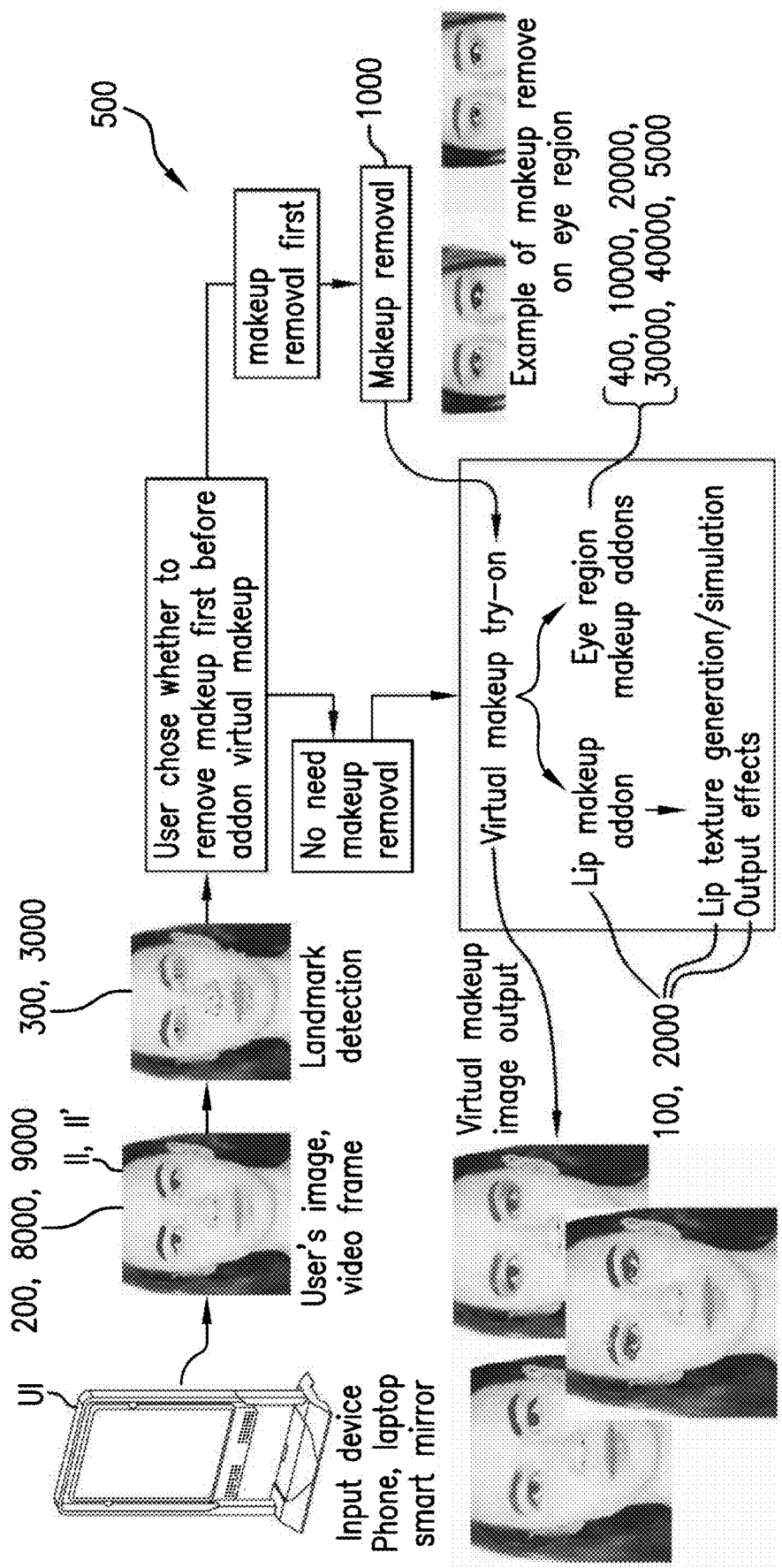
FIG. 37 is a flow chart showing use of the method of landmark detection, use of the method of makeup removal, use of the methods of makeup try-on, and makeup effects, including texture simulation on an input image according to embodiments shown in other Figures and embodiments herein.

As noted above, the methods of makeup removal and application, as well as the applied end effects and texture simulations may be used independently or in an overall method and system, and may be supplemented by the various enhanced techniques noted below. FIG. 37 shows a general flow chart of a combination 500 of some of the embodiments of methods and systems herein. An input image II, II' (as defined herein) can be provided by a user through a user interface (UI). The user interface can preferably communicate a digital input image as defined herein. The input image II, II' may be processed and the device and color calibrated as described in this disclosure (200, 8000) and the landmarks detected and/or identified and annotated using various landmark detection and annotation methods described herein 300, 3000. When providing the input image II, II', the user can elect to use the virtual makeup removal methods and systems described herein, including, for example, method 1000 to remove any makeup virtually from the input image should the user with to initially remove makeup. If the input image is sent without makeup so that removal is not required or once any makeup is removed using the methods herein, or, should the user with to use an add-on program without having removed makeup in one or more locations, the input image, is then optionally is sent to the makeup service (MS) and may be subjected to any of the makeup try-on, output end effects or texturing simulation as described in the systems and methods herein. For example, a virtual try-on may be used to apply an eye makeup virtual application of either a single or multiple type and layer eye makeup add-on as described in embodiment 400, including one or more of its specific sub-methods 10000, 20000, 30000, 40000 and 50000. Alternatively, a lip makeup color and/or output end effects as described herein (see method 2000), including an optional plumping effect and/or lip texture simulation (as in method 100) may be employed by the makeup service.

Such methods and systems can be used alone or with other methods or techniques including those described herein to create a virtual output of a resultant image RI having one or more of such virtual makeup simulations and/or output end effects applied (including providing a resultant image(s) wherein makeup is removed, and no further makeup applied).

Figure 38:
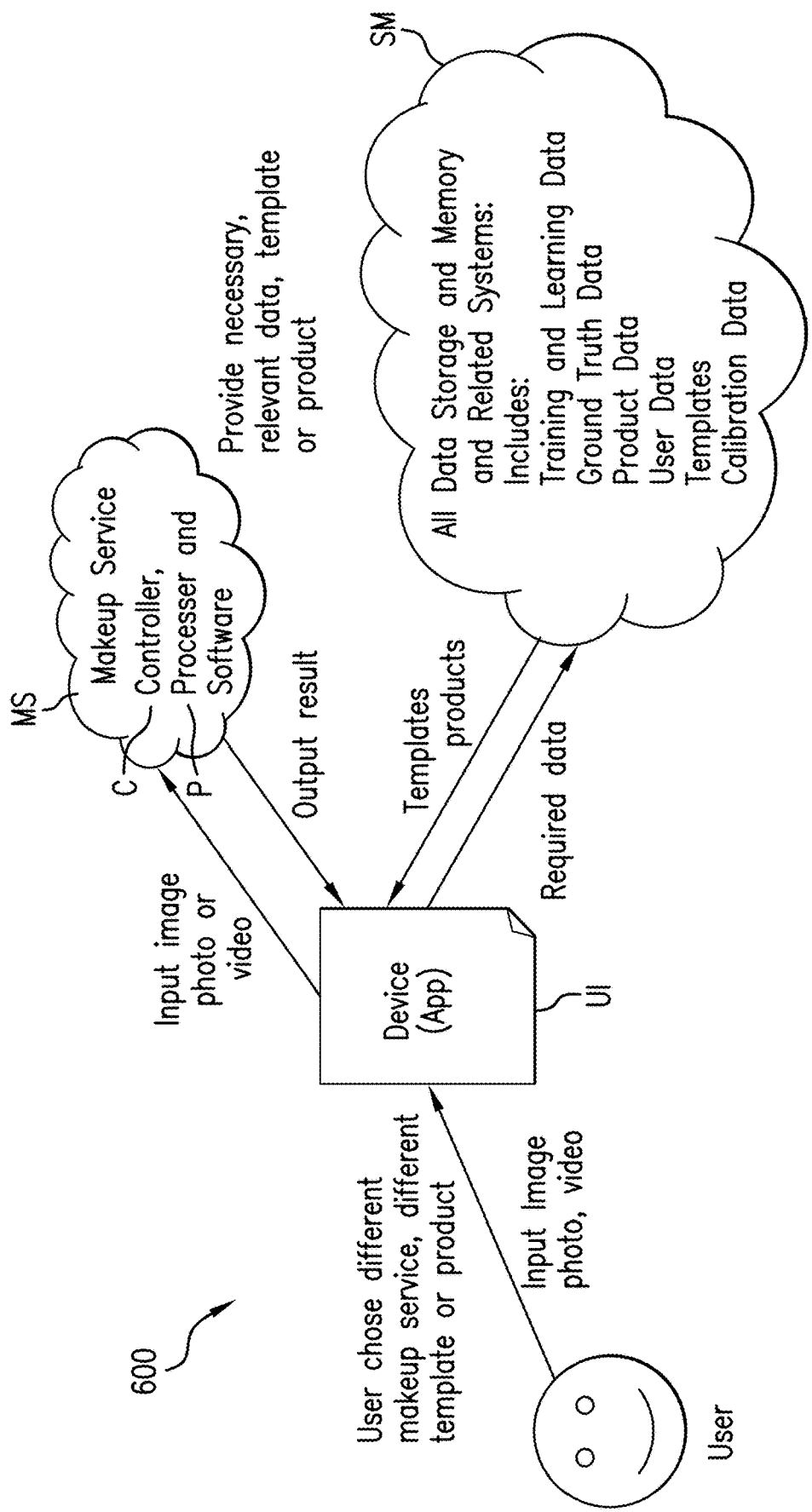
FIG. 38 is a schematic representation of a system for use in makeup removal and/or try-on as described in the various embodiments herein.

When using the various methods, such methods can be carried out using a system 600 shown in FIG. 38 that enables storage of data in a system memory SM, a makeup service MS that has a controller C that can execute programmable instructions for carrying out the virtual removal and/or makeup try-on or output effects herein, that receives input images II, II' as described herein sent from a user interface UI by a user of the system.

Deep Learning-Based Personalized Makeup Recommendation

Deep learning based personalized makeup recommendation can provide very detailed step by step makeup instruction to users. To achieve this, a makeup annotation system records step-by-step makeup information from an input image which includes a person wearing professional makeup. Additionally, the Virtual Facial Makeup Washoff (makeup removal method and system), as described above, is adapted to generate an input database for deep learning, which is one of the hardest things to do in terms of collecting enough before and after makeup photos to train the deep learning model.

A wide variety of types of cosmetics and varying brands of such types of cosmetics are available and more are constantly being launched, making recommending products that are right for individuals difficult but a very important selling point for cosmetics manufacturers and sellers. Customers want to know more about product combination(s) creating a finished look(s) to evaluate how such cosmetics would appear when applies, and not just information on the effect necessarily of a single product (e.g., Beauty Youtubers, Sephora's Beauty Board). Existing approaches to personalized makeup recommendations are mostly directed to seeking advice from a makeup professional.

The makeup recommendation system of the present disclosure is based on deep learning, because of the success of deep learning models in different recommendation systems. Additionally, for detailed recommendations, the disclosed methodology generates the makeup product in each step and also explains to users how they should apply it. In particular, the makeup recommendation system of the present disclosure generates RGB color values as output and the product is displayed to the user by selecting a closest output on the database, which is a significantly advanced method in comparison with prior art methods which produce only a small set of predefined results. Input data in the present disclosure is also different from that used in other methodologies. The present invention provides a method and system that uses only the faces of professional models and makeup looks professionally applied as input for the deep learning model, so that it is possible to extract the best features during learning.

Figure 9:
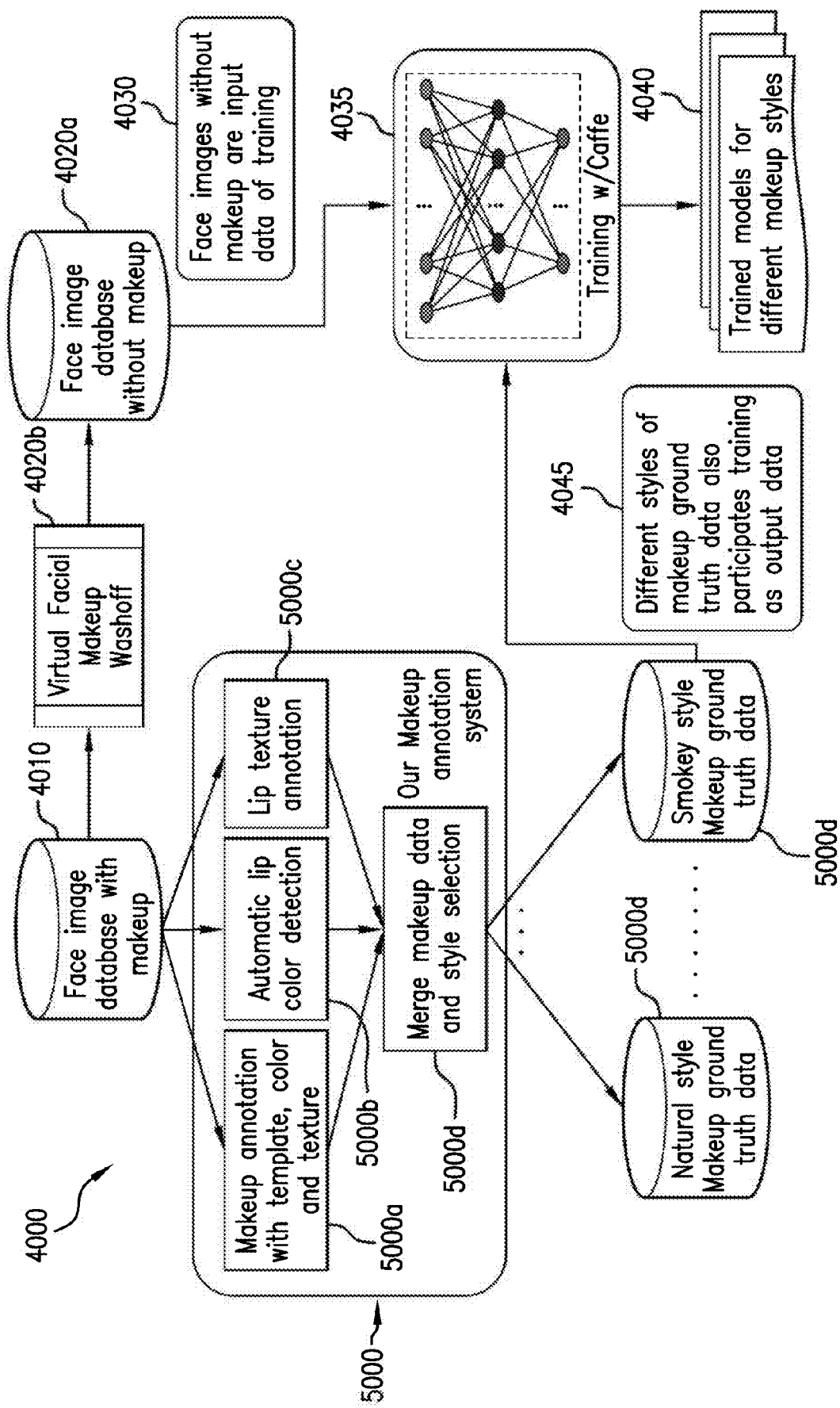
FIG. 9 shows a block, flow diagram of a deep-learning, model training part in accordance with an embodiment of the present disclosure.

FIG. 9 shows a block diagram of a deep learning model training system 4000 in accordance with an embodiment of the present disclosure. A face image database with makeup applied 4010 provides relatively wide and representative images wherein professional makeup is used and step-by-step makeup data is annotated using a makeup annotation system 5000 of the present disclosure as described further herein below. The database with makeup 4010 also becomes further input data for deep learning training after processing the Virtual Facial Makeup Washoff (makeup removal method and system), as described above, which is one of the most important principles that makes the algorithm work. In one embodiment, the system 4000 generates face images without makeup 4020a, or with makeup virtually removed as in 4020b, so that these images can become input data for use in the deep learning training. The unique use of makeup washoff or removal to generate non-makeup facial images makes the system more robust, but also represents a solution to the hardest part of solving the deep learning training problem which is to collect enough before and after makeup images to train deep learning models (DLM) 4040 resulting from the training. Thus, one can collect various images with makeup on them and instead of having to significant numbers of images with makeup off, the makeup removal method may be used to generate numbers of images with no makeup applied that are used as input data for training in step 4030.

For model training, a deep learning framework 4035 such as Caffe™, Caffe2™ or Pytorch™ is used to support many different types of deep learning architectures for image classification and image segmentation. Such a framework supports a variety of neural network patterns, as well as fully connected neural network designs. For training with the Caffe™ framework, for example, it is also necessary to input training prototxt that defines the neural network. The neural network originally designed for facial recognition can be adapted for makeup recommendation because each of them relates to a person's appearance.

Figure 10A:
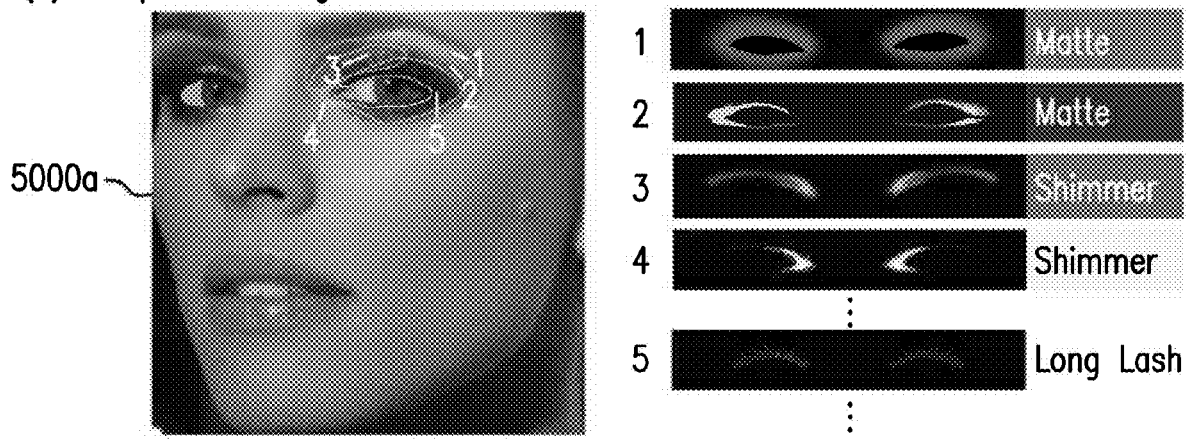
FIGS. 10A, 10B, 10C and 10D each show a more detailed output example of the makeup annotation system in accordance with an embodiment of the present disclosure.
Figure 10B:
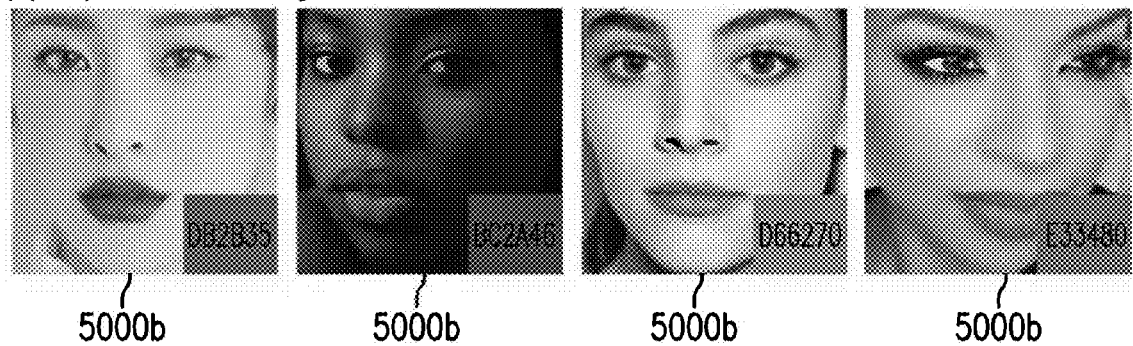
Figure 10C:
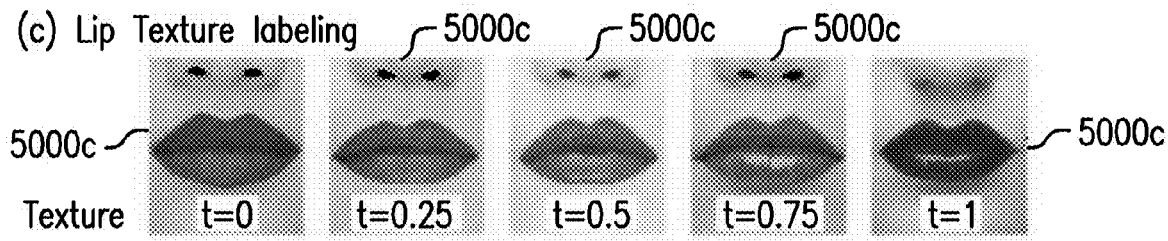
Figure 10D:
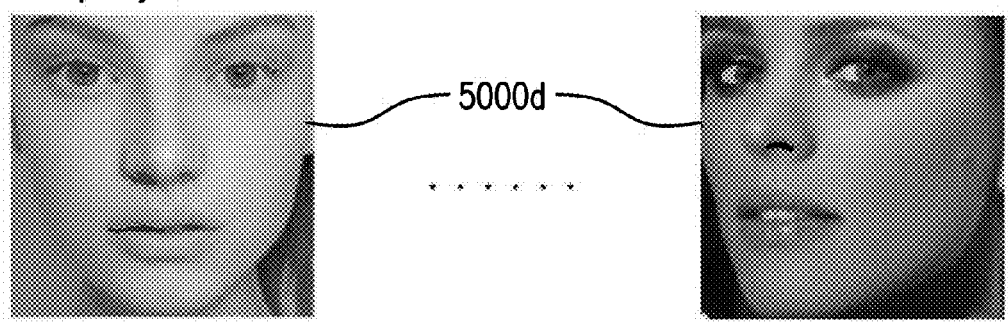

FIGS. 10A-10D shows more detailed output examples of the makeup annotation system 5000 in accordance with an embodiment of the present disclosure. Through the makeup annotation system 5000, digitalized makeup information can be generated and this information may be used as input data of the deep learning training in step 4045. The pseudo code of the makeup annotation system is provided in Appendix D. One skilled in the art would understand, based on this disclosure that other types of neural networks can be developed for this purpose based on varying types of source software capable of generating a neural network. In FIG. 10A, an image of a face with makeup applied is marked (annotated) and regions are identified and used as templates for those regions as identified by numbers 1-5 for varying shades and output effects for color and texture (output effects) for an eye shadow template (1), a tail shadow (2), a middle eye shadow (3), a corner eye shadow (4) and a lash effect (5) as described elsewhere herein. Methods for forming and annotating templates are described further hereinbelow. In FIG. 10B, images with makeup (that are annotated as noted above) are also used as templates for lip color annotations and FIG. 10C shows related lip texture annotations (output effects) with the colors labeled as shown and the output effects or textures identified with a discrete corresponding value. Such effects and colors may be applied using methods herein, but for training data, such annotated images are used in a data reference set. FIG. 10D provides images that are categorized by overall styles (as shown a natural style and a smokey style).

Figure 11:
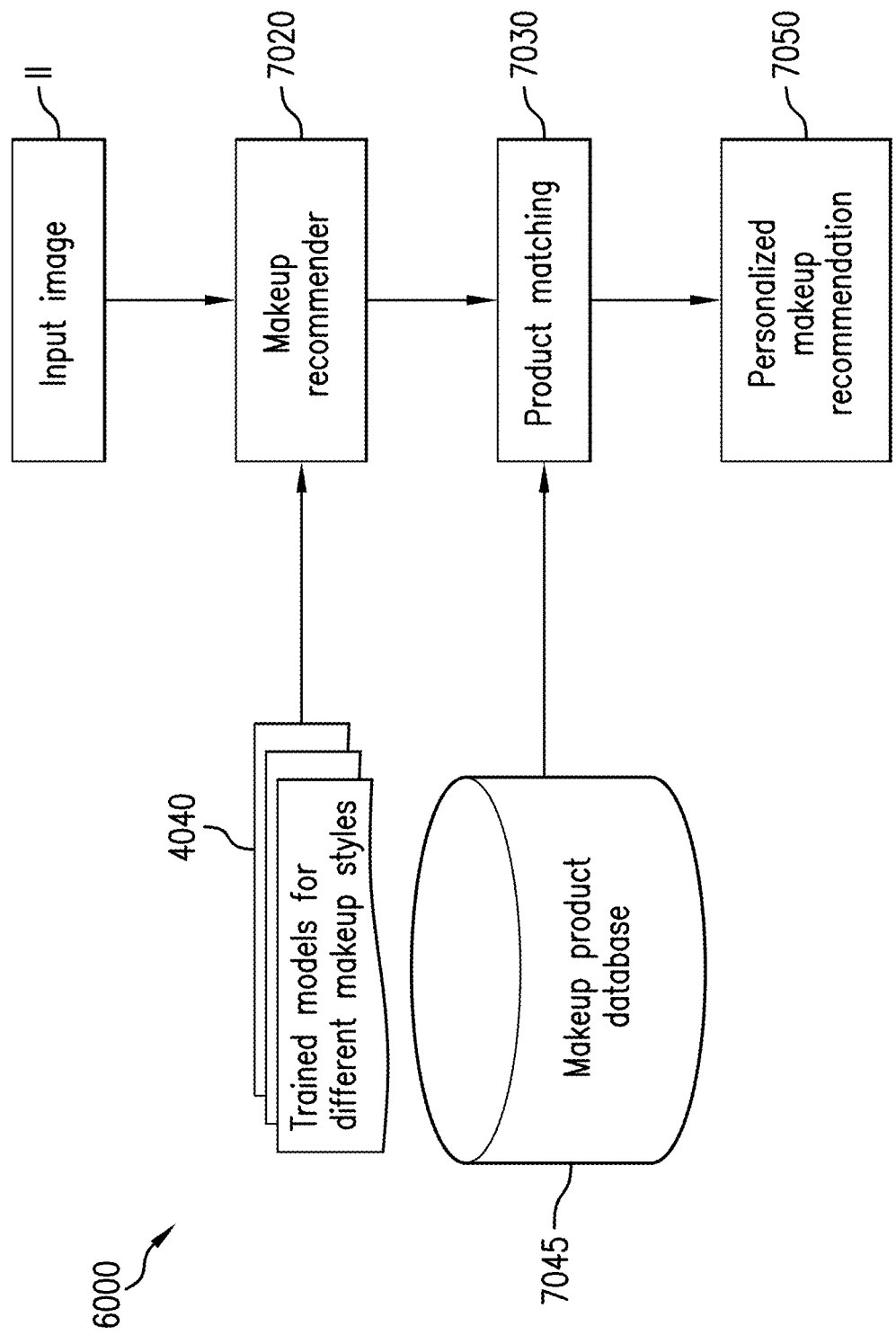
FIG. 11 is a block, flow diagram of a makeup recommendation system in accordance with an embodiment of the present disclosure.

In FIG. 11, the makeup recommendation system generates personalized step-by-step makeup instructions using real products in the database. The trained models for different makeup styles 4040 may be taken from the deep learning system 4000 and annotation system 5000 which can be input into the makeup recommendation system 6000 to provide a personalized makeup recommendation 7050, and also optionally a virtual makeup tutorial may be provided as described below. The make-up recommendation 7050 can be derived from a makeup recommender 7020 from the trained system and models such as trained models 4040, although a separate trained model may be created solely for use with a recommendation system. Product matching 7030 can also be used using a makeup product database, which may be the same or different from the makeup database 7045 (as shown in FIG. 1, it is the same database). The makeup recommender and/or product matching can result in the personalized makeup recommendation 7050. Virtual tutorials may also be generated using segmented video pathways or taking information from product searching and identification using a trained products classifier from a beauty products database as discussed below.

Virtual Makeup Tutorial

Figure 12:
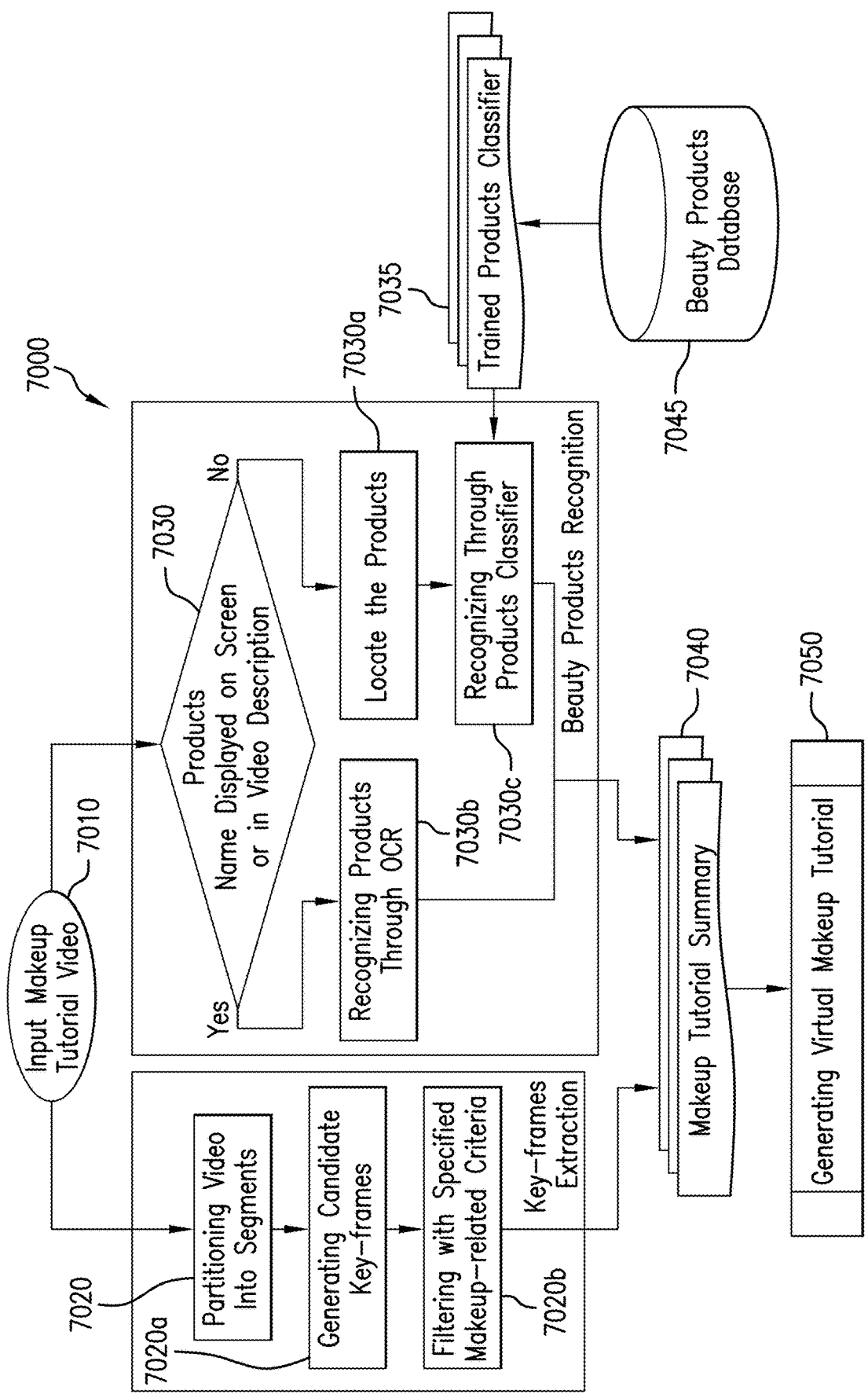
FIG. 12 is a block, flow diagram of a virtual facial makeup simulation/recommendation system in accordance with an embodiment of the present disclosure.

In one embodiment, the present disclosure provides a virtual makeup tutorial system 7000 which can automatically summarize a video into key steps, extract all used products, find the purchase link, and provide a virtual try-on tutorial without having to order the products online or test the products in a retail store. FIG. 12 is a flowchart illustrating a virtual makeup tutorial system in accordance with an embodiment of the present disclosure.

It has been an integral part on many modern social media platforms to follow makeup artists on video and/or photograph sharing websites (e.g., YouTube™ and Instagram™). While video tutorials are a great way for consumers to get makeup tips and discover beauty products, it is time consuming to find and employ such videos, and often difficult for users in the audience to recreate the look. In order to follow up and find the links of all the used products, the consumer has to pause the video many times, find each product introduced in the video, write down the name of the product, and find a purchase link online. In this disclosure, for input makeup tutorial videos 7010, a virtual makeup tutorial system can automatically summarize by partitioning the tutorial video into key steps 7020, locate and/or by extracting all products used or introduced in the tutorial video 7030, each of which can be used to find a purchase link to provide a makeup tutorial summary 7040 which summary is used to general a virtual makeup try-on tutorial 7050 without having to order the product online or test the product in a retail store.

In one embodiment, in step 7020, after partitioning the video into segments 7020a, key-frames may be selected 7020b and makeup products are detected using filtering and specified makeup related criteria to generate a step-by-step summary of a makeup tutorial video 7040. Selecting key-frames in steps 7020 is based on quantifiable measures, such as, the amount of motion and behavior, e.g., the hand movement or face covered by hand, probably only existing during the duration of a makeup application, while each key-frame of the step is usually shown with clear and non-occluded faces. The method for selecting key-frames from video data includes the steps of: partitioning the data into segments 7020a; generating a set of candidate key-frames 7020b using general video key-frame detection methods based on frame differences, color histograms, and/or camera motion; selecting the final key-frames based on specified makeup-related criteria, e.g., frontal face, face occlusion, hand motion, and/or face expression (usually having a smile), and whether there exists different makeup between its prior or next key-frames.

Product Detection:

For a product detection step 7030, in some cases, the makeup artists put the name(s) of the product(s) on the screen when each product is first introduced or may list all the products under the video as part of its description. Therefore, the system of the present disclosure may try to detect characters around the key-frames detected in the previous procedure, and then perform optical character recognition techniques to recognize one or more names and associated products as in 7030b. In other cases, when no product name(s) is/are added on the video, the system of the present disclosure may first locate the products 7030a (via, for example, its bottle, tube, or box) which usually exist near a face in the video image and/or are held by a hand with a similar gesture. Then, the product's image can be fed into a trained classifier 7035 which classified data from a beauty products database 7045 to recognize the products in step 7030c. In the worst case scenario, when the products are not able to be recognized, the system may return the frame with unknown products as a key-frame in the video summary.

Each of product detection 7030 and/or partitioning videos 7020 may be used in the virtual makeup tutorial system to generate makeup tutorial summaries 7040 and generate virtual makeup tutorials 7050. With the above acquired video summary, the system can automatically generate a series of virtual try on options through virtual makeup tutorials 7050 which allow users to recreate the look step-by-step without having to order the products online or test it in a retail store.

Color Matching for Digital Cosmetics

Robust Brightness Control

In one embodiment, the present disclosure provides a system generally referred to herein as system 8000 for automatically detecting the face captured by a camera and robustly adjusting the brightness of the face according to the detected face skin color. This system targets server video real-time applications to avoid flickering and smooth the adjusting process.

In general, the automatic brightness control on camera hardware typically fails to adjust the brightness on a user's face. Accordingly, such hardware with automatic brightness control may not be suitable for virtual makeup applications. In order to maintain a suitable brightness on a human face captured by the digital camera, a brightness control algorithm is needed. One common way to achieve suitable brightness is to use an additional light source, such as an LED. However, hardware light sources may have limitations. In this embodiment, brightness control of a user's face is performed primarily at the software level.

Figure 14:
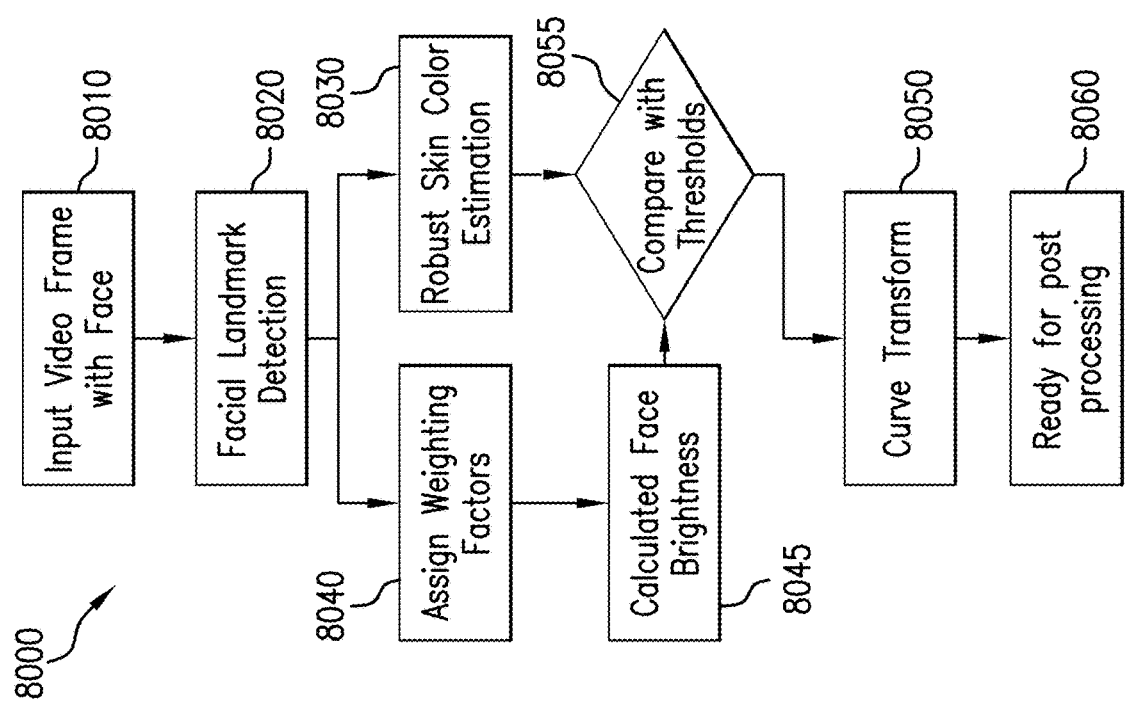

With reference to FIG. 14, in this embodiment, when an input in the form of a video frame having a face 8010 is input to the system 8000 for detecting the face and adjusting the brightness, a facial landmark detection algorithm is used to detect the face region and facial landmarks from the input image in step 8020, so as to obtain the face position and shapes in the image. Then, the system uses a skin color estimator 8030 based on the landmark information from the image to estimate the normalized skin color of the face. In the other path 8040, with the facial landmark detected, the system assigns different weighting factors to the face region, image center region, and the border region, and then calculates the average brightness of the image 8045. The average brightness is then compared with the estimated skin color 8055 and outputs a correction factor. A curve transform 8050, which uses polynomial transformation, is applied to the image according to the correction factors calculated in the above procedure. Then, the resulting image is ready to be used in post-processing 8060, such as, in a virtual makeup add-on.

Figure 15:
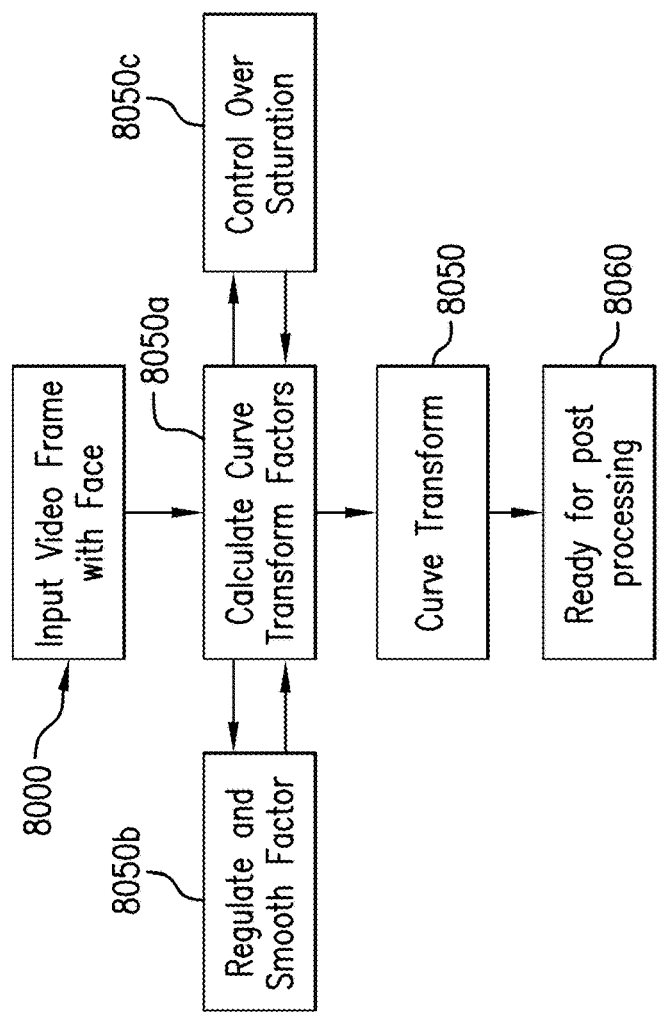
FIGS. 14 and 15 are flow diagrams each illustrating a method for adjusting image brightness using a curve transform in accordance with an embodiment of the present disclosure.

The curve transform 8050 may also be generated with reference to FIG. 15. In targeting video real-time digital cosmetic applications, the brightness level is to be kept as constant as possible to avoid flickering and sudden changes. Therefore, a response curve is 8050a is created and added to the brightness control system 8000. This smoothes the correction factor 8050b in a time domain and provides steady brightness controlled video 8050c as an output.

To process the image and adjust the brightness, a mathematical transform equation is needed. In one embodiment, the following curve transform filter may be used:

$$P_o = (1-\alpha)P_i + \alpha P_i^2. \tag{6a}$$

Figure 13:
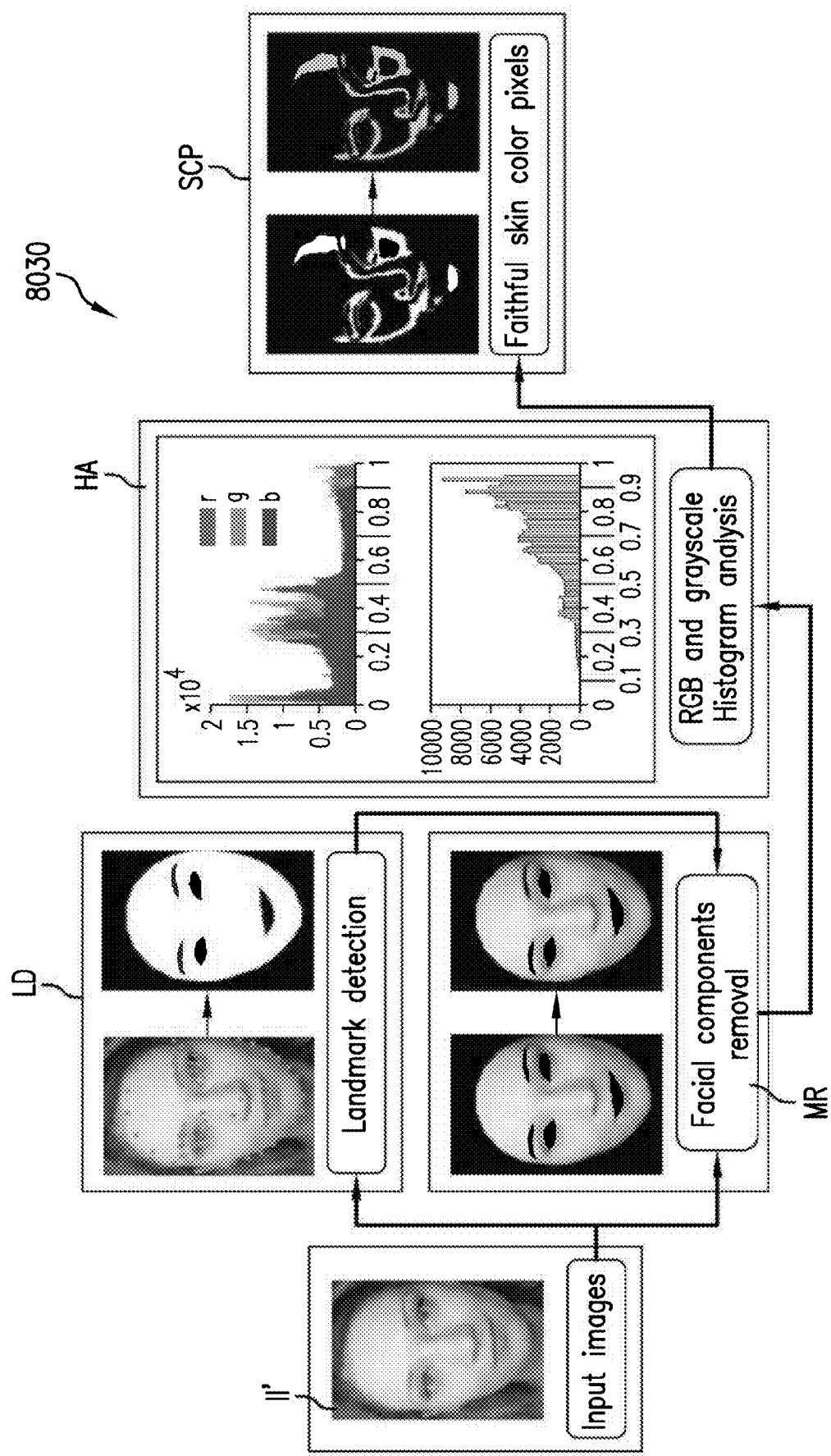
FIG. 13 shows a process for skin color estimation in accordance with an embodiment of the present disclosure.

In the method system and method 8000 noted above for automatically detecting a user's face captured by a camera and robustly adjusting the brightness of the face according to the detected face skin color, in step 8030, a robust skin color estimator is employed. FIG. 13 illustrates a process for skin color estimation in accordance with one embodiment of the present disclosure that may be employed as an embodiment of skin color estimator 8030. In this embodiment, an algorithm for skin color estimation is provided in Appendix E. In this embodiment, and in accordance with the algorithm, the method receives an input image II' and employs landmark detection (LD) using techniques as noted above as well as if desired components removal (MR) which may be performed with the makeup removal method and system described above). Histogram analysis HA is then carried out, using both RGD and grayscale analyses. Techniques useful for this purpose are described above in connection with the makeup removal process and system. A voting (rating) scheme is employed to generate faithful skin color pixels SCP (see Appendix F).

FIGS. 14 and 15 are flow diagrams illustrating a method for adjusting image brightness using a curve transform in accordance with an embodiment of the present disclosure as described above with reference to system 8000. In one embodiment, algorithms for brightness control are provided in the context of Appendices E and F.

Color Constancy

In one embodiment, the present disclosure provides a system generally referred to herein as system 9000 for maintaining color constancy so as to perform color matching to detect scene color accurately. The system 9000 automatically detects a color reference chart and uses the detected information to calibrate camera hardware settings. The system then performs additional advanced software calibration to meet a golden standard system herein in order to maintain color constancy. The system of this embodiment can then perform color matching to detect scene color accurately.

A problem in computer vision is that of estimating the underlying world that resulted in some observed image. One subset of this problem is color constancy, i.e., estimating the color of the illuminant of the scene and the colors of the objects in the scene viewed under a white light color. Constancy aims to recover the veridical world behind an image. The color constancy problem is always a challenge for both human eyes and computer applications.

Figure 16:
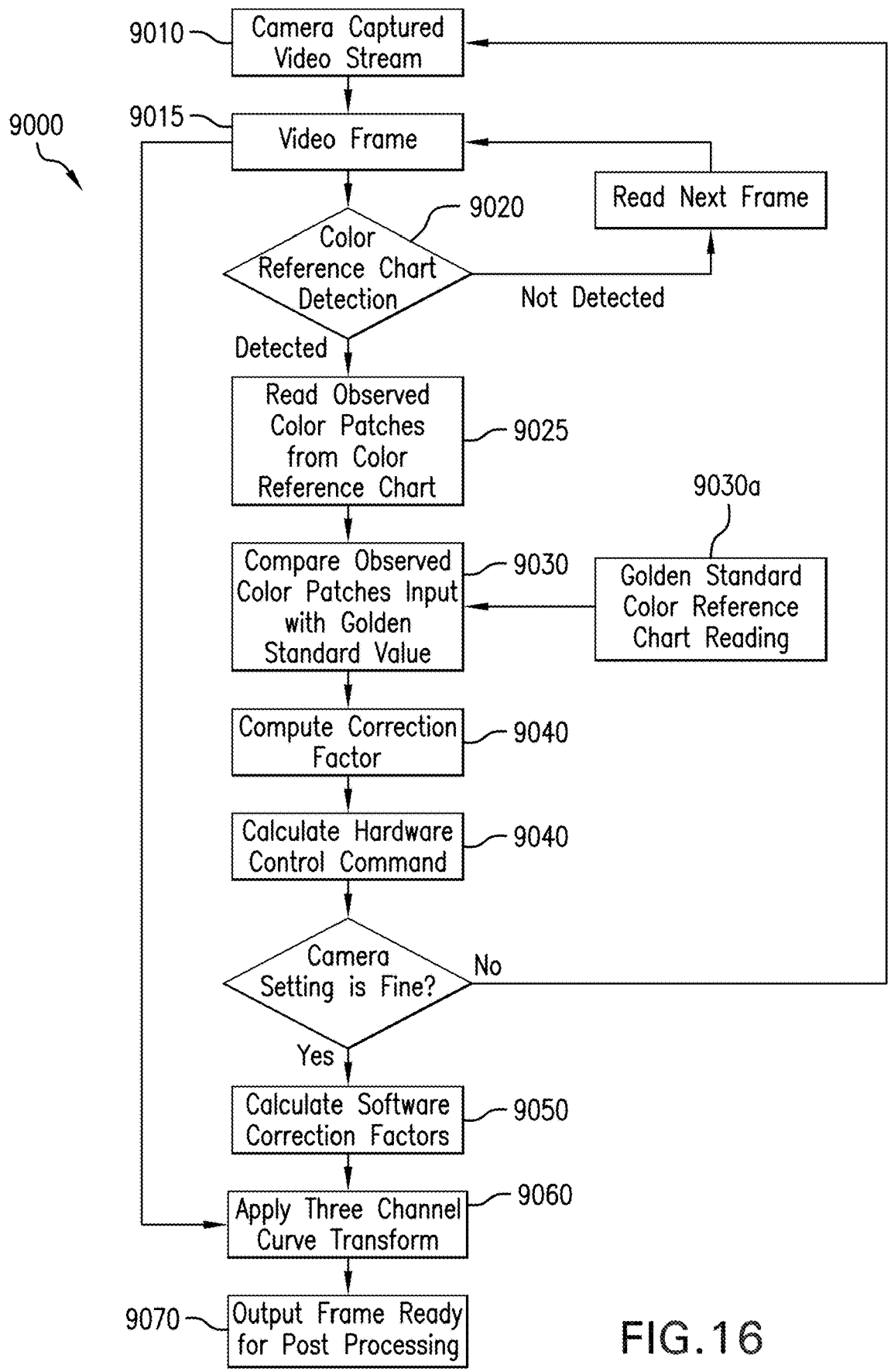
FIG. 16 is a flow diagram of a method for detecting a color reference chart of an image and using the detected color reference chart to calibrate camera hardware in accordance with an embodiment of the present disclosure.

FIG. 16 illustrates a flow diagram of a color constancy method and associated algorithm of system 9000 in accordance with an embodiment of the present disclosure. The color constancy algorithm used in the present disclosure can estimate the illumination cast on the scene by environmental light. The algorithm can also recover the real colors (reflectance) of the objects, which are invariant in different environmental conditions. This method can be used in calibrating camera side effects, compensating color resulting from illuminants and identifying ground truth color of real-world products.

Hardware Color Calibration Algorithm:

In one embodiment in system 9000, a system of color calibration is built in order to achieve color constancy. Since the target is real-time video application with camera accessibility, the whole system can built on a real-time framework. The user will use a camera with a digital video capability or another device having a camera configured to provide real-time digital video as an input 9010. As noted above, a video frame 9015 can be an isolated input. When a user initiates a color calibration request through any suitable input technique. In response, the system will ask the user to display a color reference chart in a certain position in step 9020. The calibration system automatically detects the color reference chart 9020 and reads the pixel value of each color patch in step 9025. Then, the system compares the observed color chart with the reference values 9030 captured under the golden reference system 9030a stored in the database. Using the comparison results, the calibration system sends control signal to a video capture device, such as, a webcam using built-in SDK in an operating system. The system calibrates all the camera parameters, such as, ISO speed, white balance, shutter speed, hue, brightness, contrast, and gain accordingly to meet the reference value in the golden system in step 9040. This calibration acts as a continuous feedback process wherein the calibration system sends calibration control signals to the camera continuously according to the new frame captured. Eventually, all the control parameters achieve dynamic balance and the pixel values of the color reference chart in the captured frame becomes very close to the reference values.

Software Color Calibration Algorithm:

The calibration system then calculates curve transforms in RGB channels separately and applies them on the frame, which acts as the final detailed calibration in step 9050 and 9060. Finally, the captured frame achieves color constancy and is already prepared for color match in step 9070. In order to modify the image to calibrate colors, a third-order polynomial may be used to simulate the transformation process on three channels. With the third-order polynomial, the transformation can be modified differently in different ranges of pixel values which provides good flexibility. By experiments, it is observed that mutual channel terms, such as, RG, RB, and GB, do not have much effect on the outputs. Therefore, these terms can be omitted, thereby making the polynomials channel independent. Taking the red channel as an example, the transform equation can be written as follows:

$$R_o = Cr_0 + Cr_1 R_i + Cr_2 R_i^2 + Cr_3 R_i^3 \quad (1)$$

where $R_o$ is the output red channel pixel value, $R_i$ is the input red channel pixel value, and Cr are coefficients (which may be constants) of the polynomial. The above function can be written in matrix form as follows:

$$Ax + b = 0 \quad (2)$$

Since there are 24 observations which are much greater than the number of unknown constants C, we have an overdetermined system to solve. The problem is then converted to a regression problem that can be solved using the least square method. The objective function can be written as:

$$\min \|Ax + b\|^2 \quad (3)$$

$$A = \begin{bmatrix} 1 & R_1 & R_1^2 & R_1^3 \\ 1 & R_2 & R_2^2 & R_2^3 \\ 1 & R_3 & R_3^2 & R_3^3 \\ \vdots & \vdots & \vdots & \vdots \\ 1 & R_n & R_n^2 & R_n^3 \end{bmatrix} \quad x = \begin{bmatrix} C_{r0} \\ C_{r1} \\ C_{r2} \\ C_{r3} \end{bmatrix} \quad b = \begin{bmatrix} R_{ref1} \\ R_{ref2} \\ R_{ref3} \\ \vdots \\ R_{refn} \end{bmatrix} \quad (4)$$

where $R_1 \ldots R_n$ are our observations, $C_r$ are the coefficients to be solved, $R_{ref}$ are reference values according to the golden system, and n is the number of observations of color patch (which in this case is 24).

After solving C coefficients for each of the R, G and B channels, we have a complete set of coefficients which can be used to process images after hardware calibration to minimize the error of color constancy. Finally, after hardware and software calibration, the video frames are ready for further color-based application, such as, color match algorithms.

Comparing to other color constancy algorithms, since the inventive method herein uses a reference color chart as a ground truth reference, the output from the resulting color constancy algorithm is much more accurate than those software-based methods which are based on many assumptions and statistical conclusions that do not have any ground truth data. Furthermore, our algorithm can be calibrated once and be applied on the video in real-time.

Color Match:

After color calibration, described above, all the colors are calibrated according to the golden system as a reference. Then, an output frame can be used for a color match which can recognize the exact color in the scene can be done. For example, the system can be used to recognize lipstick color.

In order to match a color with its reference value, a quantified color difference formula is of great importance. Quantification of color difference is generally a challenge because color is displayed very differently from the way it is perceived by human eyes. Most of the color humans see on electronic devices is based on sRGB color space. Therefore, a most common solution to color difference is to calculate a distance in a color space. For example, Euclidean distance in RGB color space could be represented as follows:

$$\text{distance}=\sqrt{(R_2-R_1)^2+(G_2-G_1)^2+(B_2-B_1)^2} \quad (4b)$$

In addition to the Euclidean distance in RGB, a number of color distance formulas can use other color spaces, such as HSV, and calculate the spatial distance accordingly. However, all of the color distance formulas are essentially simple modifications of the above equation with simple Euclidean distance without departing from the spirit and scope of the basic calculation. None of the color distance formulas tends to account for the non-uniform behavior of human color perception. Therefore, the equations can yield different results from human eyes on the same color measurement.

The International Commission on Illumination (CIE) creates many color difference formulas, such as CIE76, CIE94, and CIE2000, aiming to quantify the color difference more closely to human eyes. Because the CIE94 definition does not adequately resolve the perceptual uniformity issue, in CIEDE2000, the CIE refines its definition and added five corrections. CIEDE2000 is based on an LCH (Lightness, Chroma, and Hue) color space which values are calculated from CIELab color space. CIEDE2000 color difference accounts for non-uniformity and is closer to human perception.

Color Measurement with Highlight Removal

In one embodiment, the present disclosure provides a color measurement algorithm for calculating dominant color of an input image by removing reflected light on an object shown in the image. Locality of the object is considered so that more focus can be given to the center of the input image.

Even if color consistency is guaranteed, issues still remain to be solved. For example, light reflections are visible in real world photographs. In order to get the exact color desired, it is necessary to erase the reflected light and measure a dominant color of the object.

Figure 17:
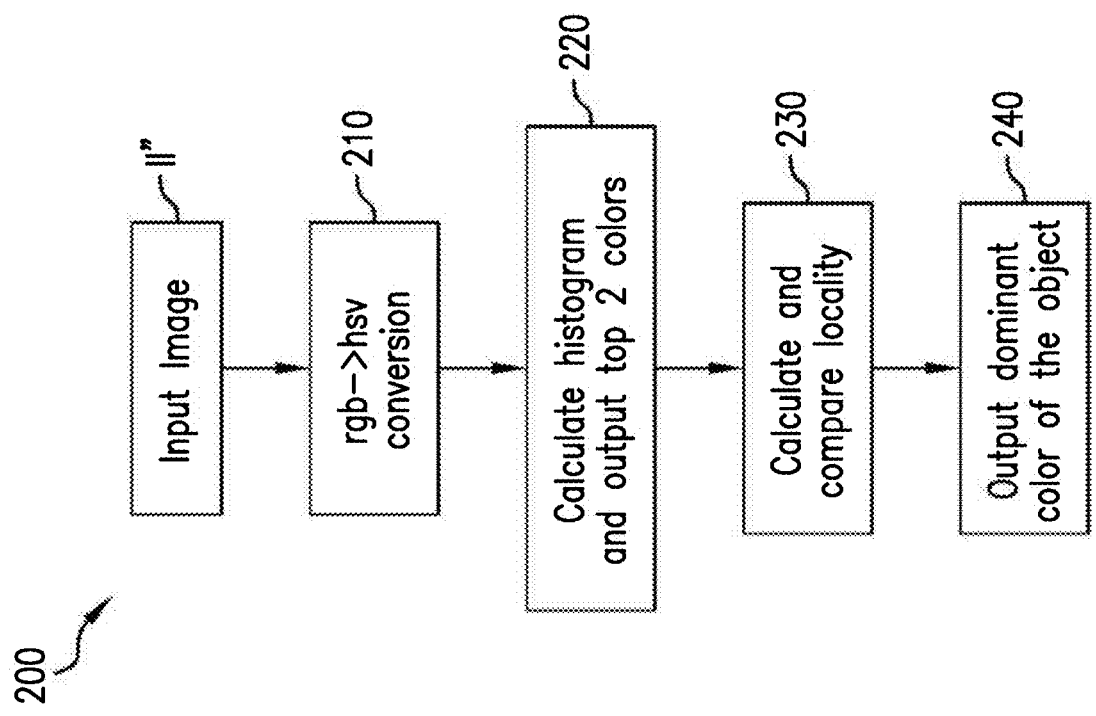
FIG. 17 is a block, flow diagram illustrating a color measurement system in accordance with an embodiment of the present disclosure.

FIG. 17 is a block diagram illustrating a color measurement system in accordance with an embodiment of the present disclosure. As shown in FIG. 17, an input image II" is transferred into HSV color space in step 210, wherein HSV color space are the most common cylindrical-coordinate representations of points in an RGB color space as described herein above.

As discussed previously, hue, saturation, and value can be defined in an HSV color space as shown in FIG. 1. Hue represents the color type, which can be described in terms of an angle range from 0 to 360 degrees. Saturation measures the degree to which a color differs from a gray, the lower the saturation, the more it appears faded. Value represents the brightness of the color, with 0 being completely dark and 255 being fully bright.

After getting an image of HSV color space, one can calculate the histogram of the image in step 220. A histogram is a graphical representation of the distribution of numerical data. It is an estimate of the probability distribution of a continuous variable (quantitative variable) and was first introduced by Karl Pearson. It is a kind of bar graph. To construct a histogram, the first step is to "bin" the range of values, that is, divide the entire range of values into a series of intervals, and then count how many values fall into each interval. The bins are usually specified as consecutive, non-overlapping intervals of a variable. The bins (intervals) must be adjacent, and are often (but are not required to be) of equal size.

After obtaining the histogram of the input image, a weighted average of each bin can be calculated using 3D convolution and return the top two values. A convolution is an integral that expresses the amount of overlap of one function g, as it is shifted over another function f, such as Equation (5) below. Because HSV color space is three-dimensional, Equation (6) is used for 3D convolution. Additionally, hue value of the HSV color space has cylindrical representation, so cyclic convolution is used to consider all the values of adjacent bins. Equation (7) shows a convolution matrix $g_r$ which is a well-defined periodic summation for hue value.

$$(f*g)(t) = \int_{-\infty}^{\infty} f(\tau)g(t-\tau)d\tau = \int_{-\infty}^{\infty} f(t-\tau)g(\tau)d\tau \quad (5)$$

$$(f*g)(x, y, z) = \sum_{i=-\infty}^{\infty}\sum_{j=-\infty}^{\infty}\sum_{k=-\infty}^{\infty} f(i, j, k)g(x-i, y-j, z-k) \quad (6)$$

$$(g\tau)(x, y, z) = \sum_{i=-\infty}^{\infty}\sum_{j=-\infty}^{\infty}\sum_{k=-\infty}^{\infty} g(x-i, y-j, z-k\tau) \quad (7)$$

$$= \sum_{i=-\infty}^{\infty}\sum_{j=-\infty}^{\infty}\sum_{k=-\infty}^{\infty} g(x-i, y-j, z+k\tau)$$

Figure 18:
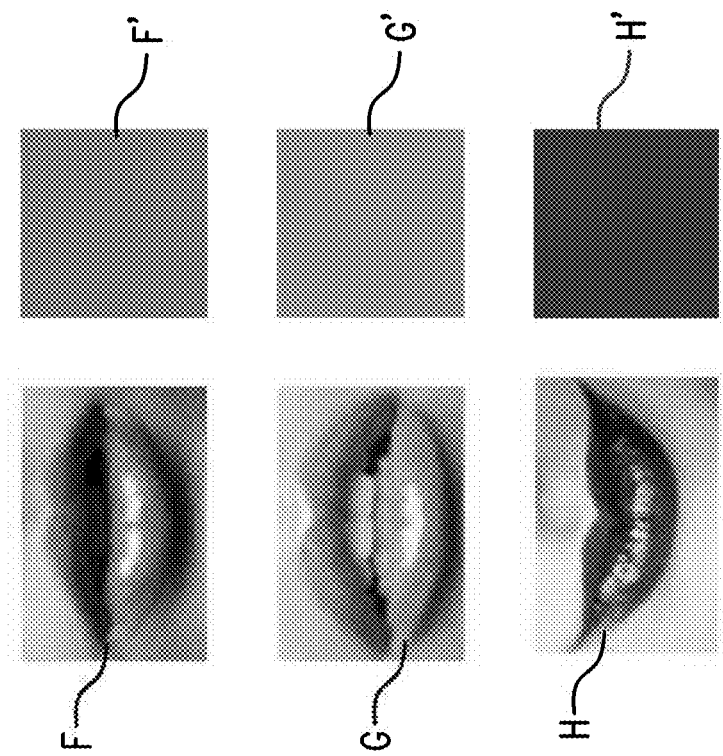
FIG. 18 illustrates input images and the dominant colors thereof extracted using the color measurement system in accordance with an embodiment of the present disclosure.

Locality is also calculated in step 230 by weighted two-dimensional (2D) convolution to determine the final return value in step 240 by comparing the locality of the top two values to give more focus to the object in the center of the input image. FIG. 18 illustrates input images F, G, H and the dominant colors F', G', H' thereof extracted using the color measurement system in accordance with an embodiment of the present disclosure. A pseudo code of the color measurement system is provided in Appendix G.

Automated and Fast Facial Detection and Landmark Tracking

In this portion of the disclosure, an embodiment illustrates a novel framework for facial landmarks using a new algorithm based on a Global Learned Descent Regularized (GLDR) model for solving the landmark shaking and lag problems. This embodiment also has a patches coefficient calculation to check the correctness of the landmarks.

In one embodiment, the present disclosure relates to a framework for fast facial landmarks detection and tracking. The disclosure further relates to a method for solving lag problems in fast movement of the face and landmark shaking problems when a person stays still in the video.

In one embodiment, the invention provides a framework for facial landmarks detection. In particular, the present invention relates to a method that solves the lag problem with multiscale global detectors, and also relates to a method that uses quick linear regression with different scale images and patch correlation match as the local landmarks to current bounding box as the initial shape of the current frame to make the framework even faster and reduce the landmark drifting problems.

In a first embodiment of this method, an image is captured by a two-dimensional (2d) camera. Then an image pyramid is created with different scaled images. The bounding box of the faces using the Histogram of Gradient features with sliding windows and SVM on the image pyramid.

In a further embodiment, several global facial landmarks detectors (GLDR model) are used on different scaled images detecting the landmarks on the face inside the bounding box if there is a face inside of the box. Global detectors will use the Histogram of Gradient as the features since the features are already present when the face is detected. Then the landmark positions are normalized across the image pyramid to remove the noise influence on landmark detection.

In a further embodiment, of the invention disclosure, the correctness of the landmarks are validated by a trained neural networks model and then patches centered by the landmarks are extracted. The landmarks are used in the current frame as the initial shape of the next frames. After they are detected by global landmarks detectors, the patches are fit using Landmark Mean-Shift Fitting. The correlation coefficient is computer for each patch and the bad landmarks are made to disappear. The process then reverts to the initial, first embodiment.

Figure 19:
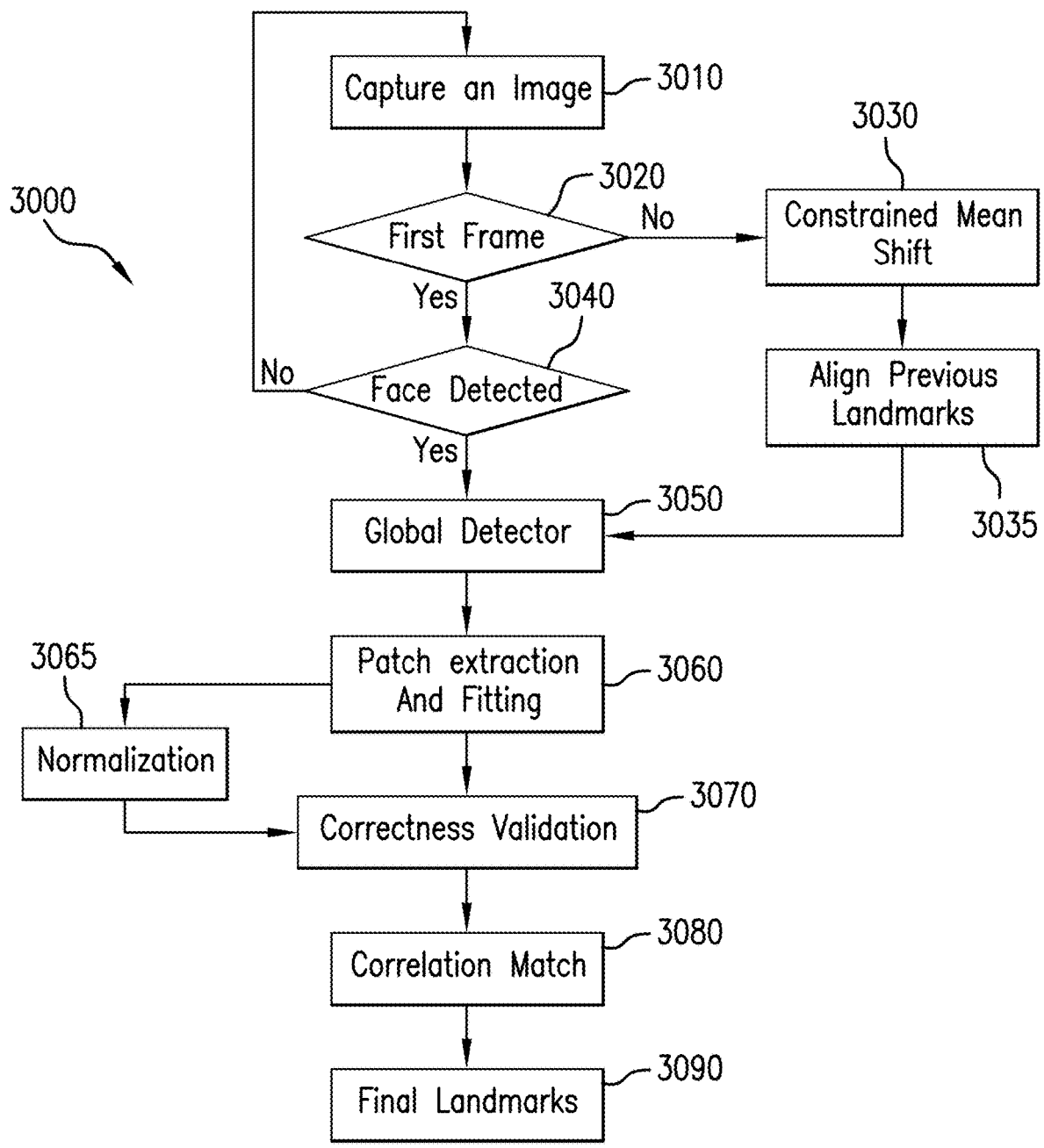
FIG. 19 is a flow diagram illustrating a system for a facial landmarks framework in accordance with a preferred embodiment of the present disclosure.

FIG. 19 is a flow diagram outlining an overall process of optimizing detection of facial landmarks. The method will be described with reference to method 3000 in FIG. 19, wherein at the outset, an image is captured using a 2D camera in step 3010.

With reference to 3020 a first frame is identified as an image frame. This may be done using an image pyramid that is generated with different scales. If the current frame has previous landmarks, a face is detected in 3040, and multi-scaled global detector with sliding windows is used to scan the image 3050 to detect the facial landmarks, and, further in 3050, for each region of interest, the Histogram of Gradient is computed and used as the input to the Supported Vector Machine model 3060 to judge which part is the destination region for patch extraction and fitting. See, N. Dalal and B. Triggs, "Histograms of oriented gradients for human detection," CVPR, pp. 886-893 (2005); and C. Cortes and V. Vapnik, "Support-vector networks," Machine Learning, pp. 273-297 (1995). Then the windows are down sampled to make the region more accurate in 3070. If a face is not detected, a constrained mean shift 3030 is used in the image pyramid to detect a frame, and if previous landmarks exist, they can be used as the initial shape of the global detector in 3050. If the current frame has previous landmarks, the previous landmarks are used to align to a current bounding box in 3035 as initial landmarks for the Supervised Descent Method (SDM).

As noted above, the GLDR model 3050 is used to detect the facial landmarks. There are many methods that can be used as global detector, such as Regression Trees (see, V. Kazemi and J. Sullivan, "One millisecond face alignment with an ensemble of regression tress," CVPR (2014)); Regressing Local Binary Feature (see, S. Ren, et al., "Face Alignment at 3000 FPS via Regressing Local Binary Features," CVPR (2014)); Supervised Descent Method (see, X. Xiong et al., "Supervised descent method and its applications to face alignment," CVPR (2013)); and so on. In the present invention, the preferred GLDR method is HOG as the global detector method for detecting facial landmarks, and to make the detection more accurate, it is also preferred to use a Point Distribution Model as the second features of SDM (see, T. Baltrusaitis, et al., "Constrained local neural fields for robust facial landmark detection in the wild," ICCV Workshops (2013). A new formula is created as follows:

$$f(x+\Delta x)=\arg_x \min(\|H(x+\Delta x)-H(x^*)\|_2^2) \quad (1)$$

The variable x is the parameter computed by the Point Distribution Model. H represents the Histogram of Gradient of the landmarks. $H(x^*)$ is the HOG features of the ground truth landmarks' positions. We can compute the shape using the parameter p based on the Point Distribution Model. The equation of the estimation is:

$$X=sR(\bar{X}+\varphi q)+t \quad (2)$$

where s is the scale, R is the rotation vector, $\varphi$ is the shape subspace matrix holding n eigenvectors which is a constant matrix, q represents non-rigid shape parameters and t is the translation. So we can get parameters vector p:

$$p=\{s,R,t,q\} \quad (3)$$

where s, R, and t can be global parameters and q can be a local parameter. The equation (1) is the object equation and what is desired are the parameters that can minimize the result of the object equation. Assuming the H is twice differentiable, then a second order Taylor expansion is used for the left of equation (1):

$$f(x+\Delta x) = f(x) + J_f(x)^T \Delta x + \frac{1}{2}\Delta x^T H(x)\Delta x \quad (4)$$

where J and H are the Jacobian and Hessian matrices of f evaluated at p. The first update is computed by setting x to zero and differentiating the equation (1) with the respect to it:

$$\Delta x_1 = -H^{-1}J_f = -2J_h(H(x)-H(x^*)) \quad (5)$$

It is preferred to update the parameters p while updating the shape x. Based on the Point Distribution Model (PDM) the update parameter is easily obtained based on the update shape:

$$\Delta p = -H_p^{-1}X_c(\Phi^{-1}p+J_p\Delta X) \quad (6)$$

$$\Phi=\text{diag}\{[0;\lambda_1,\lambda_2,\lambda_3,\lambda_4,\lambda_5,\ldots\lambda_m]\} \quad (7)$$

where Hp is the Hessian matrix of the PDM and Jp is the Jacobian matrix of the PDM. Xc is the current shape. Then the update of p is calculated:

$$p_k=p_{k-1}-H_p^{-1}X(\Phi^{-1}p+J_p\Delta X) \quad (8)$$

$$p_k=p_{k-1}-H_p^{-1}X(\Phi^{-1}p+J_p(-2J_{hk}(H(x_{k-1})-H(x^*)))) \quad (9)$$

$$p_k=p_{k-1}-H_p^{-1}X(\Phi^{-1}p+J_p(R_{k-1}H(x_{k-1})-b_{k-1})) \quad (10)$$

$$p_k = p_{k-1} - H_p^{-1}X\Phi^{-1}p - H_p^{-1}X\Phi^{-1}pJ_pR_{k-1}H(x_{k-1}) - b_{k-1})  \quad (11)$$

$$p_k = p_{k-1} - B_{k-1} - H_p^{-1}X\Phi^{-1}pJ_pR_{k-1}H(x_{k-1}) \quad (12)$$

$$p_k = p_{k-1} - B_{k-1} - A_{k-1}H(x_{k-1}) \quad (13)$$

Since x can be described by p, the final equation can be:

$$p_k = p_{k-1} - B_{k-1} - A_{k-1}H'(p_{k-1}) \quad (14)$$

The new object function will then be:

$$f(p + \Delta p) = \arg_{\Delta p} \min(\|H(p+\Delta p) - H(p^*)\|_2^2) \quad (15)$$

The Gaussian-Newton Method can then be used just as SDM does to optimize the new object function.

In one embodiment, thus, the training Algorithm in this step may be as follows:

| Algorithm for training |
|---|
| Input: PDM(X, φ) model training data $\{I_i, X_i, \overline{X}\}$, I are images and X are shapes, for i = 1...N |
| Output weights $\{W_1, W_2, ... W_t\}$ and update of the parameters, t is the steps of the stage: |
| 1:    for 1 to t do: |
| 2:       for all i=1 to N do: |
| 3:          Calculate the HOG on the ground landmarks: |
| 4:          Calculate the pdm parameter $p_i = P(X_i, \phi_i)$: |
| 5:          Push the HOG descriptor into H; |
| 6:          Calculate the Update of the X and P and push them to ΔX and Δp: |
| 7:       end for |
| 8:       $W_t = (H^TH + b)^{-1}H^T\Delta X\Delta p$; |
| 9:       Save $W_t$; |
| 10:   end for |

After the detected landmarks and the parameters are obtained, the patches are extracted, and the parameters already available are used to do the Landmarks Mean-shift Fitting 3060. The landmarks are preferably smooth so that a local patch is used as a feature to calculate new parameters p. Based on the Regularized Landmarks Mean Shift method, the update parameters are obtained (see, J. Saragih et al., "Deformable Model Fitting by Regularized Landmark Mean-Shift," IJCV (2011)):

$$\arg_{\Delta p} \min(\|p_0 + \Delta p\|_{\Lambda^{-1}}^2 + J\Delta p_0 - v) \quad (16)$$

where J is the Jacobian matrix with respect to the vector p, and is the prior on p, v is the mean-shift vector over the patches, and where $p_0$ is the initial estimate of p which can be calculated from SDM. In a Gaussian distribution p(p) N(q; 0; Λ), $\Lambda^{-1}$ is the matrix indicating the prior of p. $v = [v_1, v_2, ..., v_n]^T$ is the mean-shift vector which is expressed as follows by Gaussian Kernel Density Estimator:

$$v = \sum_{y_i \in \psi_i} \frac{\pi_{y_i} N(x_i^c; y_i, \rho I)}{\sum_{z_i \in \psi_i} \pi_{z_i} N(x_i^c; z_i, \rho I)} - x_i^c, \quad (17)$$

wherein the function N is a Gaussian distribution, $x_i^c$ is the current estimate of x which is calculated by previous steps.

The landmark position is normalized across the image pyramid 3065.

After the landmarks are generated, a 3-layer Neural Network Model is used as a correctness validation model 3070 to filter the wrong shapes. The neural network layers are preferably a convolution layer, an up-sample layer and a mapping layer.

Previous patches and current patches are then matched by computing the correlation coefficient of each pair of the patches. Then the best region of interest in the current patches are chosen and their centers are made as final landmarks 3090. In addition, the correlation coefficient may also be used to classify which landmarks are occluded. The calculation function is preferably:

$$R(x,y) = \sum_{x',y'} (T(x',y') - I(x+x', y+y'))^2 \quad (18)$$

Comparison

A new algorithm may thus developed and incorporates an SDM along with a Point Distribution Model as preferred methods for GLDR as in 3050. However both the preferred framework herein and the GLDR model differ from prior models. While SDM is used to optimize the equation (15), the variable of the object function are parameters calculated by the Point Distribution Model, which is able to filter the noise from the ground truth, making the landmarks in videos more stable. Furthermore, by use of SDM with different scaled images reduces the noise. The initial landmarks for SDM are aligned landmarks from a previous frame to the current bounding box. In addition the framework uses a GLDR model which is a global detector rather than local detectors as in prior art GLDR using point distribution as noted in Baltrusaitis et al., referenced above. Hence performance using the current method does not have a lag problem when faces rotate very fast. The new framework is even smarter since it has the patches coefficient match module to detect which landmark is occluded.

For the various systems and methods herein, a general system structure as shown in FIG. 38 may be used and methods combined in various ways (such as in FIG. 37) or with other techniques and improvements described above. As shown in FIG. 38, a memory capability (cloud- or hardware server-based) may be employed to store in a preferably secure location all various data and data sets described herein, including eye templates, ground truth data, product data, style and makeup look information, user information, training and learning information of all types and anything else the system requires for operation. The data should be accessible to programmable system software based on the algorithms and pseudo code noted herein, and executable on a processor in a controller herein.

Implementations of such a system can employ various types of appropriate hardware or software. The system may execute on any system structure having capacity to run an operating system (OS) such as the Microsoft Windows® OS, Apple OS X®, the Apple iOS® platform, the Google Android™ platform, the Linux® operating system and other variants of UNIX® operating systems, and the like.

Some or all of the described functionality can be implemented in software and/or hardware on a user device. A user device should include a suitable user interface, and as noted above can be a mobile phone (smart phone) having a digital camera and/or digital video capacity. In addition, one may use smart/digital watches, smart mirrors, smart glasses, tablet computers, portable computers, televisions, gaming devices, music players, virtual reality goggles, laptops, palmtops, smart or dumb terminals, network computers, personal digital assistants, home assistants (such as Alexa™ or Google® Home™), which preferably have camera, wireless devices, information appliances, workstations, minicomputers, mainframe computers, or other computing devices, that is operated as a general purpose computer or a special purpose hardware device that can execute the functionalities described herein.

Software may be implemented on a general purpose computing device in the form of a computer including a processing unit, a system memory, and a system bus that couples various system components including the system memory to the processing unit. Additionally or alternatively, some or all of the functionality can be performed remotely, in the cloud, or via software-as-a-service (such as, for example, a makeup service). For example, virtual removal and makeup virtual simulation and add-on functions and related functions can be performed on one or more remote servers or other devices as described above that communicate with a user's device and its user interface. Remote functionality can execute on server class computers that have sufficient memory, data storage, and processing power and that run a server class operating system (e.g., Oracle® Solaris®, GNU/Linux®, and the Microsoft® Windows® family of OS's).

The systems can include a plurality of software processing modules stored in a memory and executed on a processor. By way of illustration, the program modules can be in the form of one or more suitable programming languages, which are converted to machine language or object code to allow the processor or processors to execute the instructions. The software can be in the form of a standalone application, implemented in a suitable programming language or framework based on the algorithms and pseudo code provided herein.

Method steps of the techniques described herein can be performed by one or more programmable processors executing one or more computer programs to perform functions by operating on input image and other related data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry. Such processor(s) may also actuate the executable learning tools and systems described herein.

In various implementations, a user device preferably includes some access to or communicates with a device that has access to a web browser, native application, or both, that facilitates execution of the functionality(ies) described herein. A web browser allows the device to request a web page or other downloadable program, applet, or document (e.g., from the server(s)) with a web page request. One example of a web page is a data file that includes computer executable or interpretable information, graphics, sound, text, and/or video, that can be displayed, executed, played, processed, streamed, and/or stored and that can contain links, or pointers, to other web pages. In one implementation, a user of the device manually requests a web page from the server. Alternatively, the device automatically makes requests with the web browser. Examples of commercially available web browser software include Google® Chrome®, Microsoft® Internet Explorer®, Mozilla® Firefox®, and Apple® Safari®.

In some implementations, the user devices may include client software such as an application that works with the makeup service. The client software can provide functionality to the device that provides for the implementation and execution of the features described herein, including brightness adjustment and color calibration as well as allowing for storage of templates and other user data. The client software can be implemented in various forms, for example, it can be in the form of a native application, web page, widget, and/or Java, JavaScript, .Net, Silverlight, Flash, and/or other applet or plug-in that is downloaded to the device and runs in conjunction with the web browser. The client software and the web browser can be part of a single client-server interface; for example, the client software can be implemented as a plug-in to the web browser or to another framework or operating system. Other suitable client software architecture, including but not limited to widget frameworks and applet technology can also be employed with the client software.

A communications network can connect the devices with one or more servers and/or with each other. The communication can take place over media such as standard telephone lines, LAN or WAN links (e.g., T1, T3, 56 kb, X.25), broadband connections (ISDN, Frame Relay, ATM), wireless links (802.11 (Wi-Fi), Bluetooth, GSM, CDMA, etc.), for example. Other communication media are possible. The network can carry TCP/IP protocol communications, and HTTP/HTTPS requests made by a web browser, and the connection between the clients and servers can be communicated over such TCP/IP networks. Other communication protocols are possible.

The system can also be practiced in distributed computing environments where tasks are performed by remote processing devices that are linked through a communications network. In a distributed computing environment, program modules can be located in both local and remote computer storage media including memory storage devices. Other types of system hardware and software than that described herein can also be used, depending on the capacity of the device and the amount of required data processing capability. The system can also be implemented on one or more virtual machines executing virtualized operating systems such as those mentioned above, and that operate on one or more computers having hardware such as that described herein.

In some cases, relational or other structured databases can provide such functionality, for example, as a database management system which stores data for processing. Examples of databases include the MySQL Database Server or ORACLE Database Server offered by ORACLE Corp. of Redwood Shores, Calif., the PostgreSQL Database Server by the PostgreSQL Global Development Group of Berkeley, Calif., or the DB2 Database Server offered by IBM.

It should also be noted that implementations of the systems and methods can be provided as one or more computer-readable programs embodied on or in one or more articles of manufacture. The program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

APPENDIX A

```
algorithm virtual makeup wash off
    input: source image I
    output: image O with makeup on lip and eye region wash-offed if
    makeup detected
    do face detection and landmark location on input image I
    if (face detected) {
        copy input image to output image O = I
        if (makeup detected on lip region){
            extract region of interesting image I^roi
            I_hsv^roi = rgb2hsv(I^roi)
            for (I_c^roi, c ∈ {h, s, v}){
                find reference histogram H_c-ref according to detect lip
                makeup
                find matching function with f_matching ( )=
                histogram_match(H_c, H_c-ref)
                O_c^roi = f_matching (I_c^roi)
            }
            O^roi = hsv2rgb (O_hsv^roi)
            find the color shifting caused by lighting condition through skin
            color detection
            apply the color shifting on the removed lip color to obtain the
            final O^roi
            blend the revised O^roi back to the output image at the region of
            interesting
            Blend(O^roi, O, roi)
        }
        else if (makeup detected on eye region){
            extract region of interesting image I^roi
            obtain reflectance R^roi and shading s^roi through intrinsic
            decomposition
            [R^roi, s^roi] = intrinsic_decomposition(I^roi)
            for (R_c^roi, c ∈ {r, g, b}){
                extract the histogram H_c from R_c^roi
                obtain the reference histogram H_c-ref by filtering H_c based
                on criteria
                find matching function with f_matching ( )=
                histogram_match(H_c, H_c-ref)
                R_c^roi = f_matching (R_c^roi)
            }
            extract the histogram H_c from s^roi
            obtain the reference histogram H_c-ref by filtering H_c based on
            certain criteria.
            find matching function with f_matching ( )¯ histogram_match(H_c,
            H_c-ref)
            s^roi = f_matching (s^roi)
            O^roi = s^roi × R^roi
            blend the revised O^roi back to the output image at the region of
            interesting
            Blend(O^roi, O, roi)
        }
        end
    }
```

Appendix B

Algorithm for color based lip mask extraction

```
input: source image I
output: image O with lip region as white value while others are black
do face detection and landmark location on input image I
if (face detected) {
    copy input image to output image O = I
    skin_mask generate from landmark;
    Train GMM_skin with I (skin_mask);
    Compute skin probability map with GMM_skin on I;
    for (thresholding probability map with increasing
    thresholding offset) {
        find contour in binary image after thresholding;
        if (contour satisfied lip criterial) {
            set binary image as initialed lip mask;
            break;
        }
    }
    Train GMM_lip and GMM_non_lip with I (initialed lip mask);
    Get lip probabilistic map as below;
```

$$p(x_i) = \frac{p(x_i \mid lip)}{p(x_i \mid non\_lip) + p(x_i \mid lip)}$$

```
    return optimal lip mask;
    end
}
algorithm color based lip mask extraction
    input: source image I
    output: image O with lip region as white value while others are black
    do face detection and landmark location on input image I
    if (face detected) {
        copy input image to output image O = I
        skin_mask generate from landmark;
        Train GMM_skin with I (skin_mask);
        Compute skin probability map with GMM_skin on I;
        for (thresholding probability map with increasing
        thresholding offset) {
            find contour in binary image after thresholding;
            if (contour satisfied lip criterial) {
                set binary image as initialed lip mask;
                break;
            }
        }
        Train GMM_lip and GMM_non_lip with I (initialed lip mask);
        Get lip probabilistic map as below;
```

$$p(x_i) = \frac{p(x_i \mid lip)}{p(x_i \mid non\_lip) + p(x_i \mid lip)}$$

```
        return optimal lip mask;
        end
    }
```

APPENDIX C

FIG. 1.2.2

```
algorithm add-transparency-shine-effect is
    input: source image i including lip
        mask map m of exact lip region
    output: image o with transparency and shine effect
    Define MAX_EFFECT [1:n];
    Define RANGE (0.1];
    Image o = zero(sizeof(i));
    Image r;
    for x=0 to sizeof(x)
        If m(x) == true
            r = i(x);
    Histogram h = calculate_histogram(r);
    sort_descending(h);
```

APPENDIX C-continued

FIG. 1.2.2

```
for n=1 to MAX_EFFECT
    for x=0 to sizeof(i)
        o(x) = (i(x)>h(n*RANGE))?i(x)*(1+n*RANGE):0;
Return o
```

APPENDIX D

FIG. 1.3.3

```
system makeup annotator is
    input: source image i including a person wearing professional makeup
           a list of face landmark points f
    output: a list l containing step by step makeup information
    List makeup_steps = {"foundation", "contouring", "eyebrow", "eye", "blush", ...};
    for cur_step = 0 to sizeof(makeup_steps)
    {
        next_step = false;
        while(!next_step)
        {
            get_user_input(&color_point,&templateid,&is_shimmer);
            color = get_color_from_point(color_point);
            l.push_back(makeup_steps(cur_step),templateid,color,&is_shimmer);
            if get_user_step_done( )
                next_step=true;
        }
    }
    // for lip color and texture annotation
    Image c = crop_lip_region(i,f);
    lip_color = get_color_from_lip_region(c);
    Texture t = get_user_lip_texture( );
    l.push_back ("lip", t,lip_color);
    Return l
```

APPENDIX E

```
algorithm brightness control
    input: source image I
    output: image O after brightness adjustment
    start
    do face detection and landmark location on input image O
    if (face detected)
        copy input image to output image O = I
        assign weight factors to face region and the other regions
        calculate weighted average pixel value P_avg
        get an estimated skin color detected P_est
        calculate deviation L_dev = rgb2gray(P_avg) – rgb2gray(P_est)
        if (L_dev > L_thres)
            calculate step value step = L_dev / L_thres * gain
            if (L_dev < 0)
                decrease alpha α = α – step
            else
                increase alpha α = α + step       P_o = (1 – α)P_i + αP_i^2
            curve transform on I using new
        else
            reset step value
    else
        get next frame from the video input
    end
```

APPENDIX F

```
algorithm brightness control
    input: source image I
    output: image O after brightness adjustment
```

APPENDIX F-continued

```
Start
    if (color calibration on)
        do color reference chart detection on input image I
        if (color chart detected)
            compare the observed pixel value of color chart with reference
            value
            if (camera setting is good)
```

APPENDIX F-continued

```
                if (color deviation < threshold)
                    return color calibration is done
                else
                    build Matrix A, b in eq. (4) using observed and reference
                    value P_obs and P_ref
                    solve the equation for x using least square method in eq. (3)
                    apply solved coefficient x on input image I using eq. (1)
                    return color calibration is done
            else
                if (exposure too low)
                    increase exposure (increase ISO or shutter speed)
                if (exposure too high)
                    decrease exposure (decrease ISO or shutter speed)
                if (white balance too low)
                    decrease exposure (increase ISO or shutter speed)
                if (white balance too high)
                    decrease exposure (decrease ISO or shutter speed)
    else
        if (calibration is done)
            apply solved coefficient x on input image I using eq. (1)
    end
```

APPENDIX G

FIG. 2.3.3

```
algorithm color measurement is
    input; source image i
    output: color c which is dominant in input image i
    nH = number of bins for Hue
    nS = number of bins for Saturation
    nV = number of bins for Value
    i_hsv = rgb2hsv(i);
    Histogram h[nH][nS][nV] = calculate_histogram(i_hsv);
    Matrix w = three-dimensional normal distribution;
    h = calculate_weighted_average_w_3d_convolution(h,w);
    //structure Bin has summation of bin value and intervals as attributes
    Bin maxbin_1 = max(h);
    Bin maxbin_2 = max_far_from_param2(h,maxbin_1);
    w = 2-dimensional normal distribution;
    //calculate locality of the first and second bin with two-dimensional convolution
    locality1 = calculate_locality_w_2d_convolution(i,w,max_bin_1);
    locality2 = calculate_locality_w_2d_convolution(i,w,max_bin_2);
    maxbin = compare_locality_and_bin_value(locality1,locality2,maxbin1,value,maxbin2,value);
    c = calculate_average_color_in_bin(i,maxbin);
    return c;
```

We claim:

1. A method for virtually removing facial makeup, comprising:
providing a facial image of a user with makeup applied thereto;
locating facial landmarks from the facial image of the user, the facial landmarks including at least a first region and a second region different from the first region;
decomposing the first region of the facial image into first channels, wherein the first channels comprise a reflectance channel and a shading channel;
feeding the first channels of the first region into histogram matching to obtain a first image with makeup being removed in the first region;
converting the second region of the facial image into color channels, wherein the color channels comprises a hue channel, a saturation channel, and a value channel;
feeding the color channels into histogram matching under different lighting conditions to obtain a second image with makeup being removed in the second region; and
combining the first image and the second image to form a resultant facial image with makeup being removed from the first region and the second region,
wherein feeding the color channels into histogram matching comprises:
providing a dataset of facial images, each without makeup in a corresponding second region of each facial image under different lighting conditions and including pre-defined histograms; and
matching a histogram of one or more of the color channels under different lighting conditions with a corresponding one of the pre-defined histograms to obtain the second image.

2. The method according to claim 1, wherein the color channels are the value channel and/or saturation channel.

3. The method according to claim 1, wherein the reflectance channel comprises material dependent properties of the facial image, and the shading channel comprises light dependent properties of the facial image.

4. The method according to claim 3, wherein the reflectance channel contains only one color, and the shading channel preserves shape information of the first region.

5. The method according to claim 1, wherein the first region comprises an eye region and the second region comprises a lip region.

6. The method according to claim 1, wherein a type of the makeup in the first region prior to feeding the first channels of the first region into histogram mapping is different from a type of the makeup in the second region prior to converting the second region of the facial image into color channels.

7. A method for virtually removing facial makeup, comprising:
providing a facial image of, a user with makeup applied thereto;
locating facial landmarks in a region of the facial image of the user;
converting the region of the facial image into color channels, wherein the color channels comprise a hue channel, a saturation channel, and a value channel; and
feeding the color channels into histogram matching under different lighting conditions to obtain a resultant image with the makeup removed in the region,
wherein feeding the color channels into histogram matching comprises:
providing a dataset of facial images without makeup, including pre-defined histograms; and
matching a histogram of one or more of the color channels under different lighting conditions with a corresponding one of the pre-defined histograms to obtain the second image.

8. The method according to claim 7, wherein the color channels are the value channel and/or the saturation channel.

9. The method according to claim 7, further comprising:
collecting a skin color dataset wherein skin color data is collected under different lighting conditions having corresponding lip color shifting for such different lighting conditions in comparison to a standard lip color;
extracting an input skin color from the image of the user;
detecting corresponding lip color shifting of the input skin color under a specific lighting condition of the input skin color using the skin color dataset; and
providing a final revised lip color for use as a removal lip color from the first region of the facial image of the user, wherein the final revised lip color has the detected color shifting.

10. A system for detecting and removing makeup from an input image, where the system is configured to be capable of:
receiving an input image from a user interface with makeup applied thereto;

locating facial landmarks from the facial image of the user in at least a first region and/or a second region different from the first region, wherein the first region includes makeup and/or the second region includes makeup;

if the first region is located, decomposing the first region of the facial image into first channels and feeding the first channels of the first region into histogram matching using a reference histogram from a dataset of histograms of faces each having no makeup to obtain a first image with the makeup removed in the first region and/or if the second region is located, converting the second region of the facial image into color channels and feeding the color channels into histogram matching under different lighting conditions and using a reference histogram from a dataset of histograms of faces under different lighting conditions each having no makeup to obtain a second image with the makeup removed in the second region; and if both the first region and the second region are located, combining the first image and the second image to form a resultant facial image with makeup removed from the first region and the second region.

11. The system according to claim 10, wherein the system comprises a controller having a system memory and a system processor, wherein the controller is configured to receive the input image, and to receive and/or to store in the memory the dataset of histograms of faces having no makeup and the dataset of histograms of faces under different lighting conditions, and the system processor is capable of executing programming instructions capable of detecting a facial image and locating facial landmarks.

12. The system according to claim 11, wherein the processor is capable of executing programming instructions for decomposition of the first region of the input image into the first channels and for histogram matching of the first channels of the first region; and wherein the processor is capable of executing programming instructions for converting the second region of the facial image into color channels and histogram matching of the color channels under different lighting conditions.

13. The system according to claim 10, wherein the user interface is a smart phone digital camera, a digital camera, a digital video camera, a webcam, or a smart phone digital video camera.

* * * * *